US007206720B2

(12) United States Patent
LaPant

(10) Patent No.: US 7,206,720 B2
(45) Date of Patent: Apr. 17, 2007

(54) COMPUTER-CONTROLLED AUXILIARY FUEL TANK SYSTEM WITH MULTI-FUNCTION MONITORING SYSTEM AND USER CALIBRATION CAPABILITIES

(76) Inventor: Todd LaPant, 1892 Crech Hollow Dr., Chico, CA (US) 95928

( * ) Notice: Subject to any disclaimer, the term of this patent is extended or adjusted under 35 U.S.C. 154(b) by 147 days.

(21) Appl. No.: 11/066,127

(22) Filed: Feb. 24, 2005

(65) Prior Publication Data

US 2006/0190149 A1    Aug. 24, 2006

(51) Int. Cl.
*G06F 11/30*    (2006.01)
*F02M 65/00*    (2006.01)

(52) U.S. Cl. ............ 702/182; 702/100; 701/123; 73/119 A

(58) Field of Classification Search ............ 702/55, 702/100, 113, 149; 73/119 A, 117.2; 701/30, 701/31, 34, 123, 124
See application file for complete search history.

(56) References Cited

U.S. PATENT DOCUMENTS

| | | | |
|---|---|---|---|
| 4,107,777 A | | 8/1978 | Pearson |
| 4,200,064 A | * | 4/1980 | Engele ............ 123/674 |
| 4,350,880 A | * | 9/1982 | Quintilian ............ 235/96 |
| 4,591,115 A | | 5/1986 | DeCarlo |
| 4,625,822 A | * | 12/1986 | Nakamura et al. ........ 180/415 |
| 4,672,842 A | | 6/1987 | Hasslemann |
| 4,714,998 A | * | 12/1987 | Bussey et al. ............ 701/99 |
| 4,782,699 A | | 11/1988 | Gonze |
| 4,817,568 A | | 4/1989 | Bedford |
| 4,827,762 A | | 5/1989 | Hasslemann |
| 4,834,132 A | | 5/1989 | Sasaki |
| 4,926,331 A | * | 5/1990 | Windle et al. ............ 701/35 |
| 4,951,699 A | | 8/1990 | Lipman |
| 5,172,007 A | | 12/1992 | Lumetta |
| 5,426,971 A | | 6/1995 | Glidewell |
| 5,548,713 A | | 8/1996 | Petry |
| 5,550,737 A | * | 8/1996 | Tedeschi ............ 701/31 |
| 5,555,498 A | | 9/1996 | Berra |
| 5,555,873 A | | 9/1996 | Nolen |
| 5,592,923 A | | 1/1997 | Machida |
| 5,678,521 A | * | 10/1997 | Thompson et al. ......... 123/447 |
| 5,679,890 A | | 10/1997 | Shinohara |
| 6,405,744 B1 | * | 6/2002 | LaPant ............ 137/1 |
| 6,691,023 B2 | | 2/2004 | Fujino |
| 2003/0060949 A1 | * | 3/2003 | Letang et al. ............ 701/29 |
| 2003/0233206 A1 | | 12/2003 | White |
| 2004/0111210 A1 | | 6/2004 | Davis |
| 2005/0115314 A1 | * | 6/2005 | Meagher ............ 73/290 B |

\* cited by examiner

FOREIGN PATENT DOCUMENTS

JP    2003042000 A    \*    2/2003

*Primary Examiner*—Manuel L. Barbee
(74) *Attorney, Agent, or Firm*—Eric Hanscom

(57) ABSTRACT

This invention is directed toward a computer-controlled auxiliary fuel tank system that works with both gas and diesel-fueled vehicles, and can operate independently, or in combination with an auxiliary fuel tank, auxiliary fuel pump, sending unit, check valves, inlet and outlet fuel lines, wiring harness, computer module, auxiliary emissions canister assembly, vehicle installation means, and LCD and LED display devices. The invention is not dependent upon any other computer systems and is fully transparent to any on-board systems. In addition to overseeing the transfer of fuel from the auxiliary tank to the OEM tank, the fuel monitoring system (FMS) monitors a variety of functions of the vehicle, and from that data can calculate and display a wide range of information for the user, and is fully user calibratable. The invention not only warns of low fuel situations, but also provides a wide range of diagnostic tools to analyze and display problems with the fuel system.

23 Claims, 103 Drawing Sheets

COMPUTER-CONTROLLED AUXILIARY FUEL TANK SYSTEM WITH MULTI-FUNCTION MONITORING SYSTEM AND USER CALIBRATION CAPABILITIES

STATEMENT REGARDING FEDERALLY SPONSORED RESEARCH OR DEVELOPMENT

This invention was not federally sponsored.

CROSS REFERENCE TO RELATED APPLICATIONS

None.

BACKGROUND OF THE INVENTION

This invention is directed toward a computer-controlled fuel system monitor that works with both gas and diesel-fueled vehicles, and can operate independently or in combination with an auxiliary fuel tank, auxiliary fuel pump, sending unit, check valves, inlet and outlet fuel lines, wiring harness, computer module, auxiliary emissions canister assembly, vehicle installation means, and LCD and LED display devices. The invention is not dependant upon any other computer systems and is fully transparent to any on-board systems. In addition to overseeing the transfer of fuel from the auxiliary tank to the OEM tank, the fuel monitoring system (FMS) monitors a variety of functions of the vehicle, and from that data can calculate and display a wide range of information for the user, and is fully user calibratable. The invention not only warns of low fuel situations, but also provides a wide range of diagnostic tools to analyze and display problems with the fuel system.

1. Field of the Invention

This invention describes a new device in the field of fuel systems, specifically both gasoline and diesel fuel control systems which are user-calibratable for many classes of vehicle makes and models. The invention is a computer module which monitors the fuel system and also provides on-board diagnostic (OBD) capabilities. The system is designed to work with both new and used main fuel systems, can provide OBD capability to either system, can be either sold with new vehicles or retrofitted on used vehicles, and is usable as a "stand alone" component or in combination with an auxiliary fuel tank, auxiliary fuel pump, sending unit, check valves, inlet and outlet fuel lines, wiring harness, computer module, auxiliary emissions canister assembly, vehicle installation means, and LCD and LED display devices.

Vehicles have had on-board computer controlled vehicle subsystems to control various vehicle components such as engine, ignition, transmission, brake, and suspension systems. Due to the complexity and inter-relationship between some of these vehicle systems, buses, or other on-board computer communication systems, have been developed to enable data and control signals to be passed between particular vehicle computers. Because of the heavy reliance on such on-board computers, combined with the variety of system types employed by the various automobile manufacturers, vehicles sold in the United States now are required to provide a standardized diagnostic interface to facilitate compatibility with standardized diagnostic scan tools.

As society becomes increasingly comfortable with computers, there has been an ever-growing push toward allowing humans to modify computer-driven systems to their own tastes. This trend has not been lost upon the automobile industry, which has been using computer-controlled systems to run various portions of vehicles for decades. Over the years, it has become apparent that it is also desirable to have a computer-controlled device which notifies the owner of vehicle troubles and when certain components, such as air and oil filters, need to be replaced. While modern "must haves" such as personal digital assistants and customizable cells phones have become commonplace throughout most of the modern world, such hands-on technology has only recently become available for vehicle operators. With the current invention, it is now possible for a vehicle owner to customize what information he/she receives about the performance of the vehicle, and allows the user much greater access to more accurate information than ever before, in addition to monitoring and overseeing the transfer of fuel from an auxiliary fuel tank to a main tank. The invention was developed to meet this long-felt need.

2. Background Art

The prior art teaches a number of fuel transfer systems. For example, U.S. Pat. No. 4,834,132 to Sasaki, for a Fuel Transfer Apparatus, describes a fuel transfer system for transferring fuel from a first sump to a second sump formed in a vehicle fuel tank. The prior art also provides several examples of multiple fuel systems which have the capability of switching not only from one tank to another, but also one fuel to another, for example, U.S. patent application Ser. No. 2004/0111210 to Davis, U.S. Pat. No. 4,817,568 to Bedford and U.S. patent application Ser. No. 2003/0233206 to White. U.S. Pat. No. 4,951,699 to Lipman for a Fuel Transfer System with Aspirator, shows a device and system to transport fuel from the interior portion of a fuel tank to another tank by automatic siphon action. An aspirator that evacuates air and fuel vapor from the siphon by the flow effect of the return fuel through a Venturi or reduced diameter portion of the return fuel line initiates the siphon. There is also prior art on the computer monitoring of liquid changes in a storage tank, as illustrated by U.S. Pat. Nos. 4,827,762 and 4,672,842 to Hasselmann, and on using computers to monitor the movement of fuel from a storage tank to a vehicle, as in U.S. Pat. No. 4,107,777 to Pearson. Diagnostic systems for vehicles have also been developed, including U.S. Pat. No. 5,679,890 to Shinohara and U.S. Pat. No. 6,691,023 to Fujino.

There are numerous patents which teach methods to provide special devices for verifying the operation of a data processing system. Some systems include separate maintenance or auxiliary processing units for testing different subsystems during normal operation or during a test mode of operation. The prior art also shows systems which include an internal testing capability integrated within the processing units of a system for establishing a certain level of operability. An example is seen in U.S. Pat. No. 5,548,713 to Petry which describes an on-board diagnostic testing apparatus which can test a processing unit in a system, and which also is usable in a factory test environment.

The ability of a system to communicate diagnostic test results are also known. Berra et al, in U.S. Pat. No. 5,555,498 describes a circuit and method for interfacing vehicle controller and diagnostic test instruments. An adapter is provided which permits the use of present diagnostic tools with newer ISO9141-equipped engine and transmission controllers. The adapter facilitates bidirectional communication while conditioning the signals entering and exiting the adapter.

Machida et al, in U.S. Pat. No. 5,592,923, describe diagnosis apparatus for treating fuel vapor of an engine, in which the fuel vapor in a fuel tank is once adsorbed and trapped in a canister and is then supplied to the intake system of an engine, wherein various valves are so controlled that a predetermined pressure condition is established in a passage for supplying the fuel vapor, and the various valves are diagnosed to determine whether they are defective or not, based upon pressure measurements against a norm.

The prior art also discusses difficulties in obtaining low cost, accurate, and repeatable fuel level measurement systems. A float-level sensor, including an immersed resistive sender element, has become a common standard, but it is known to be subject to effects of contact corrosion associated with various additives in the fuel. Gonze, in U.S. Pat. No. 4,782,699, combats alcohol-caused corrosion by applying a 1-millisecond current pulse to the detector once a minute. In U.S. Pat. No. 5,172,007, Lumetta describes the problems associated with these common senders when immersed in so-called "flexible fuels" being developed for reduced hydrocarbon emissions. His specific solutions have been shown to be effective with M-85 (85% methyl alcohol and 15% gasoline) fuel when switched between 100 Hz and 15 kHz, but nothing is taught regarding more common gasoline fuels incorporating modern additives.

The industry has also recognized the desirability of having reliable methods of transferring fuel from one tank to another. U.S. Pat. No. 4,591,115 to DeCarlo teaches a fuel supply balance system for a helicopter. DeCarlo's invention supplies a method by which fuel from a larger tank can be transferred automatically to a small tank upon detection of a low fuel supply in the smaller tank. The invention also describes how it can be used to transfer a predetermined quantity of fuel between selected tanks by timed operation of a constant delivery pump when the invention is used in non-automatic, manual mode. While the theory and mechanism of transferring fuel from one tank to another is similar in some ways to the current invention, the helicopter fuel supply balance system does not provide for nearly as much user control and feedback as does the current invention.

Another fuel-transferring invention is found in U.S. Pat. No. 5,555,873 to Nolen. This invention offers a method by which fuel is transferred from one tank to another when the parking brake is applied. As both the parking brake annunciator (light or audible device) and the pneumatic pressure system are independent of the primary service brake system in large vehicles, the apparatus receives a signal from the parking brake system to switch tanks automatically with no intervention required or allowed by the driver. Thus, while this invention does offer a unique method of the timing of when fuel is transferred, it does not propose the substantial amount of user calibration and modification allowed by the current invention.

U.S. Pat. No. 5,426,971 to Glidewell, et. al. is another patent dealing with sensors placed upon a fuel system. Glidewell's invention focuses on an on-board diagnostic system for determining the presence of vapor in a fuel supply line of an engine during driving. The sensor is mounted to the fuel supply line for sensing transient fuel pressure saves resulting from actuation of one or more fuel injectors. This patent, however, is limited to detecting fuel line vapor and does not cover the broader spectrum of engine and fuel system variables discussed by the current patent.

While many components of an effective system to monitor the transfer of fuel from one tank to another and effectuate the same have been produced, a means of doing so and providing key data on the system and fuel supply has been lacking.

A patent which attempted to solve many of the aforementioned problems was U.S. Pat. No. 6,405,744 to LaPant. This patent taught a computer-controlled auxiliary fuel system which monitors and controls the on-board transfer of fuel from an auxiliary fuel tank to a main OEM fuel tank, and monitors the fuel system. While this patent provided a suitable means of overseeing the transfer of fuel and performed some basic monitoring services on the fuel system, it did not address a number of problems which have been resolved by the current invention, including having a "stand alone" monitoring system which can operate independently or in combination with an auxiliary fuel tank system. Such improvements made by the current invention include having the system full calibratable by the user, having the fuel monitoring system (FMS) monitor more aspects of the fuel system and engine, being fully transparent to any on-board computer system, not relying on any in-line flow meter in any fuel line, providing warnings when the user is running low on fuel or in need of servicing or replacement of parts, and calculating and displaying a number of pieces of data, all under the control of the user and all calculable on a "snapshot", short-term or long-term basis, including miles per gallon, miles per hour, gallons per mile, fuel, fuel %, current speed, revolutions per minute, time traveled, distance traveled, time to empty, distance to empty, fuel cost, and average $/gallon.

Thus there has existed a long-felt need for a system which can not only oversee and direct the transfer of fuel from one tank to another on a vehicle, but also compute a number a different pieces of data, relating to speed, mileage, and expected maintenance, and have the system be programmable and controllable by a non-computer expert user.

The current invention provides just such a solution by having a computer-controlled fuel monitoring system that works with both gas and diesel-fueled vehicles, and can operate independently, or in combination with an auxiliary fuel tank, auxiliary fuel pump, sending unit, check valves, inlet and outlet fuel lines, wiring harness, computer module, auxiliary emissions canister assembly, vehicle installation means, and LCD and LED display devices. The invention is not dependant upon any other computer systems and is fully transparent to any on-board systems. In addition to overseeing the transfer of fuel from the auxiliary tank to the OEM tank, the fuel monitoring system (FMS) monitors a variety of functions of the vehicle, and from that data can calculate and display a wide range of information for the user, and is fully user calibratable. The invention not only warns of low fuel situations, but also provides a wide range of diagnostic tools to analyze and display problems with the fuel system.

SUMMARY OF THE INVENTION

The invention provides a device which coordinates activities between one or more auxiliary fuel sources as original equipment with new vehicles, or as an aftermarket addition to an older vehicle. The invention controls and monitors each fuel system and their associated fuel displays. Fuel levels in each tank are balanced, diagnostic data is obtained from the performance of each system, and corrective actions including operator warnings are given. Although the original equipments may have their own computer controlled diagnostic capabilities, the auxiliary computer runs standard tests on all fuel systems, and is a stand-alone system which is transparent to any OEM system which came with the vehicle.

The invention can function as a "stand alone" device on an existing fuel system, or as part of an auxiliary fuel system, comprising an auxiliary fuel tank, having an auxiliary fuel pump, a sending unit, check valves, supply and return fuel lines, a wiring harness, a computer module which is user calibratable and capable of measuring a wide variety of data items, an auxiliary emissions canister assembly, vehicle installation means, and a liquid crystal display (LCD) device. In a typical installation in a pickup truck, the main original equipment manufacturer (OEM) fuel tank is sized around 30 gallons. The Auxiliary Fuel Tank is typically a 30-gallon tank that is mounted at the head of the pickup box. The computer module is mounted on the dash. The Auxiliary emissions canister assembly is mounted near the OEM emissions canister assembly. The pump/sender is mounted in the Auxiliary tank. The wire harness routes from the computer module to the Auxiliary pump/sender, to the OEM pump/sender, to the fuel injector signal, to the vehicle speed sensor, to 12-volt power, and to chassis and OEM computer ground. The system functions as a computer-controlled balance line, such that the levels in each of the fuel tanks remain approximately equal. The computer monitors the entire system on a regular basis. During each loop, the fuel levels of the OEM and the Auxiliary tanks are determined. The Liquid Crystal Display (LCD) will indicate the gallons in the OEM tank, the gallons in the Auxiliary tank, the total gallons in the system, numerous other data items, and the status of the system. The computer will also adjust the OEM fuel gauge accordingly and send warning signals if the inventions' diagnostic capabilities detect a problem.

The Auxiliary fuel system of this invention also includes diagnostic capabilities. This system detects multiple problems that occur upon installation and during normal use. When a problem occurs for a set period of time the computer will detect the problem and display the Diagnostic Trouble Code (DTC) associated with that problem on the LCD.

The No Flow Problem is set if the auxiliary pump is turned ON, and the fuel level in the auxiliary tank has not decreased and the fuel level in the main tank has not increased within a predetermined amount of time. This condition may indicate a crimped line, a malfunctioning pump, or a broken wiring connection.

It is a principal object of the invention to provide a device by which the fuel levels of both an OEM and an auxiliary fuel tank can be monitored.

It is an additional primary object of the invention that the fuel monitoring system be operable as either a stand alone unit or in combination with an auxiliary fuel tank and associated hardware.

It is an additional object of this invention to provide a computer controlled auxiliary fuel system, which is compatible with a vehicle's existing main fuel system.

It is another object of this invention to provide a computer-controlled auxiliary fuel system, which is transparent to the main fuel system's computer.

It is a further object of this invention to provide a computer-controlled auxiliary fuel system, which includes self-diagnostic capabilities.

It is another object of this invention to provide a computer-controlled auxiliary fuel system that is useable in both original equipment and after-market applications.

It is yet another object of this invention to provide a means of measuring a standard fuel level sender with repeated accuracy by use of a computer-controlled system.

Further objects of this invention include the provision of a reliable computer controlled auxiliary fuel system which may be inexpensively manufactured, is structurally rigid and safe, and can be easily installed in both current and older model vehicles.

It is another object of the invention that the fuel monitoring system (FMS) can be fully calibrated by the user, where the user is not necessarily a computer expert.

It is an additional object of the invention that this calibration can be done by the user with only the materials supplied with the invention.

It is a further object of the invention that the FMS can be programmed for each specific make, model and year of vehicle to enhance the speed with which a user can make and use the invention.

It is also an object of this invention that the FMS system function through its monitoring of the rise and fall of one fuel injector, and extrapolate from this information the amount of fuel a vehicle is using on a "snapshot" basis, as well as short-term and long-term time periods.

It is a further object of this invention that the FMS can calculate the revolutions per minute (RPM) of a vehicle's engine based on the rise and fall of one fuel injector.

It is an additional object of the invention that the FMS can function without depending upon or communicating with any on-board OEM computer, such that it is fully transparent to any on-board system.

It is a further object of the invention that the FMS be able to calculate vehicle speed and distance traveled by counting the pulses form the OEM vehicle speed sensor.

It is also an object of the invention that the FMS be able to measure the level of fuel in the OEM fuel tank through values received from the OEM fuel sending unit.

It is a further object of the invention that the FMS allows the user of the invention to automatically calibrate the fuel injector, odometer, and OEM fuel tank.

It is a further object of the invention that the FMS allows the user to manually adjust the fuel injector, odometer, OEM fuel tank, and OEM fuel gauge.

It is another object of the invention that the FMS should work with nearly all fuel-injected vehicles with digital speed sensors.

It is a further object of the invention that the FMS can work with both gas and diesel engines.

It is also an object of the invention that the FMS can function without reliance upon any type of a flow meter in any fuel line.

It is a further object of the invention that the diesel version of the invention can function by measuring the fuel rail pressure, thereby compensating for fuel used due to pressure variations in the fuel.

It is also an object of the invention that the FMS can be calibrated to display a higher resolution than the OEM built-in trip computer.

It is a further object of the invention that the user has the ability to enter a price per gallon paid for fuel, and the FMS can calculate the cost under a variety of parameters, including but not limited to price per mile, price per trip, and price per unit time the vehicle is driven.

It is also an object of the invention that the FMS can display for the user a number of features not found in traditional OEM in-board computer systems, including but not limited to: Fuel System (gallons, fuel, fuel %, status), Current (speed, RPM, GPH, MPH), Key On (time, distance, MPG, GPH, MPH, time to empty, distance to empty), Trip (time, distance, MPG, GPH, MPH, time to empty, distance to empty, fuel cost), Total (time, distance, MPG, GPH, MPH, time to empty, distance to empty, fuel cost, average $/gal).

It is an additional object of the invention that the FMS can also interface with an OEM duel tank system to monitor fuel levels in each tank.

It is also an object of the invention that the FMS can control the transfer of fuel from an auxiliary tank to the main OEM tank.

It is a further object of the invention that the user of the invention can program the FMS such that the FMS will notify the user when it determines that the vehicle is in need of a part replacement based on the number of gallons used, such parts including but not limited to oil filters, air filters, fuel filters.

It is an additional object of the invention that the user of the invention can program the FMS to inform the user of a large number of other factors relating to the fuel system and the vehicle.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention. The above and other objects, features, and advantages of the present invention will become more apparent from the following description, when making reference to the detailed description and to the accompanying sheets of drawings.

BRIEF DESCRIPTION OF THE FIGURES

The figures used to illustrate this invention are flow charts showing a function, or partial function, of the invention, starting with the key being turned on.

DETAILED DESCRIPTION OF THE INVENTION

Figure 58:
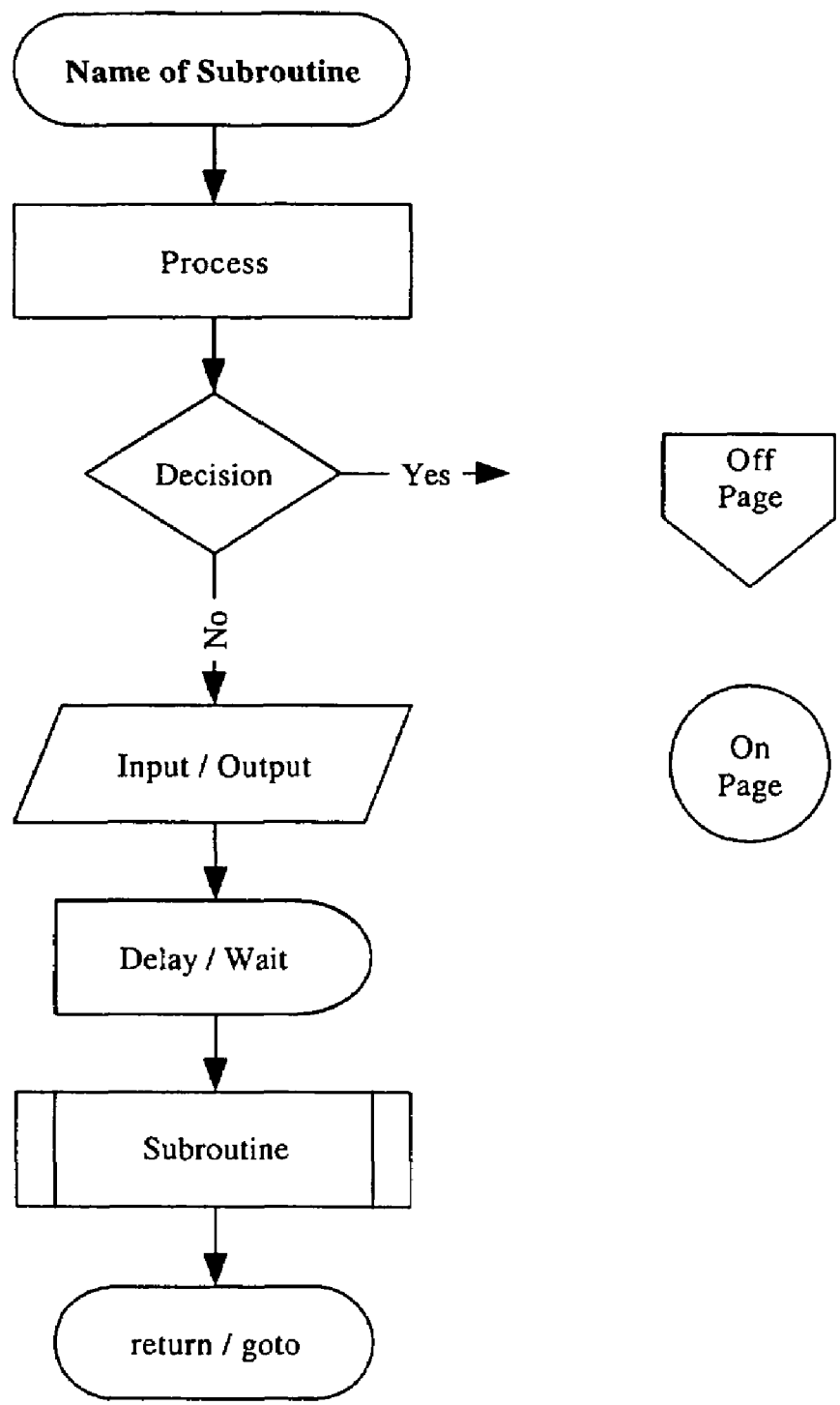
FIG. 58 is a key to the symbols used in the other flowcharts.

It should be noted that this invention is illustrated in part through a rather lengthy series of flowcharts, a key for which can be found in FIG. 58.

The invention combines a computer module with an auxiliary fuel system in a new and novel manner. The computer takes readings every couple of seconds from both the main and the auxiliary fuel tank, and assesses the overall operation of the fuel system. When it detects that the main fuel tank percentage is less than the auxiliary fuel tank percentage, the computer turns on the auxiliary fuel pump which transfers fuel from the auxiliary fuel tank to the main fuel tank. The auxiliary pump continues to transfer fuel until the percentage of the fuel in each tank is approximately equal. This helps to maintain balance in cases where the two fuel tanks are attached on different sides of the vehicle. An LCD display connected to the computer indicates the number of gallons in each the main and auxiliary fuel tanks, the total number of gallons in both tanks, and displays a wide assortment of fuel economy calculations including: miles per gallon, miles per hour, gallons per mile, fuel %, current speed, revolutions per minute, time traveled, gallons used, distance traveled, time to empty, distance to empty, fuel cost, and average cost/gallon. The computer will also adjust the OEM fuel gauge to represent the combined fuel level of the main and auxiliary tanks.

Most prior auxiliary tanks were controlled via a toggle switch, which the user activated to move fuel from one tank to another, just as in many vehicles with dual tanks as OEM equipment, the user switches between tanks with a toggle. With the current invention, however, as the computer oversees the transfer of fuel between the main and auxiliary tanks, there is no need for a toggle switch by which a user must manually cause the transfer of fuel from the auxiliary to the main fuel tank. The invention also provides for an anti-siphon apparatus and a return line, which, collectively, prevent the overflow of fuel into the main tank.

The invention can also usually be transferred from one vehicle to another of similar design which uses the same fuel, such as when an owner of an older model pickup truck wants to transfer the invention to a newer model. In such transfers, the computer system can be reprogrammed easily to take into account differences in OEM tank sizes, mileage, etc. This is a major advantage of the invention over the prior art, in that the user, once he or she buys the invention, can easily program it to specifically monitor the fuel system of a particular make and model or car; thus, when exchanging cars, the user can take the invention and install it on the newer car with minimal efforts. In some cases, the user can even transfer the invention between two vehicles that use different types of fuel. This change requires reprogramming the computer along with adding additional components to adjust to the different type of fuel and the attendant changes to the operational system caused by such a change, but still represents a major breakthrough compared to older systems.

In order to properly use the fuel monitoring functions of the invention, the user must calibrate it prior to use after it is installed. By depressing both buttons and starting the vehicle, the user can scroll through the following setup and calibration menus: DTC Screen, Diagnostic Screen, FMS Screen, Odometer Calibration, Odometer Adjustment, Injector Calibration, Injector Adjustment, Gauge Calibration, Fuel Tank Calibration, and Fuel Tank Adjustment. Once these setup and calibration steps have been completed, the invention is ready to use. The following is a brief description of each screen and its benefits to the functionality of the invention.

DTC Screen. The DTC Screen logs the occurrence of Diagnostic Trouble Codes related to the Main Tank, auxiliary tank, fuel gauge and aux fuel pump components. When a DTC occurs, the code description, time, and fuel levels are stored. Information for the last 10 DTCs is available. This information is for the manufacturers of the invention and will help them ascertain the problem(s) with the system. The information provided under this menu can be communicated verbally to the manufacturers, or written down and faxed, mailed, or sent by email for proper diagnosis.

Diagnostic Screen. This screen is used to output the raw data for the main tank, auxiliary tank, and gauge without filtering or averaging of readings. This information is useful for troubleshooting, calibrations, or checking the accuracy of the computer module.

FMS Screen. This menu has a number of submenus which allow the user to adjust the invention to his/her particular vehicle make, model, and engine. Submenus include:

1. AutoCal: This menu allows the computer module to automatically adjust the Injector Type and Injector Pulses settings when the engine is idling.
2. Injector Type. This menu has available values of HIGH or LOW, with a default value of LOW. Adjusting this setting gives the computer module the ability to correctly interpret the electrical signal coming from the fuel injector.
3. Injector Pulses. This menu has available values of 1, 2, or 4, with a default value of 1. Some injectors fire more than one time per engine revolution, and the FMS monitors the injector signal and uses the number of pulses to determine the engine revolutions per minute. The invention allows a user to determine if the injector pulse is correct by matching the OEM tachometer reading with the FMS reading. If the number of pulses is within 100 RMP, the user does not need to change the Injector Pulses setting.
4. Gauge Calibration. This menu has available values of OFF or ON, with a default value of OFF. The invention allows a user to customize the OEM fuel gauge. The default setting of "OFF" allows the OEM fuel gauge to operate normally by indicating the fuel level of the main fuel tank.
5. Gauge Direction. This menu has available values of "REV" or "NORM", with a default value of "NORM". The fuel tank sending unit reads the level of fuel left in a fuel tank, and transmits this information to the fuel gauge display. The fuel tank sending unit uses a variable resistor to indicate the fuel level, where most resistors have a higher resistance at "Full" than they do at "Empty", a pattern considered a "Normal" resistance pattern. Other resistors have a lower resistance at "Full" than they do at "Empty", which is considered a "Reverse" resistance pattern. This setting is automatically adjusted following the Fuel Tank Calibration and Fuel Tank Adjustment.
6. Total Reset. This menu allows the user to reset all fuel economy data once the computer module is calibrated or if the module is installed in a different vehicle.

Odometer

Odometer Calibration. The user can perform an odometer calibration to allow the FMS to property interpolate the Vehicle Speed Sensor signal. This calibration is accomplished by driving the vehicle at 60 mph for at least 60 seconds, during which the calibration occurs. The computer displays and records the number of pulses, which represents odometer calibration number.

Odometer Verification. The user can verify the Odometer Calibration by comparing a trip distance to the OEM odometer after a long trip of at least 100 miles. The following formula is used: $X=V(T/O)$, where $X$=New Odometer Calibration Value, $V$=Existing Odometer Calibration Value, $T$=FMS Trip Distance in Miles, and $O$=Vehicle Odometer Reading in Miles.

Odometer Adjustment. Once the X value, or New Odometer Calibration Value is determined, a user can enter the Odometer Adjustment menu and increment this value up or down by pushing the two buttons on the module up or down.

Fuel Injector

Injector Calibration. The user can calibrate the injector value after the initial installation to allow the FMS to property interpolate the vehicle's fuel injector signal. The user can retrieve model-specific injector calibration values from the manufacturer's website to assist in performing this calibration. To start the calibration, the user fills his/her gas tank as is normally done. Once the tank is full, the user enters the Injector Calibration menu, and starts the calibration process, which takes place over one complete tank of fuel. Once the user has used up as much fuel as possible, he/she refills the tank and records how many gallons of fuel were added to the vehicle, then enters this number into the computer module. The computer module uses the accumulated injector on time and the gallons used to calculate the injector calibration. This value is stored and displayed on the LCD.

Injector Verification. To verify the injector calibration, the user has two options. The first method is to repeat the steps taken in the initial injector calibration, and check to see whether the second injector value is within 2% of the first injector value. If the values are within 2% of each other, the user may accept this as an accurate injector value. If the values are greater than 2%, the user is asked to run the tests again and see if he/she gets a value within 2% of either of the previous values. If not, the user is directed to test the installation for potential problems.

The second method requires the user to monitor fuel consumption over a long distance, and then compare a manually-calculated miles per gallon to the value shown on the FMS. Using this method, the user starts with a full tank of gas and records the odometer setting to obtain a first reference point. The user then drives the vehicle using two or more tank of fuel, keeping accurate records of the number of gallons added with each fill-up. After driving for at least several hundred miles, the user should return to the gas station one last time and fill up the gas tank, recording both the final odometer reading and the number of gallons pumped into the tank. The user then uses the following formula to determine the percent difference:

$$D=(1-[(E-B)/G)/M])*100\%, \text{ where}$$

D=Percent Difference

E=Odometer reading at end of test period

B=Odometer reading a beginning of test period

G=Total number of gallons added during test period

M=MPG value recorded from the FMS Trip Information menu.

If the injector is calibrated correctly, the percent difference (D) should be zero. A higher value means that that injector is not calibrated correctly and should be adjusted, as the readings a user will get will be off by whatever percentage is shown by the percent difference (D).

If the user obtains a value above zero for (D), he/she needs to verify the injector calibration and adjust it according to the following formula:

$$X=V+(V*D/100\%), \text{ where}$$

X=New Injector Calibration Value
V=Existing Injector Calibration Value
D=Percent Difference calculated from the previous formula Injector Adjustment. A user of the invention can adjust the injector value, regardless of whether the injector value was determined via the injector calibration, verification, or from the manufacturer's website. By entering the Injector Adjustment menu, a user can incrementally adjust the value up or down and store the desired injector calibration valve.

Gauge Calibration. Should the user not be satisfied with the OEM gauge, he/she can customize the gauge calibration When the Gauge Calibration is started, the module displays 0 percent and the resistance currently stored for this gauge position. A user can adjust the resistance output until the needle of the OEM fuel gauge has moved to the desired position. This process is repeated for 32 positions on the OEM fuel gauge. The new calibration is enables by changing the GaugeCal setting to ON in the FMS Screen.

Fuel Tank Calibration. The user can automatically calibrate the fuel tank by entering the Fuel Tank Calibration menu when the tank is close to empty. The computer module prompts the user to enter the maximum capacity of the fuel tank. Next the module reads the current level of the sending unit and stores this value as "0 gallons Added". The user adds 1 gallon of fuel to the tank. The Select button is used to store the current fuel level and increment the number of gallons added to the tank. This process is repeated until the tank is full. The user presses the Set button to finish the Fuel Tank Calibration. The computer module shifts the data based on the number of gallons that were in the tank at the start of the calibration (tank capacity–gallons added). The results are stored in FLASH memory so that the module can accurately display the number of gallons in the tank. The gauge direction setting is automatically adjusted during this calibration.

Fuel Tank Adjustment. The user can manually adjust the readings in the tank table using the Fuel Tank Adjustment menu. This is desirable to enter data obtained from the manufacturer's website or to increase the accuracy of one or more positions in the table. First, the computer module prompts the user to enter the maximum capacity of the fuel tank. Next, the user can adjust the tank table starting at the 0 gallons position. When the user is finished, the modified tank table is saved and the gauge direction setting is automatically adjusted.

The computer module portion of the invention comprises an LCD display, a means of attachment to the dashboard of a vehicle referred to as a mounting bracket, a connection port, a fuse and two buttons, which allow the user to navigate the functions of the module. The standard display mode of the LCD will show the gallons of fuel in the OEM tank, the gallons of fuel in the auxiliary tank, the total gallons of fuel being monitored, and the operational status of the vehicle's fuel system. The operational status reflects what is going on with the vehicle's fuel system, and is updated every few seconds by the computer. Under normal operating conditions the operational status will flash "OK" every few seconds, and "PUMP ON" when fuel is being transferred from the auxiliary tank to the main tank.

By pushing the Select and/or Set buttons on the computer module, the user can navigate the Menus and Items, as outlined below.

Main Menus

Fuel System Status. The Fuel Systems Status shows the number of gallons available, the percentage of fuel available, and the current status of the fuel system If the vehicle has an auxiliary tank, the percentage is replace with the Aux gallons and Total gallons. While the status portion of the LCD display will normally show "OK" under normal operating conditions, should there be problems with the fuel system a Diagnostic Trouble Code (DTC) will be displayed. There are nine DTC codes:

MSG: Main Sender Ground, which means that the resistance from the main sender has dropped below a predetermined set point, approaching ground, for example, when the sending unit is malfunctioning or a wire has shorted to the ground.

MSH: Main Sender High, which means that the main sending unit resistance is above the normal operating range. Common causes of this are malfunctioning sender units or an inaccurate module calibration.

MSO: Main Sender Open, which refers to conditions where the main sender resistance indicates the maximum value, as occurs when the sender is defective or there is an improper electrical connection.

ASG, ASH, and ASO: Auxiliary Sender Ground, Auxiliary Sender High, and Auxiliary Sender Open are three points set in the same way as the OEM, but can have different predetermined set points.

NO FLOW: The No Flow DCT is set when the auxiliary pump in on, and after a set amount of time, the fuel level in the auxiliary tank does not decrease and the fuel level in the main tank does not increase. This condition is caused by kinked fuel lines, a defective pump, or bad electrical connections.

Current Information. Viewing the Current Information Menu allows a user to see the SPEED (current speed in miles per hour), TACH (tachometer reading in revolutions per minute), FUEL RATE (rate of fuel consumption in gallons per hour), and ECON (fuel economy in miles per gallon). These figures are "snapshot" figures which illustrate what is happening at that particular instant and are not averages over time.

Key On Information. The KeyOn has four submenus. All of the readings represent an average of data from the time the vehicle was started or "keyed on". The following information is calculated and displayed on these menus: TIME (time since vehicle was keyed on), DISTANCE (distance in miles that have been traveled since vehicle was keyed on), SPEED (average speed in miles per hour), ECON (average fuel economy in miles per gallon), FUEL RATE (average fuel consumption in gallons per hour), USED (total gallons of fuel consumed), TNK TO 'E' IN (distance to empty in miles, time to empty in minutes).

Trip Information. There are seven submenus within the Trip Information menu. The Trip Information functions average all data that has been collected along the trip, such that the user gets a reasonable overview of the performance of the vehicle during a trip. However, unlike the Key On Information menu, which automatically resets itself after every "key off", the Trip Information menu stores and averages all information from the time it is turned on until the time it is reset; thus this menu can be used to average performance and costs over a virtually unlimited number of driving cycles. Regardless of how frequently or infrequently the Trip Information menu is reset, the invention updates the Trip Information menu every second, averaging data as it refreshes. The following items are displayed under the Trip Information Menu: TIME (time since last reset), DISTANCE (distance measured in miles since last reset), SPEED (average speed measured in miles per hour), ECON (average fuel economy measured in miles per gallon) FUEL RATE (average fuel consumption rate measured in gallons per hour), USED (total gallons consumed), TNK TO 'E' IN (distance to empty in miles), TNK TO 'E' IN (time to empty in hours), COST (cost of fuel since last reset), $/GAL (price per gallon at refueling), ADJUST $/GAL (adjust cost of fuel), and RESET TRIP INFO (reset the trip information).

Total Information. There are four submenus within the Total Information menu, which measure various pieces of information starting from the time the invention was installed in the vehicle and turned on the first time. This menu is not normally reset so that the user has a complete history of the vehicle's performance. As with the other menus, information on this menu is refreshed and the values recalculated every second. The following items are calculated and displayed on the Total Menu: TIME (time since installation of the invention on the vehicle), DISTANCE (total distance traveled since installation in miles), SPEED (average speed in miles per hour), ECON (average fuel economy in miles per gallon), FUEL RATE (average fuel consumption in gallons per hour), USED (total gallons of fuel consumed), COST (total cost of fuel since installation), $/GAL (average price of fuel in dollars per gallon). If necessary, the user can reset the Total Information under the FMS Screen.

Basic Path Followed by FMS with Respect to Figures

The basic path followed by the FMS can be seen in the figures.

Figure 1A:
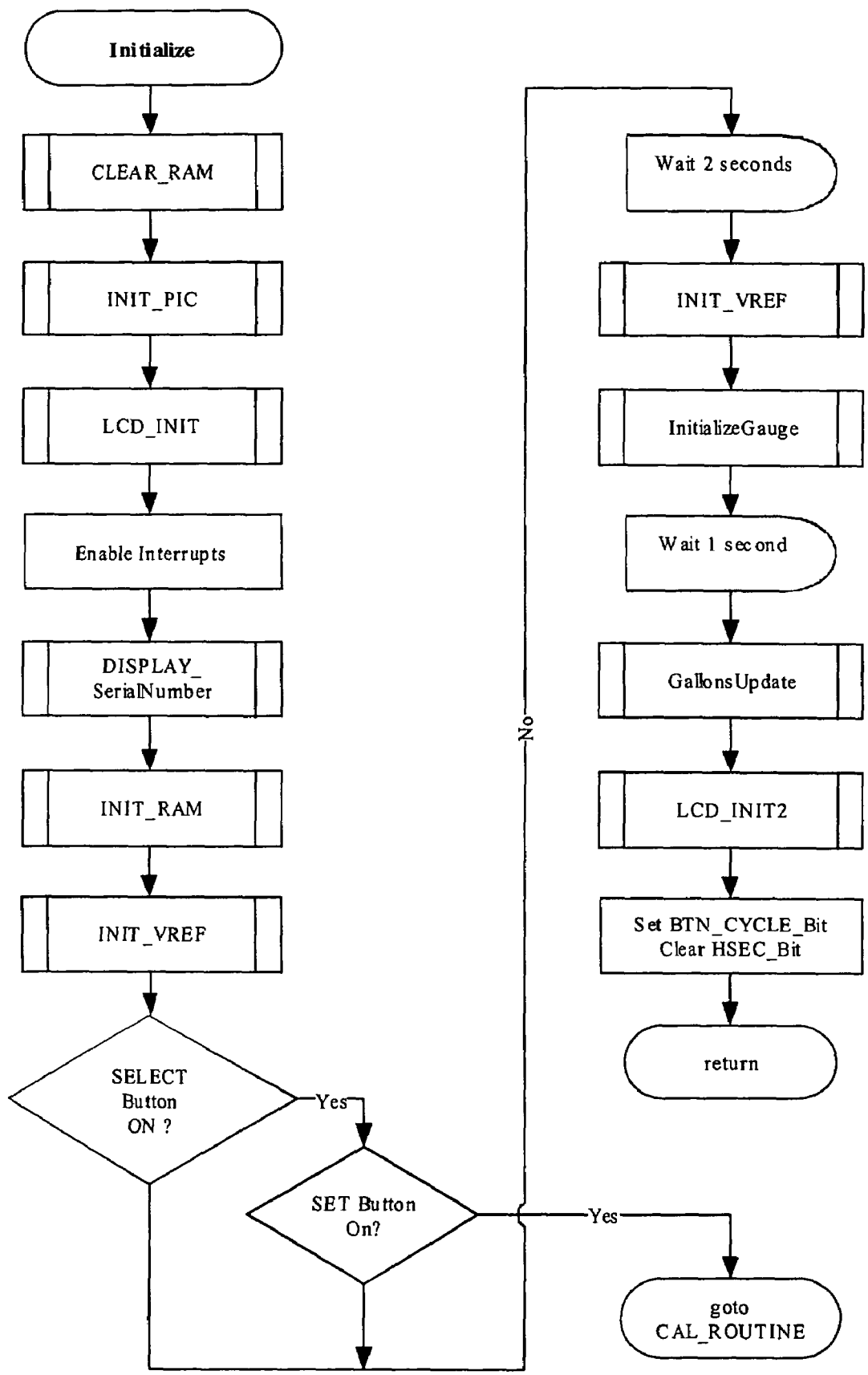
FIGS. 1a and 1b, Initialize and CLEAR_RAM, are flow charts illustrating the initial clearing of the random access memory (RAM) of the computer.
Figure 1B:
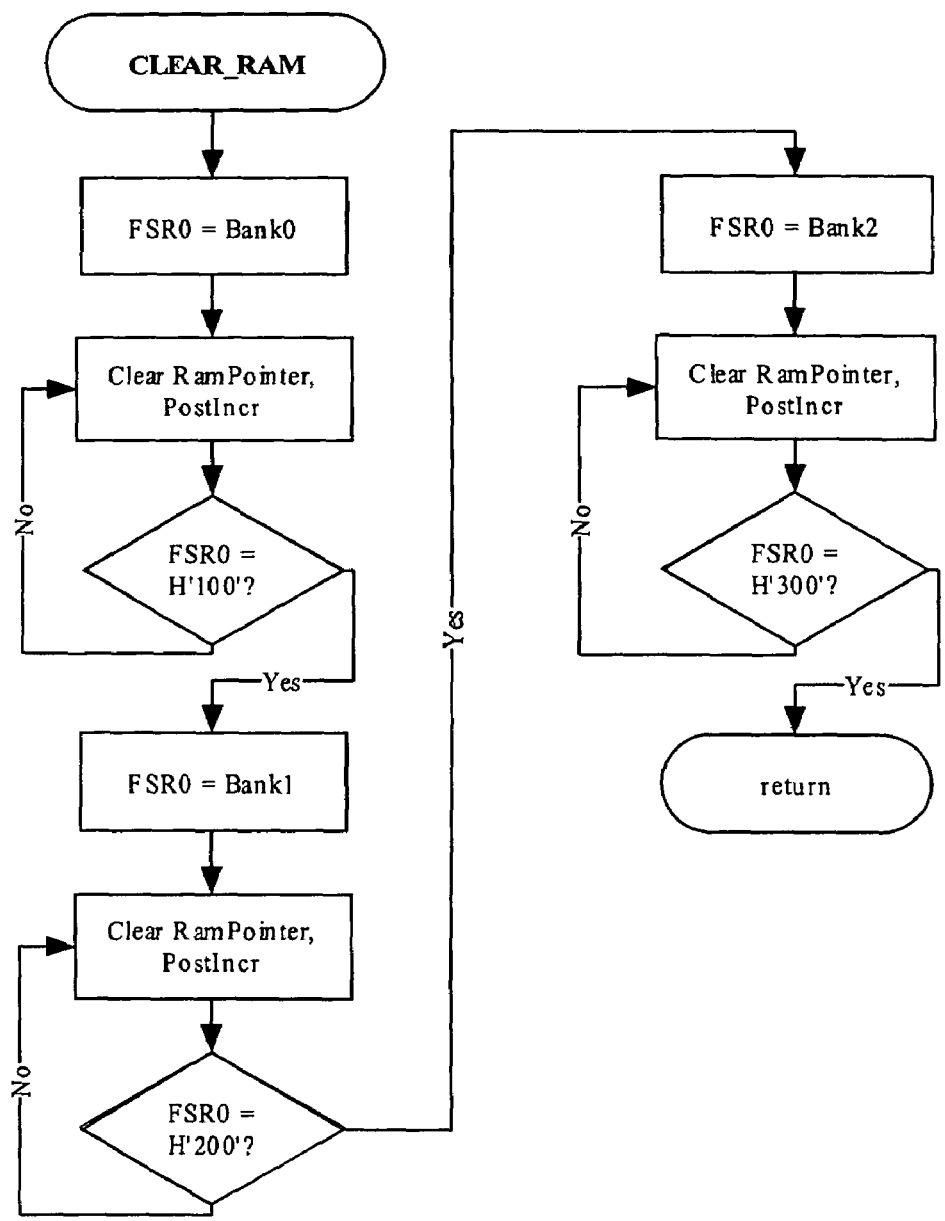
Figure 2:
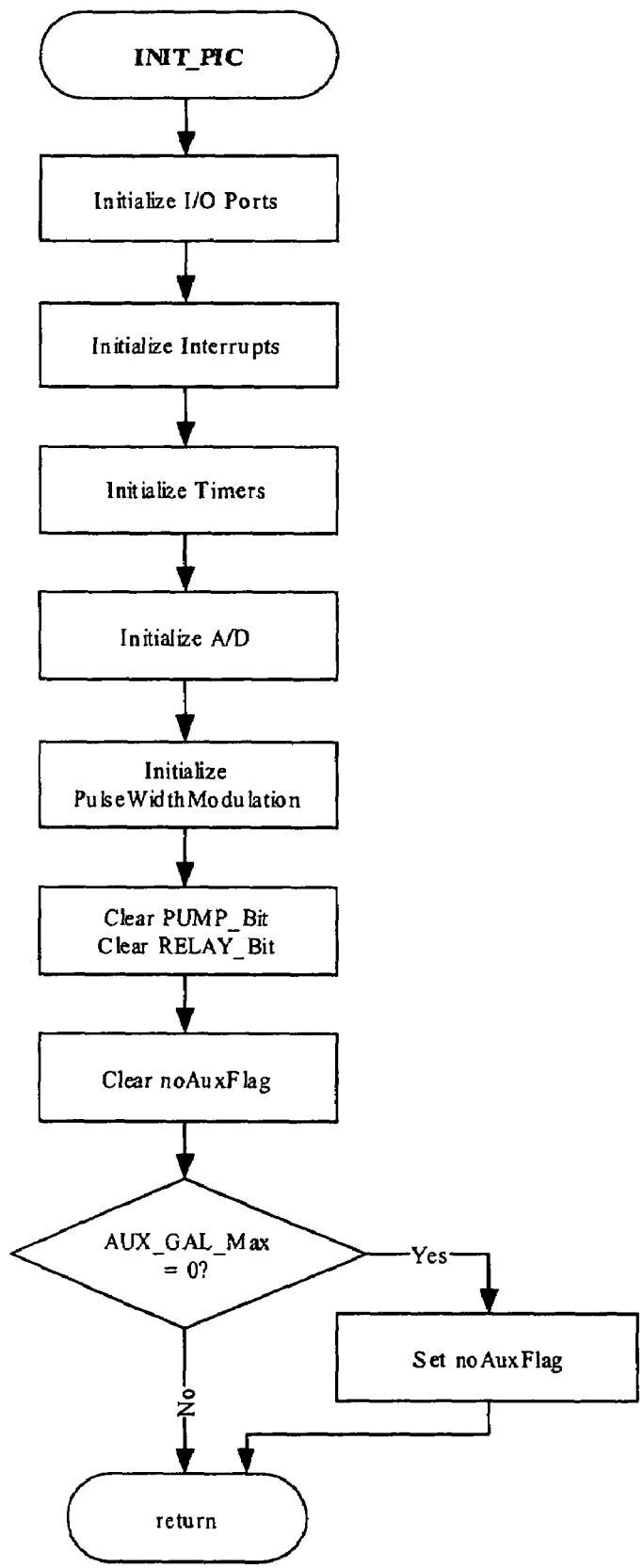
FIG. 2, INIT_PIC, is a flow chart illustrating the initialization actions taken to prepare the computer for taking and receiving measurements.
Figure 3:
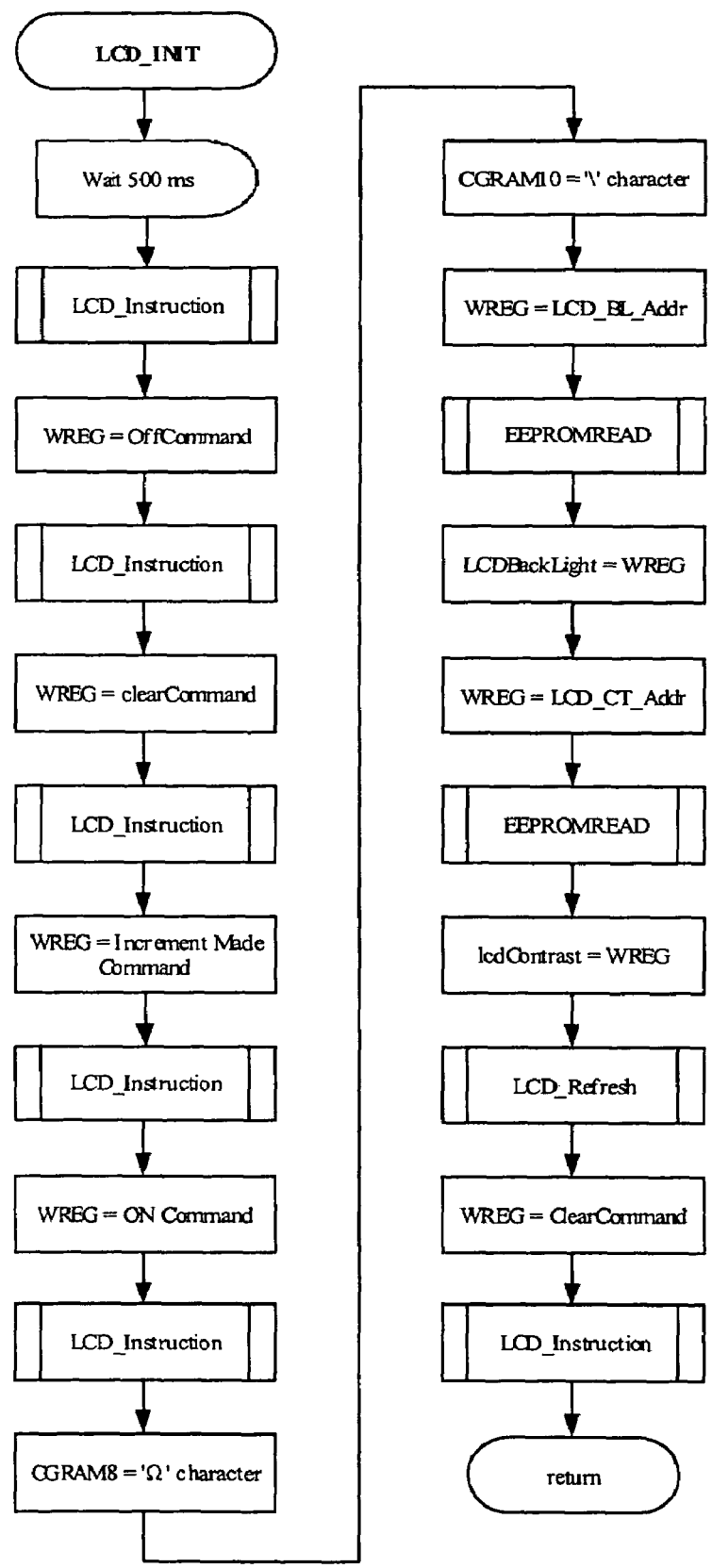
FIG. 3, LCD_INIT, is a flow chart illustrating the initialization actions taken on the LCD display.
Figure 4A:
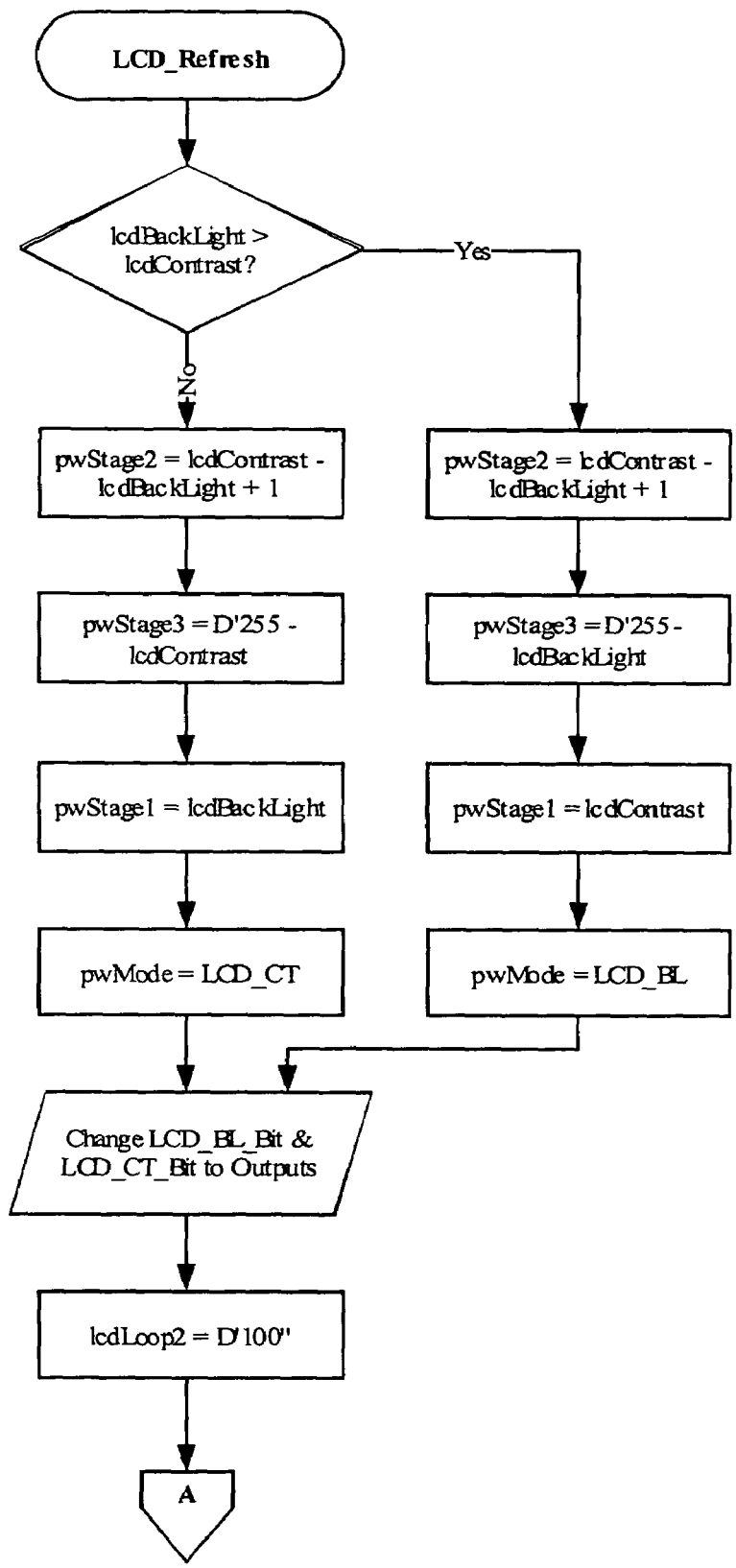
FIGS. 4a and 4b, LCD_Refresh, are flow charts illustrating the refreshing of the LCD display.
Figure 4B:
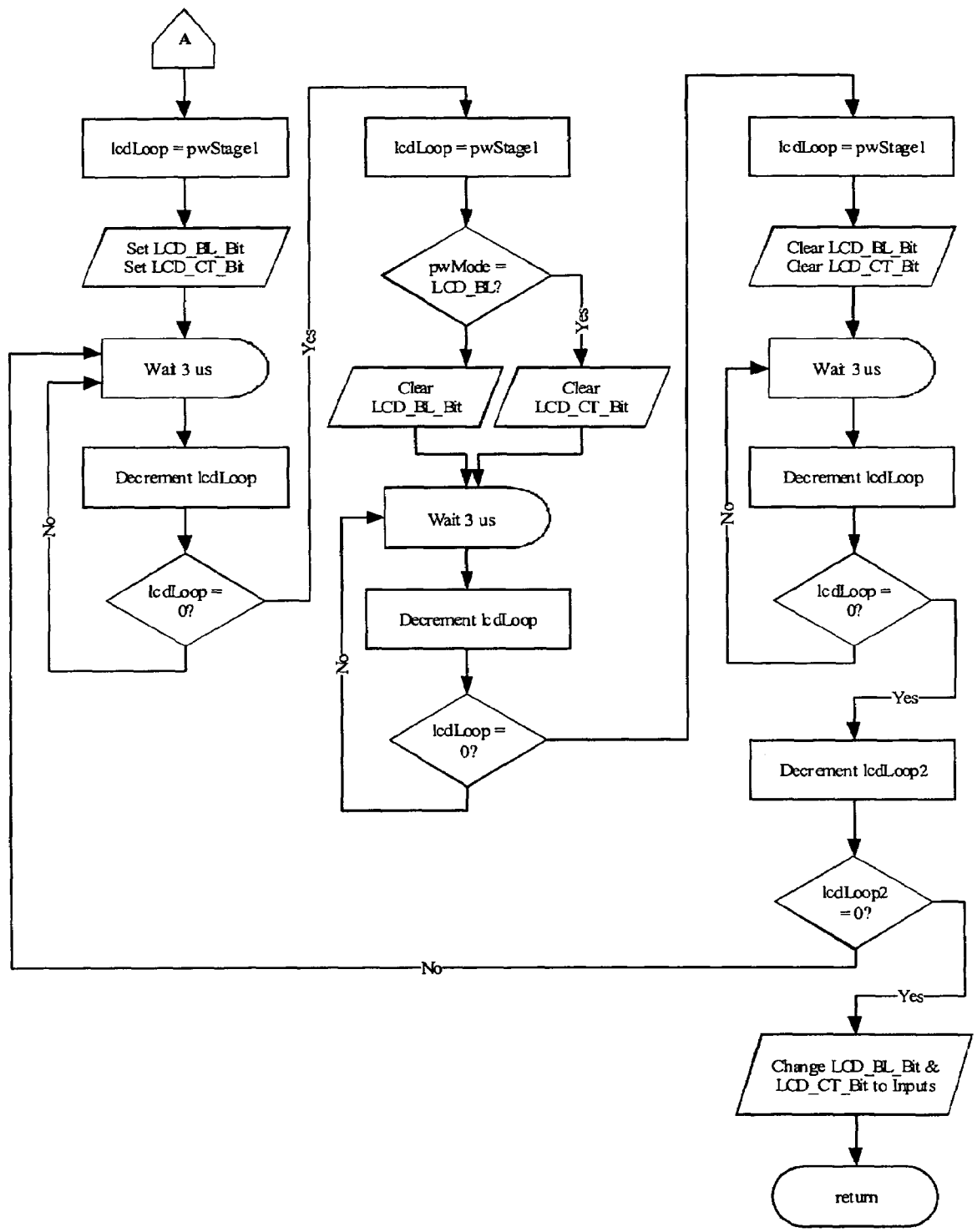
Figure 5:
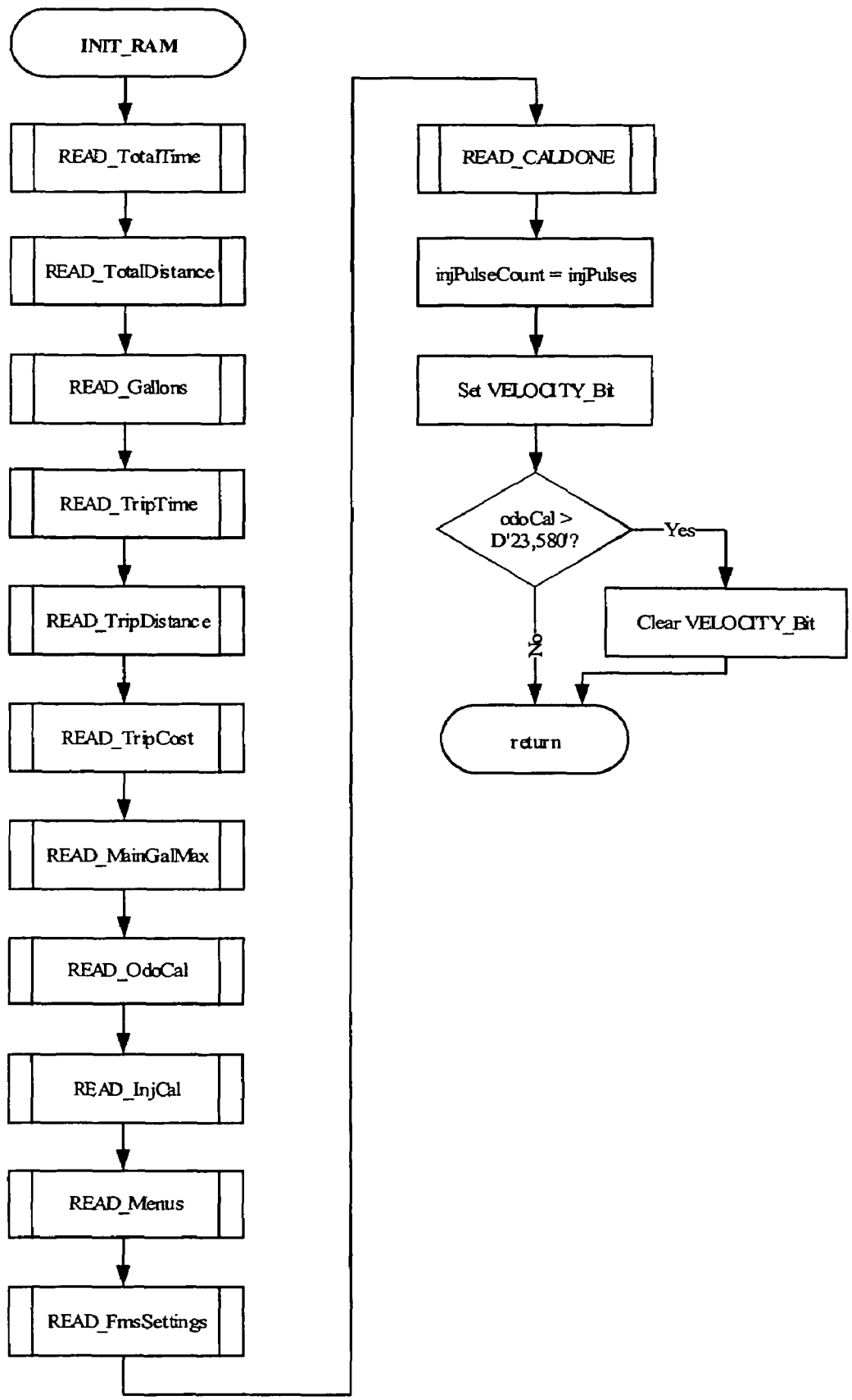
FIG. 5, INIT_RAM, is a flow chart illustrating the initialization of various data which have been stored in the computer's EEPROM.
Figure 6:
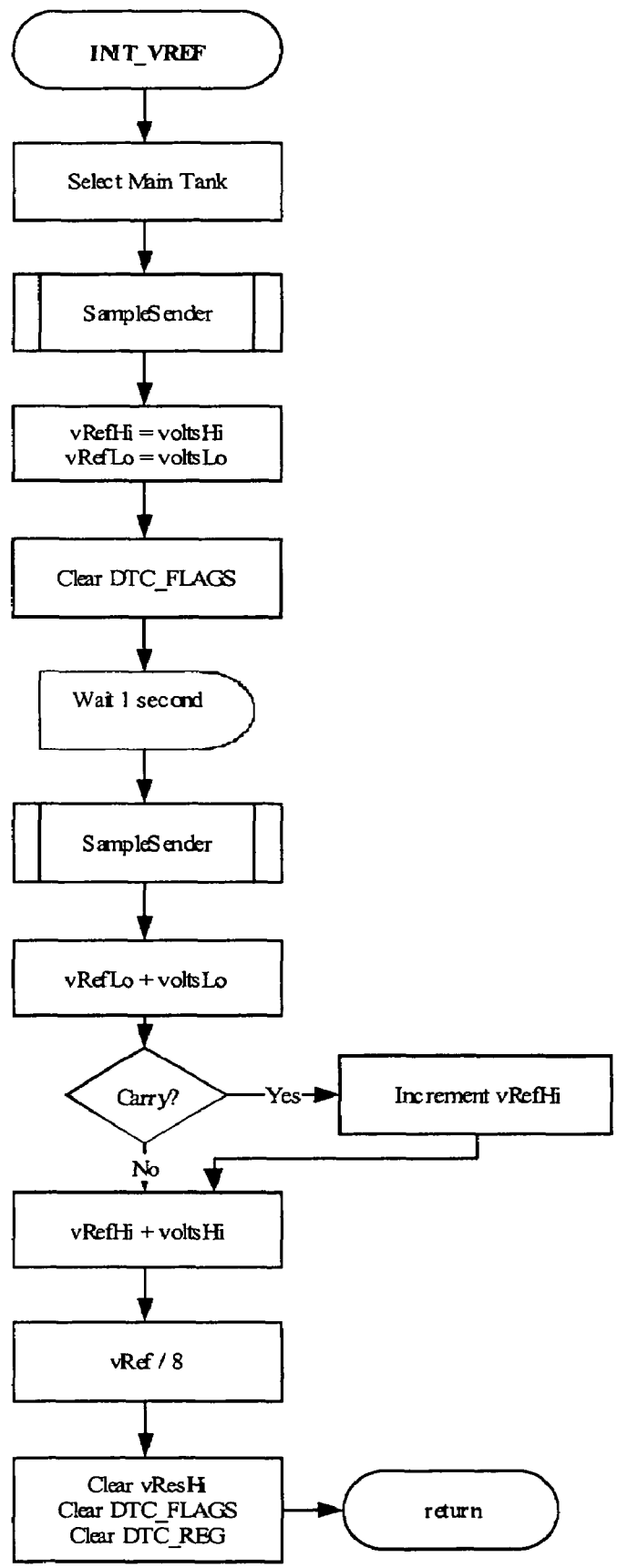
FIG. 6, INIT_VREF, is a flow chart illustrating the initial measurement of the reference voltage.

The FMS begins by clearing the RAM from the computer (FIGS. 1a and 1b) followed by initializing a number of timers, interrupts and other factors (FIG. 2). The invention proceeds to initialize the liquid crystal display (LCD) (FIG. 3), and refreshes the backlight and contrast levels of the LCD, as illustrated by FIGS. 4a and 4b. Following the initialization of the LCD, the RAM is initialized (FIG. 5), followed by a clearing of DCT and other flags (FIG. 6).

Figure 7:
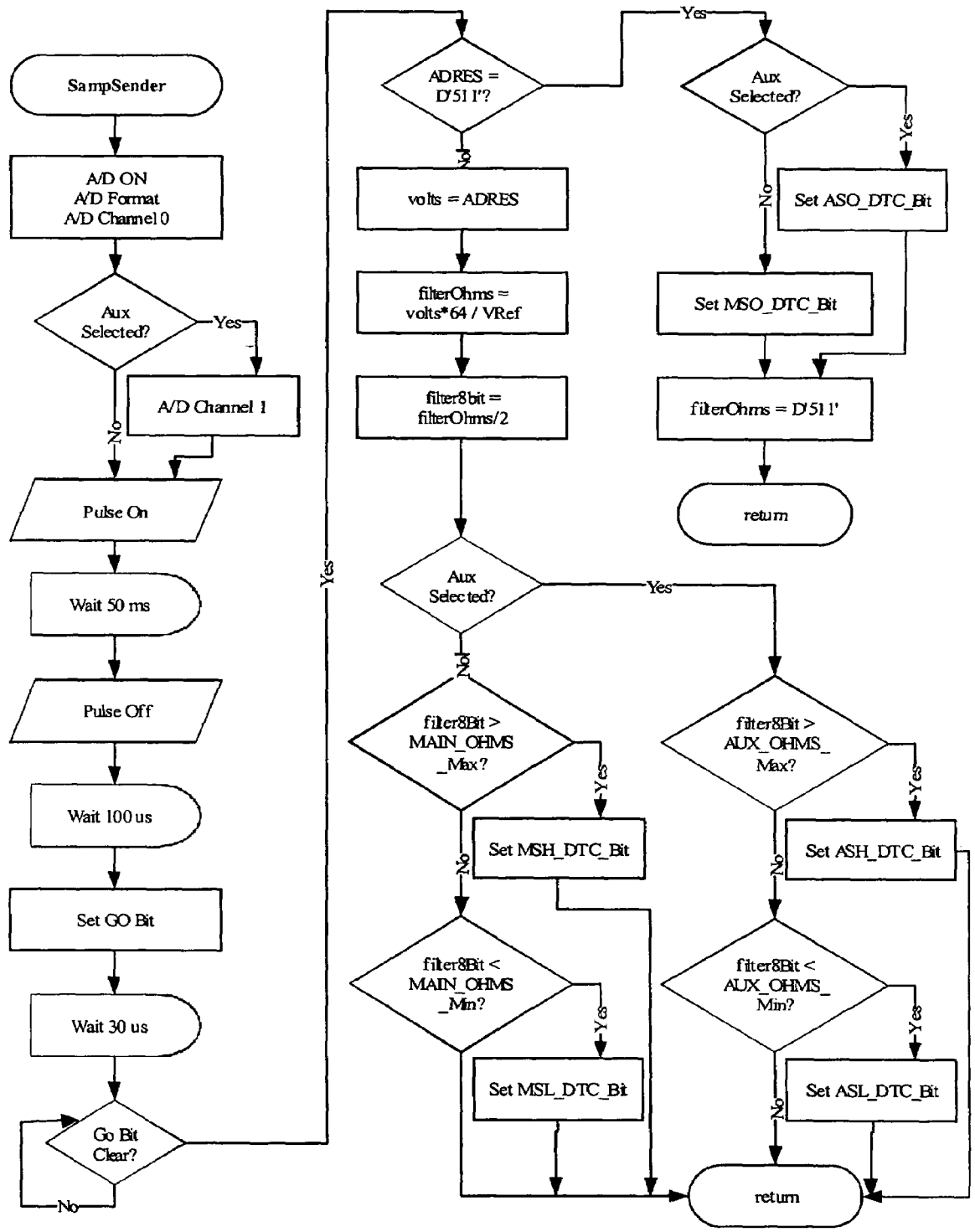
FIG. 7, SampleSender, is a flow chart illustrating how the resistance of the Main sending unit is measured.
Figure 13A:
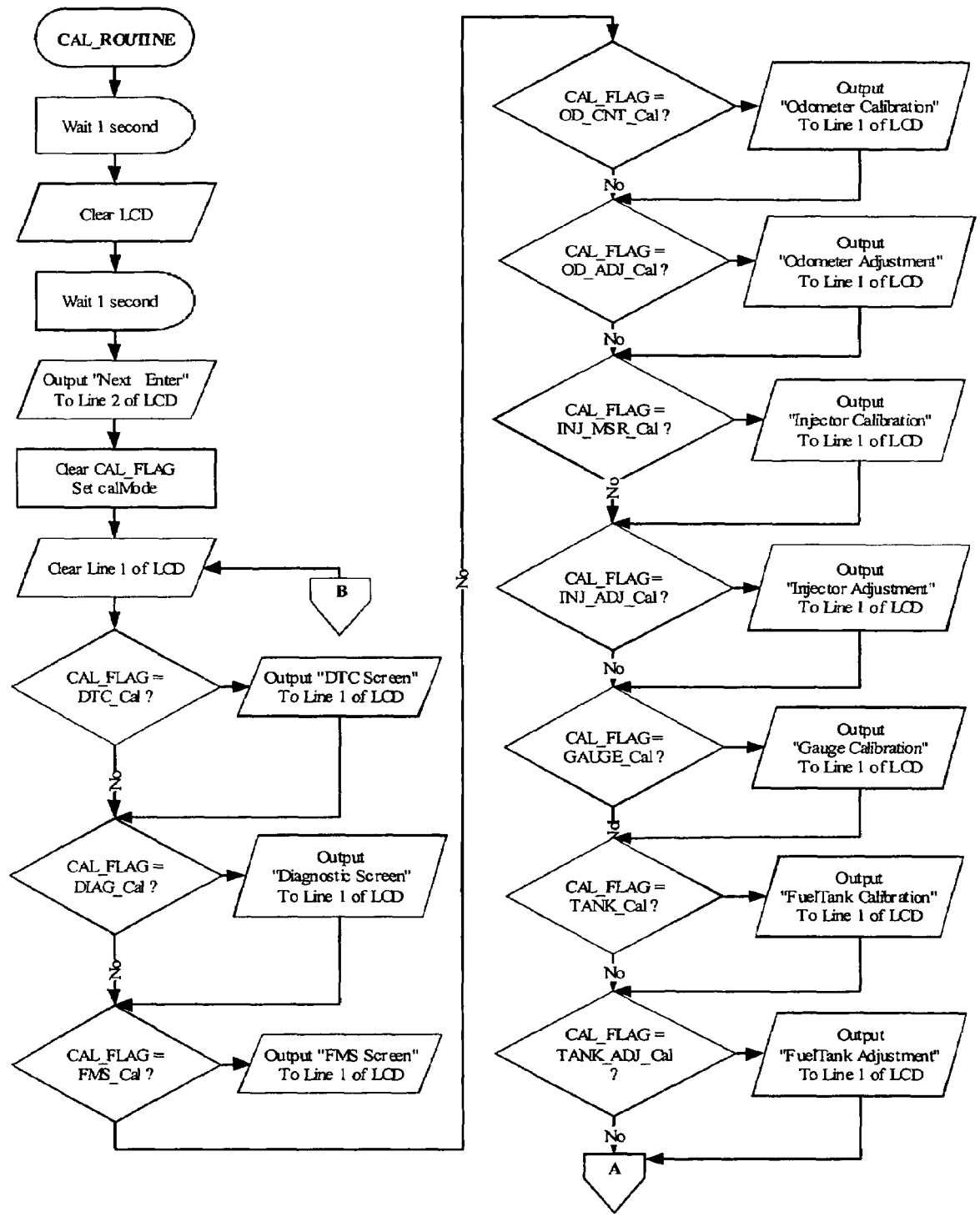
FIGS. 13a and 13b, CAL_ROUTINE, are flow charts illustrating the sequence of calibrations performed.
Figure 13B:
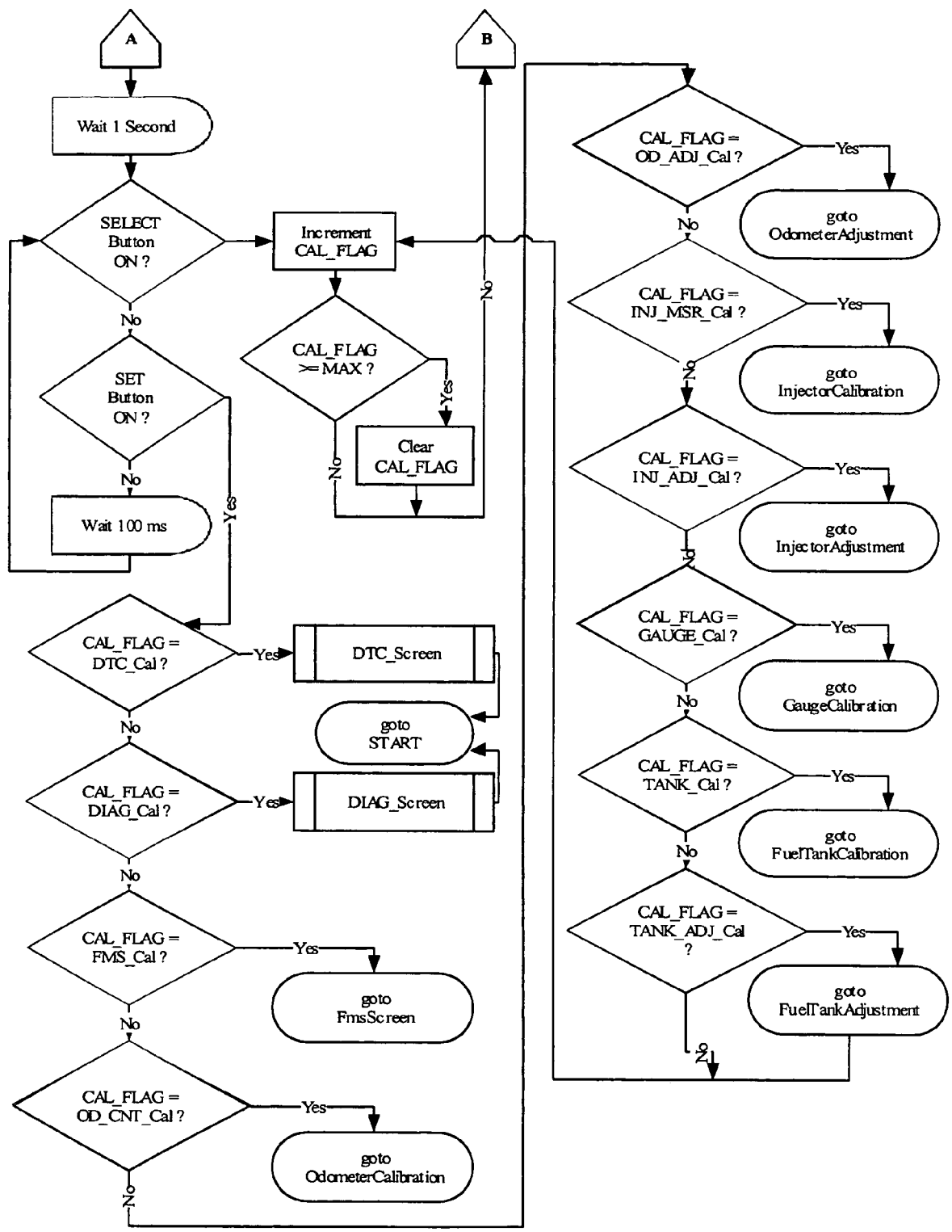
Figure 14A:
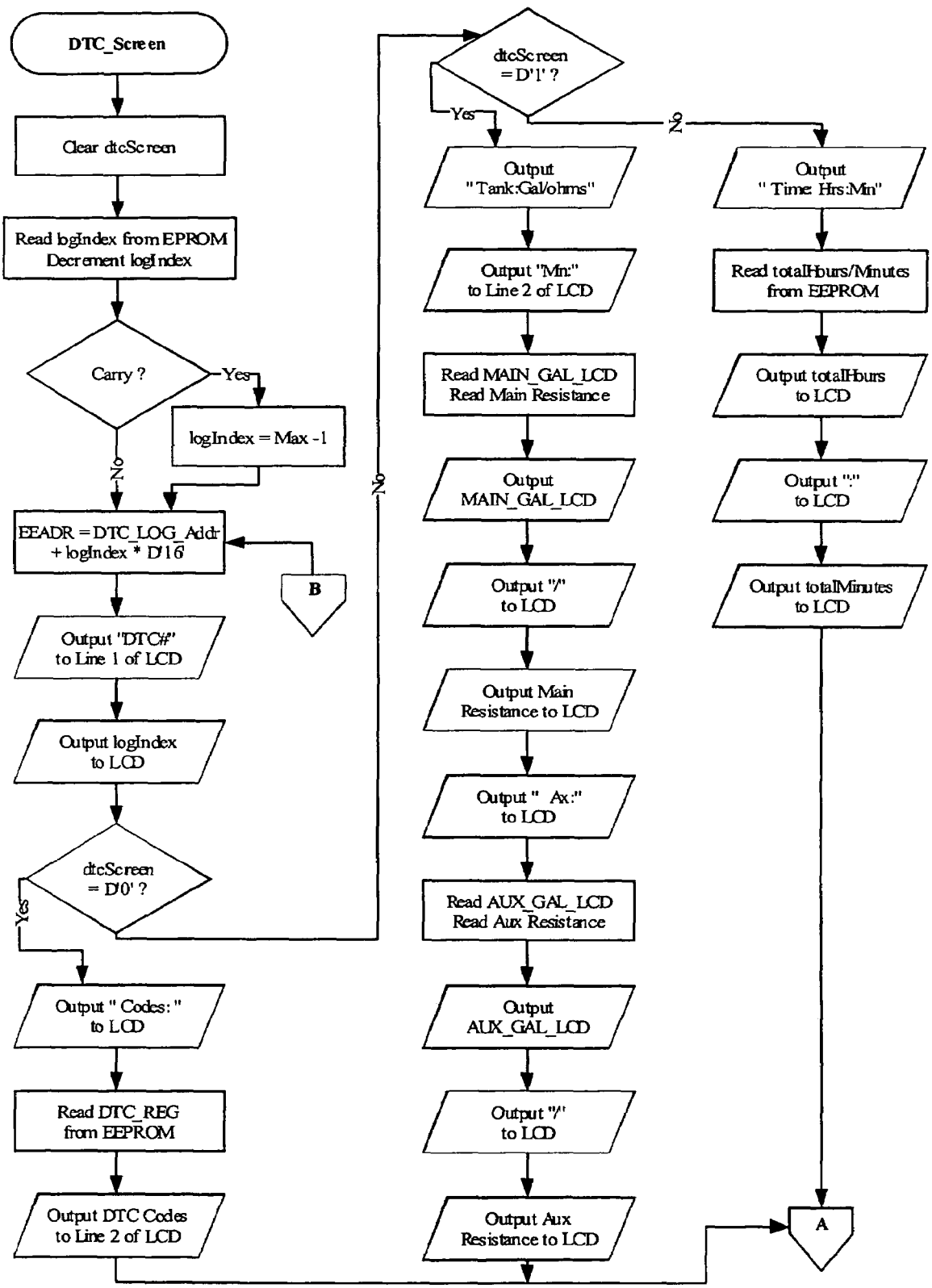
FIGS. 14a and 14b, DTC_Screen, are flow charts illustrating the Diagnostic Trouble Code screen sequence.
Figure 14B:
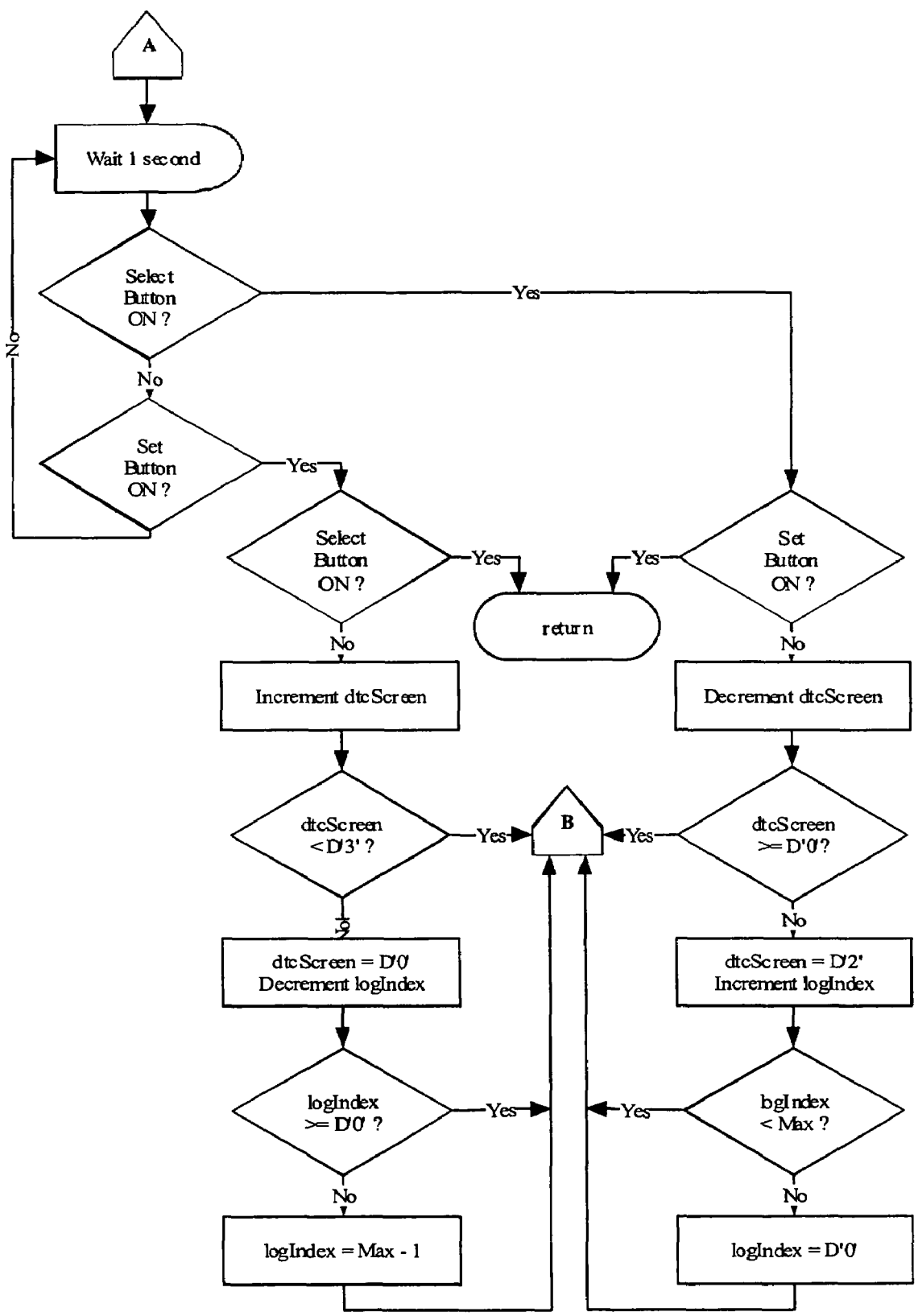
Figure 15A:
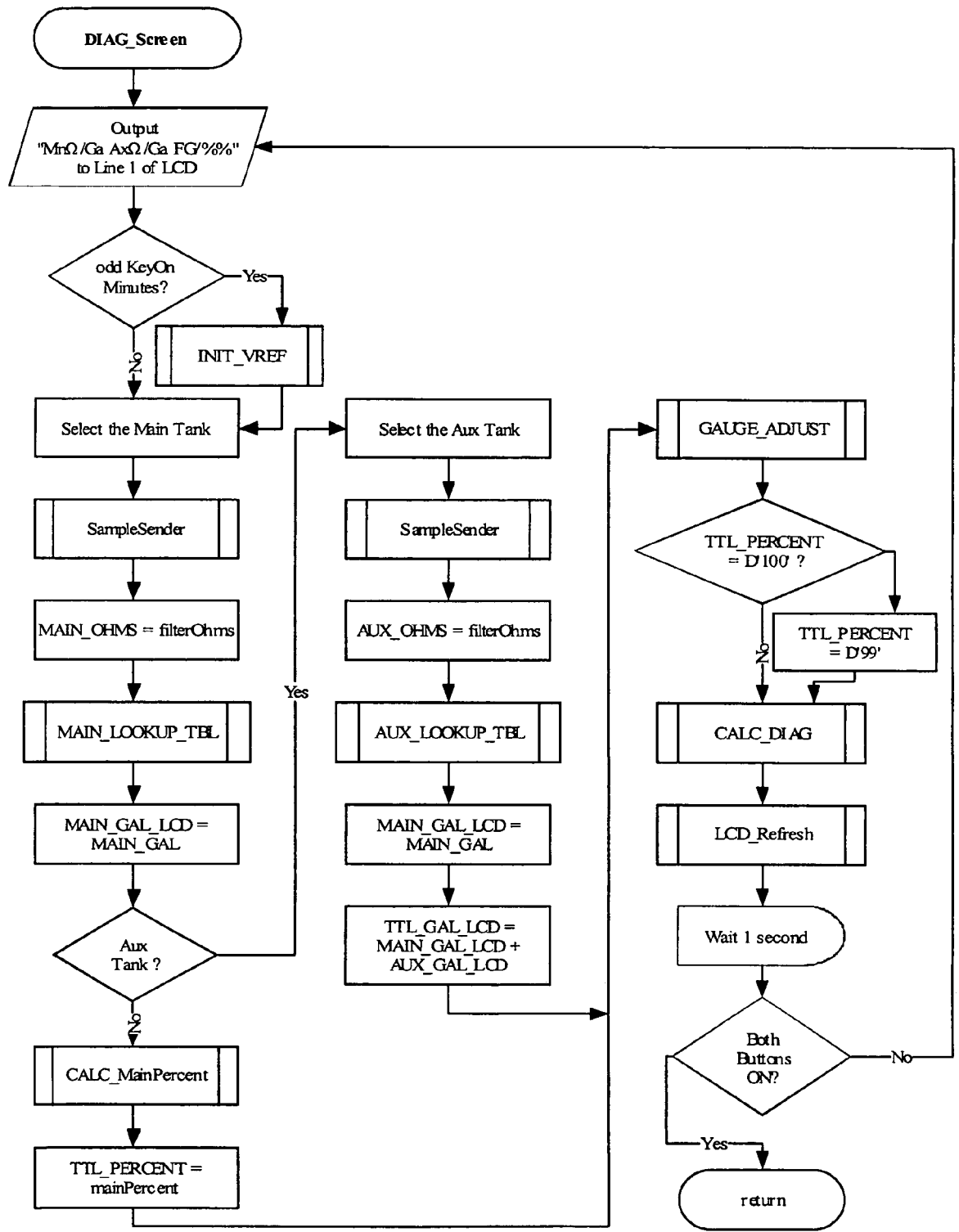
FIGS. 15a and 15b, DIAG_Screen, are flow charts illustrating the diagnostic screen sequence.
Figure 15B:
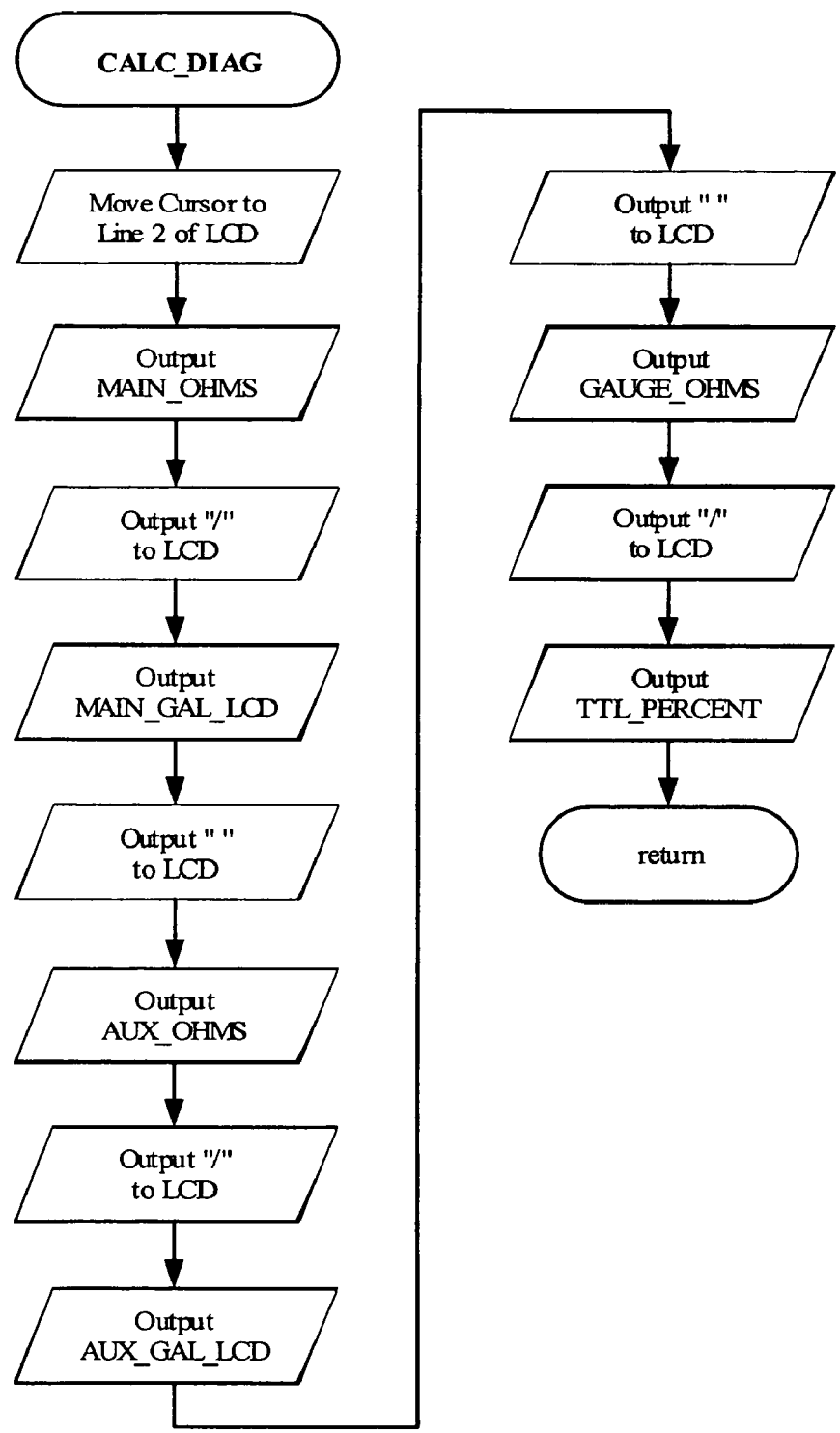
Figure 16:
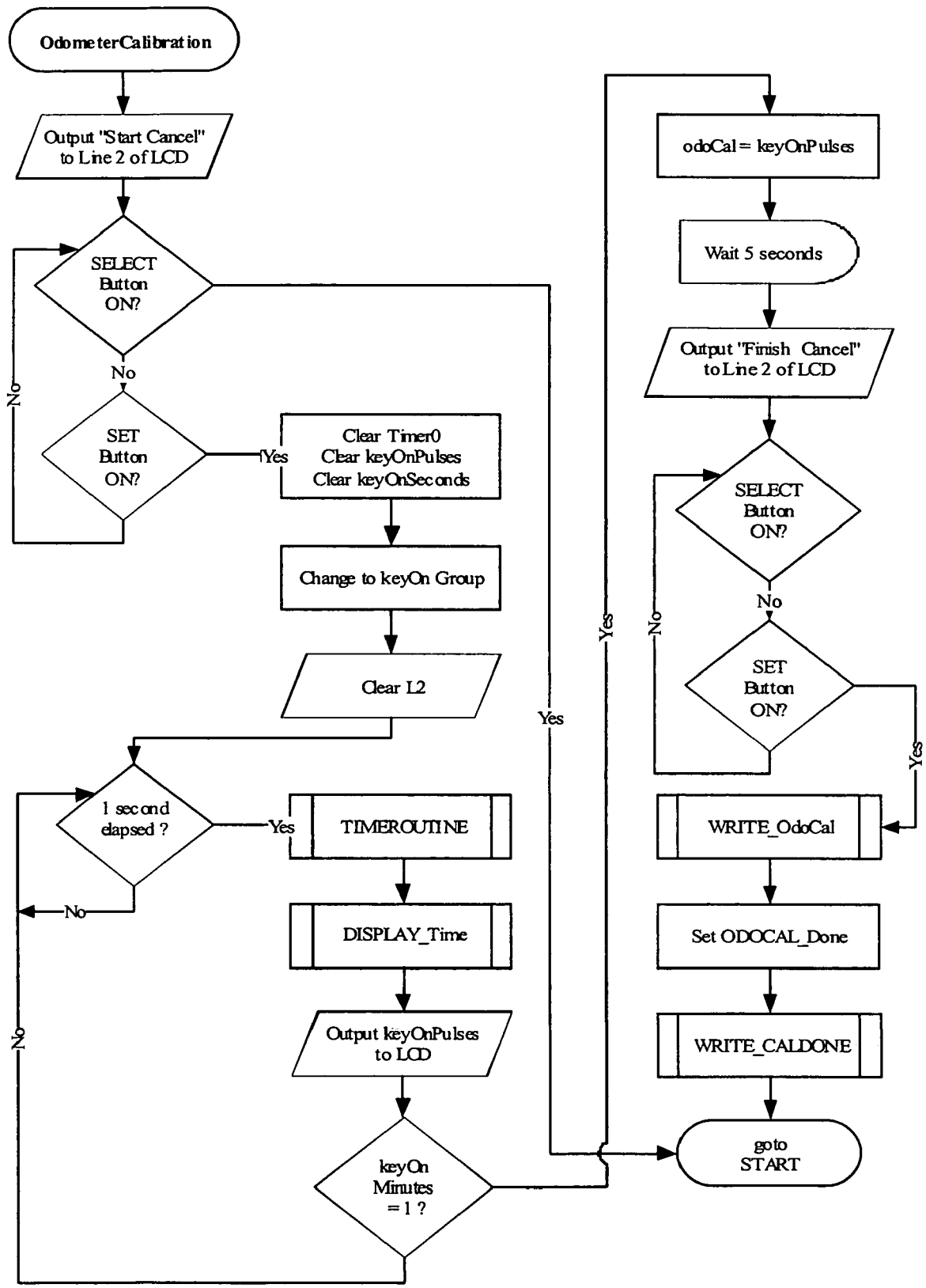
FIG. 16, OdometerCalibration, is a flow chart illustrating the automatic calibration sequence of the Vehicle Speed Sensor.
Figure 17:
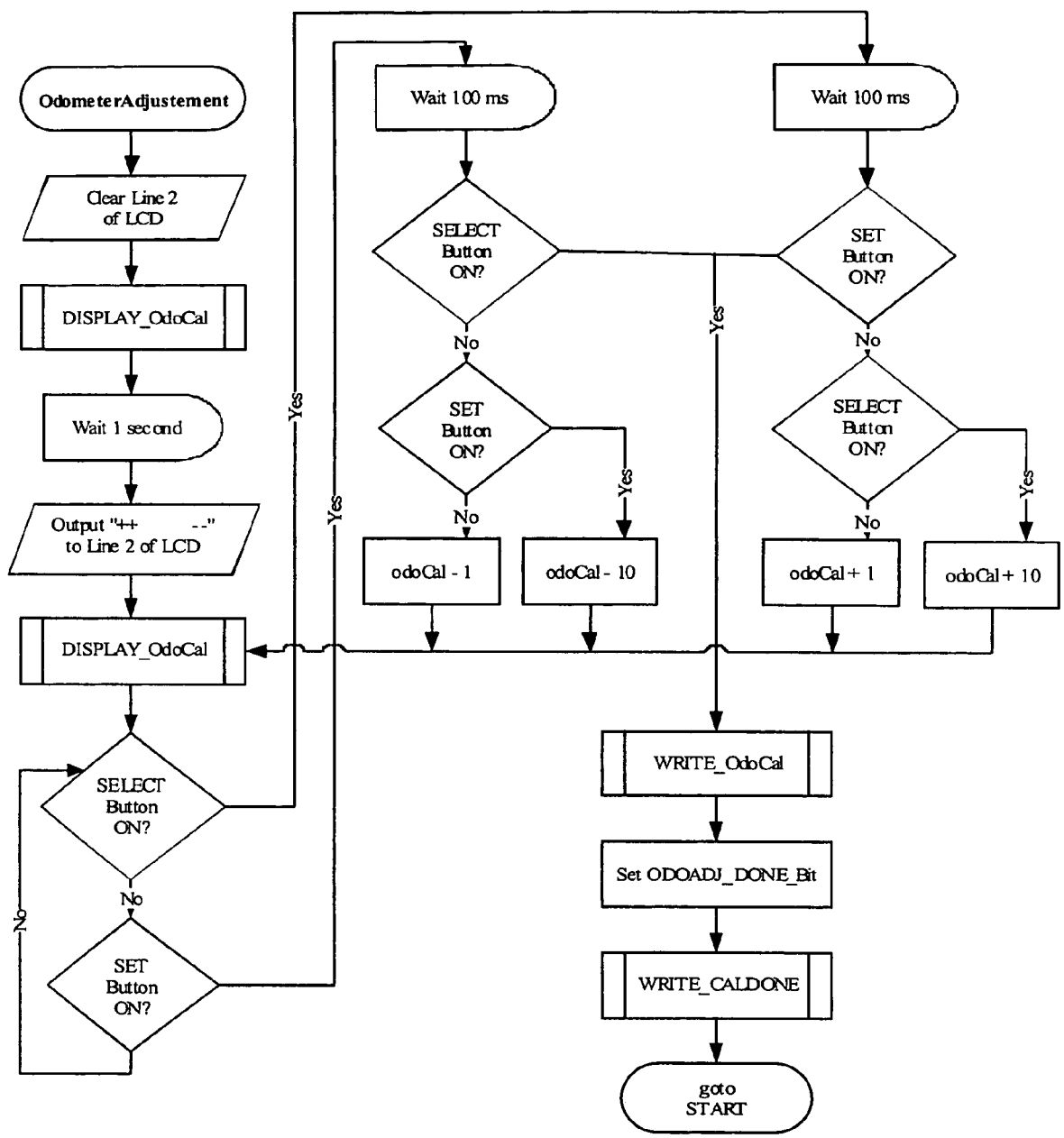
FIG. 17, OdometerAdjustment, is a flow chart illustrating the manual adjustment sequence of the Vehicle Speed Sensor.
Figure 18A:
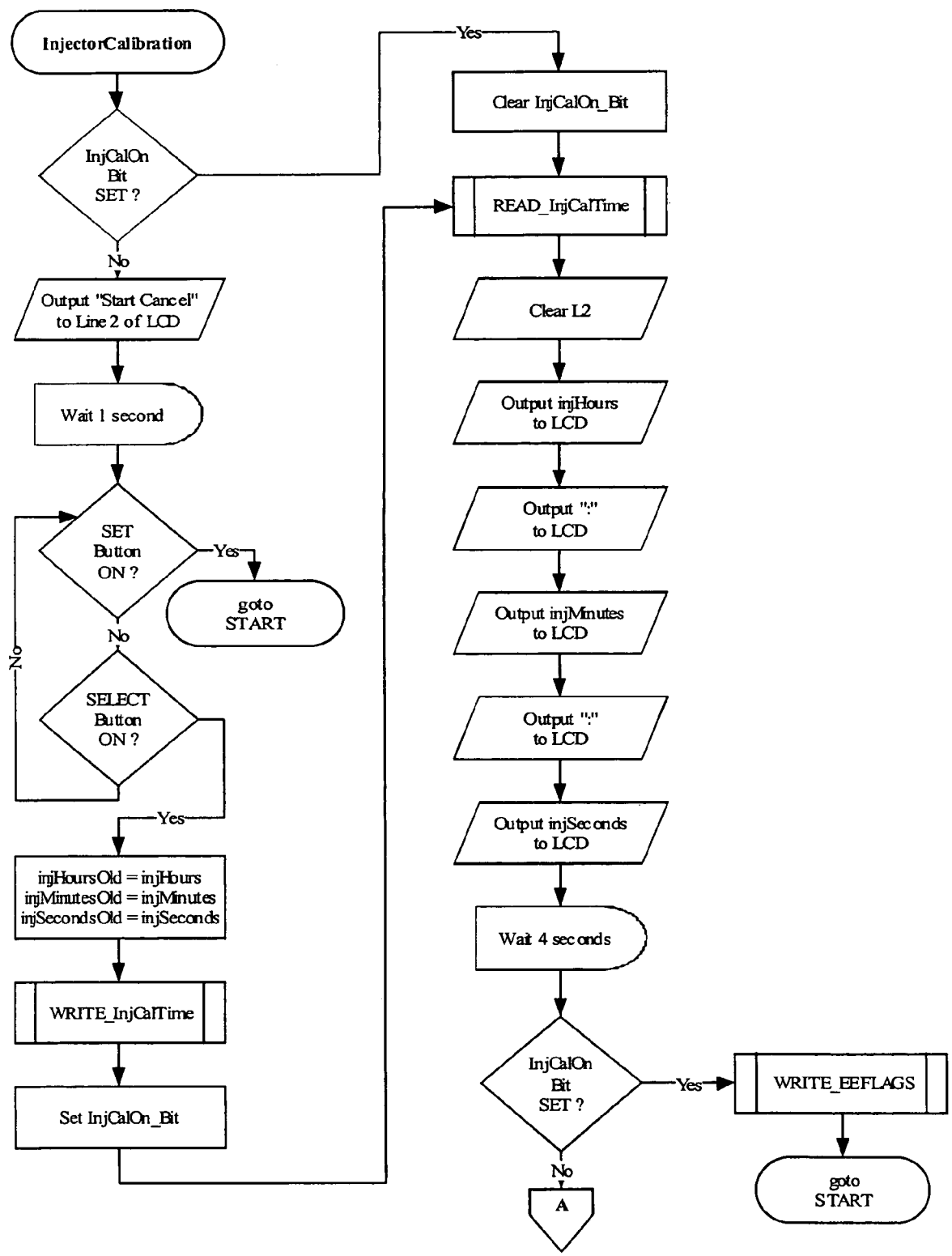
FIGS. 18a, 18b and 18c, InjectorCalibration, are flow charts illustrating the automatic calibration sequence of the Fuel Injector.
Figure 18B:
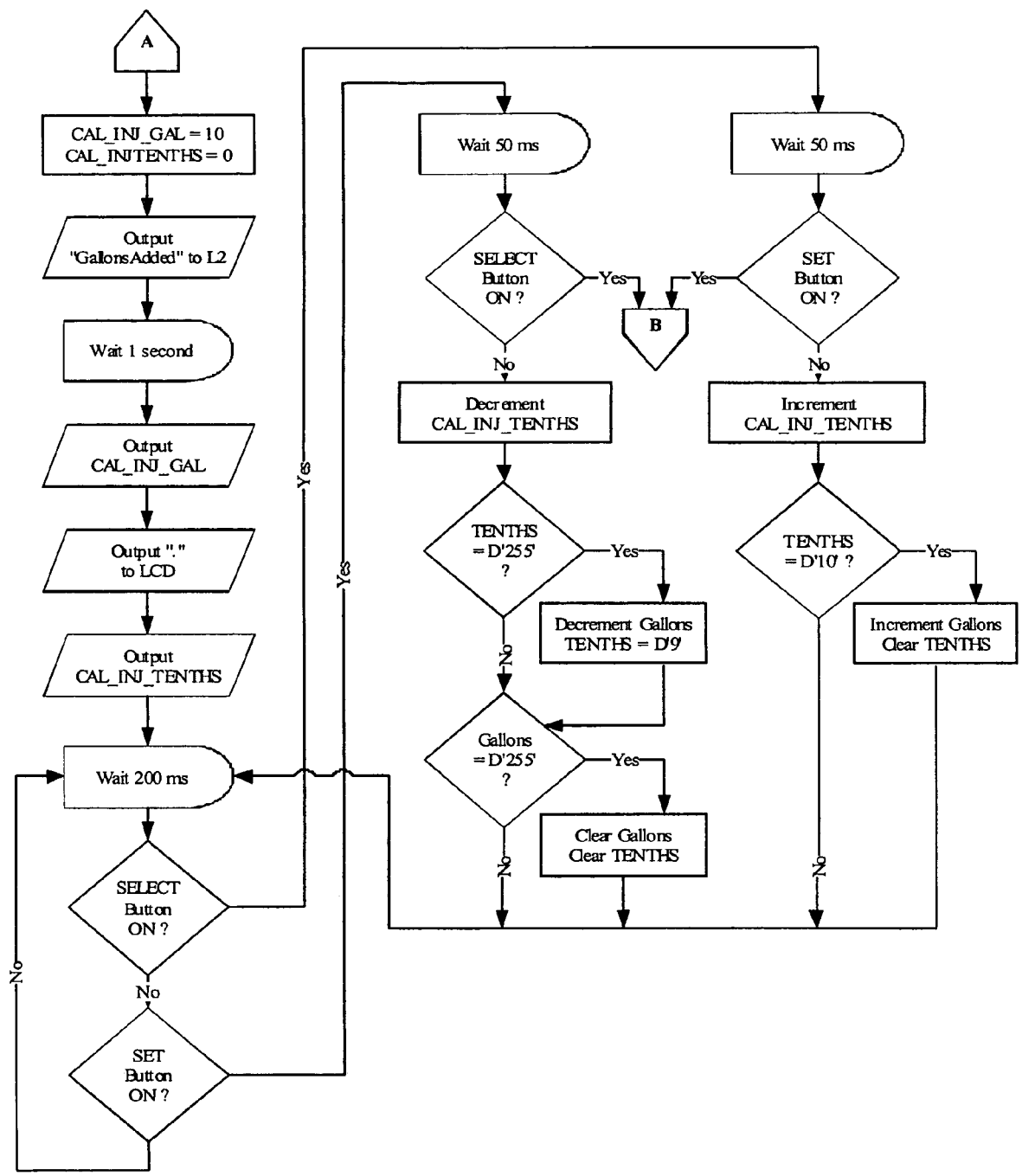
Figure 18C:
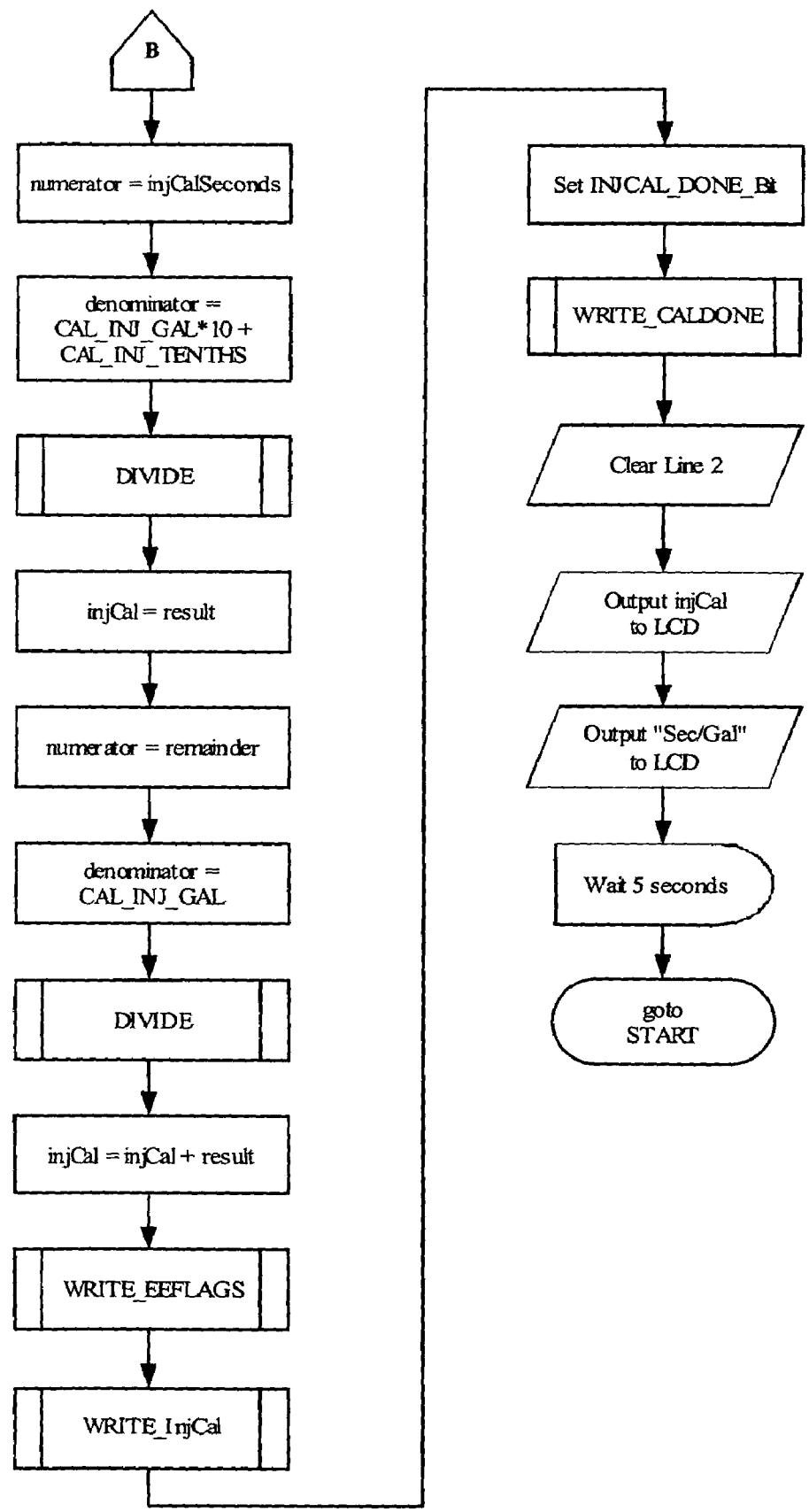
Figure 19:
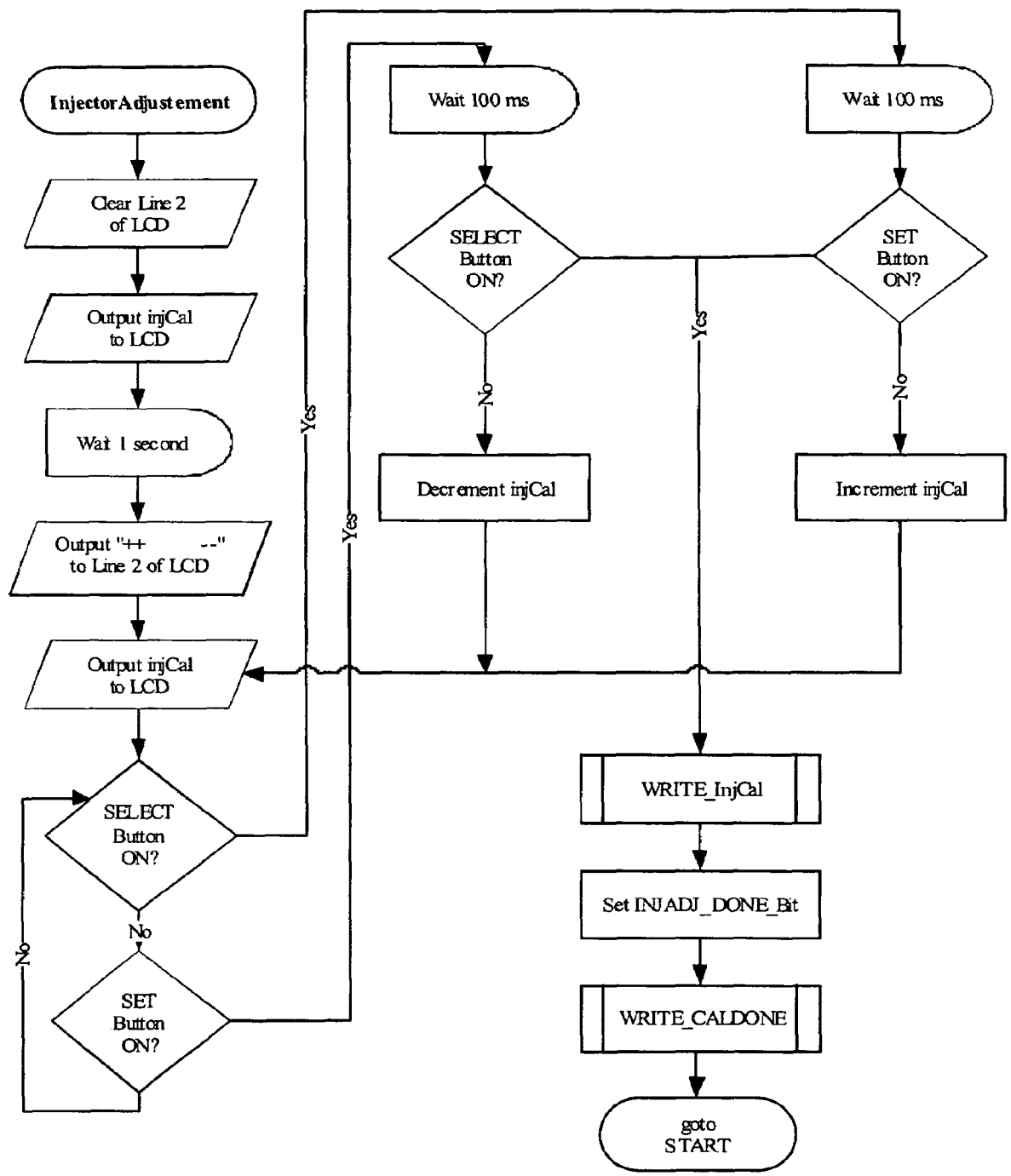
FIG. 19, InjectorAdjustment, is a flow chart illustrating the manual adjustment sequence of the Fuel Injector.
Figure 20A:
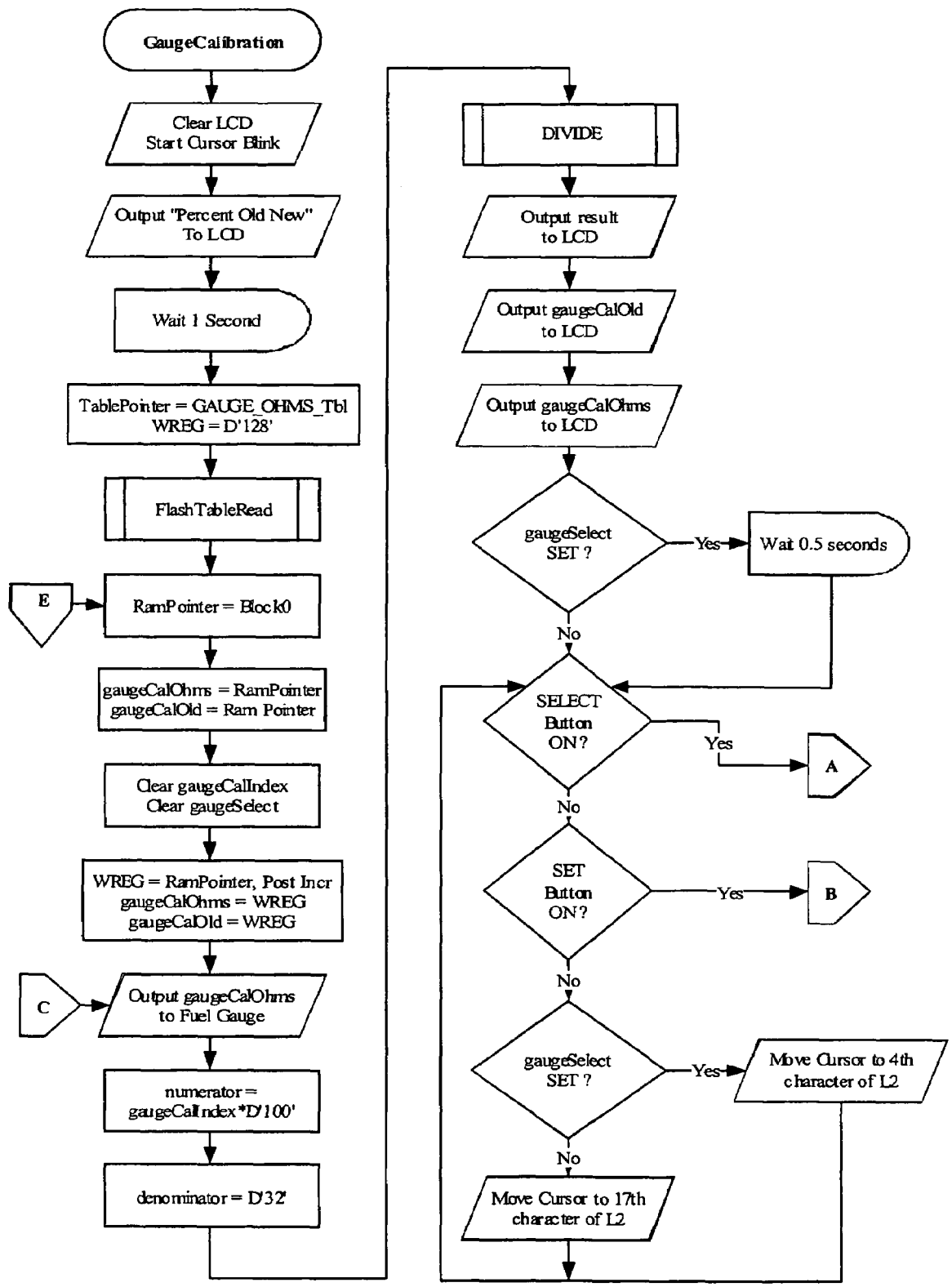
FIGS. 20a, 20b and 20c, GaugeCalibration, are flow charts illustrating the semi-automated gauge calibration sequence.
Figure 20B:
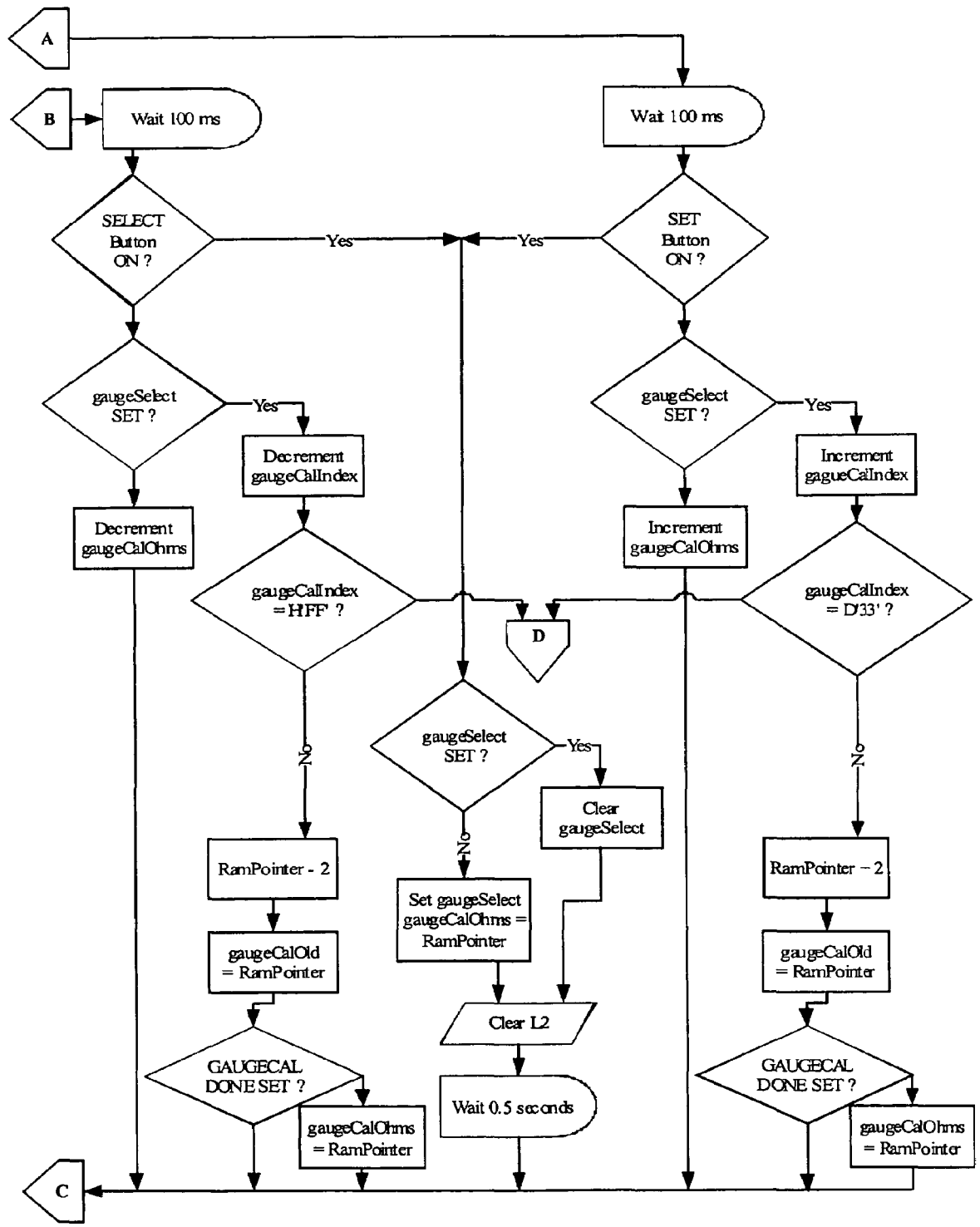
Figure 20C:
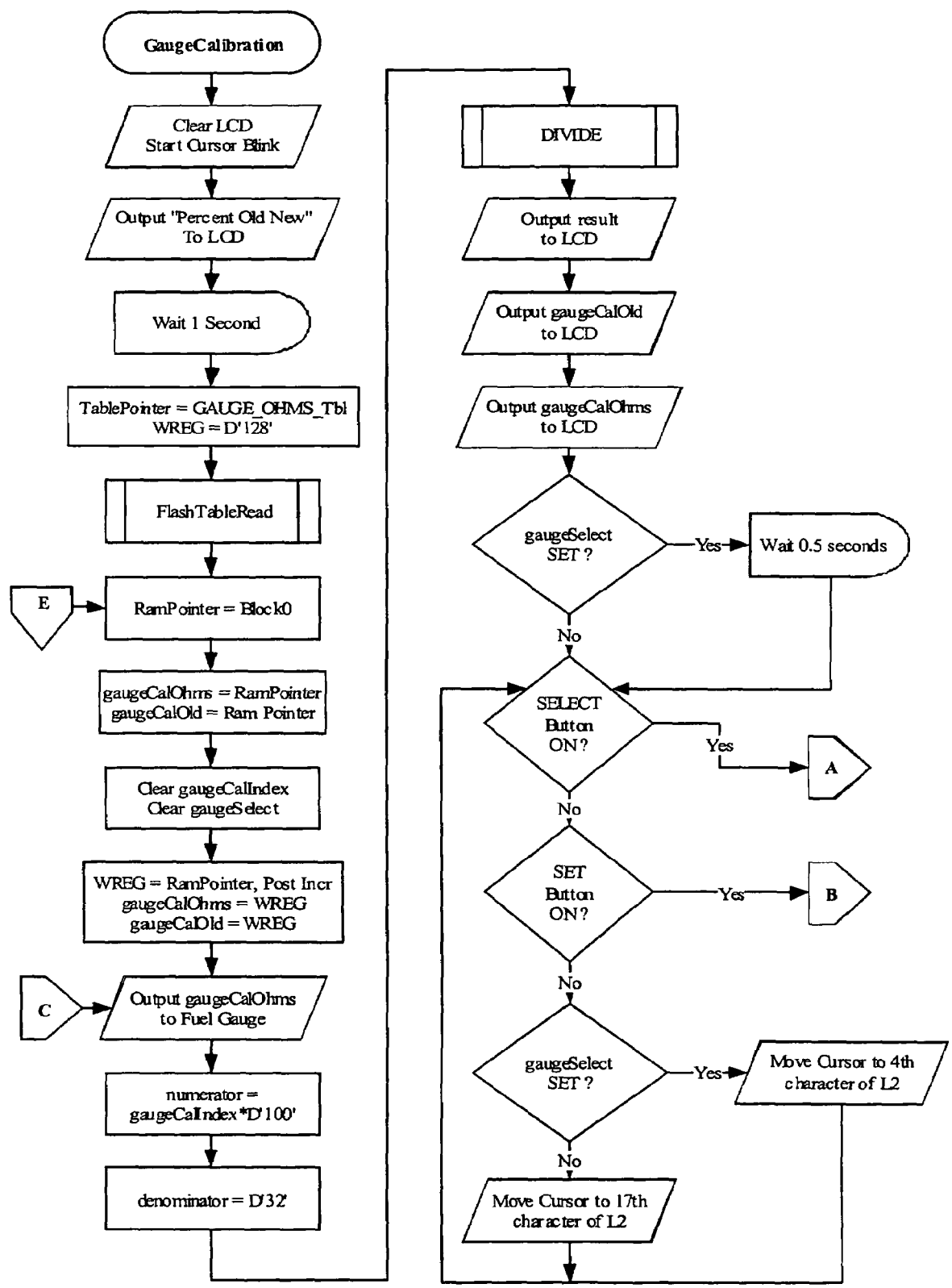
Figure 21:
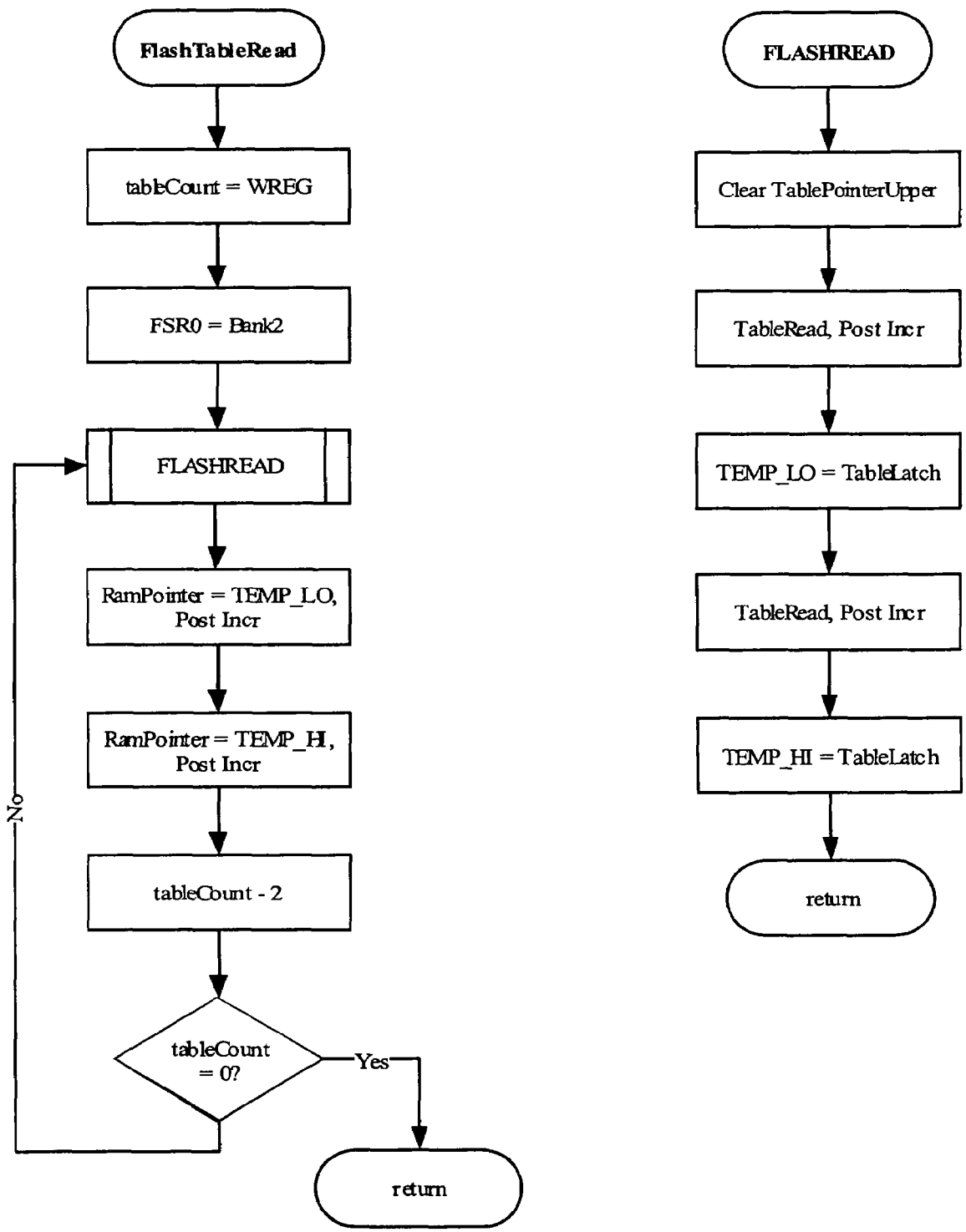
FIG. 21, FlashTableRead and FLASHREAD, is a flow chart illustrating the read sequence from a table prior to gauge or tank calibration.
Figure 22:
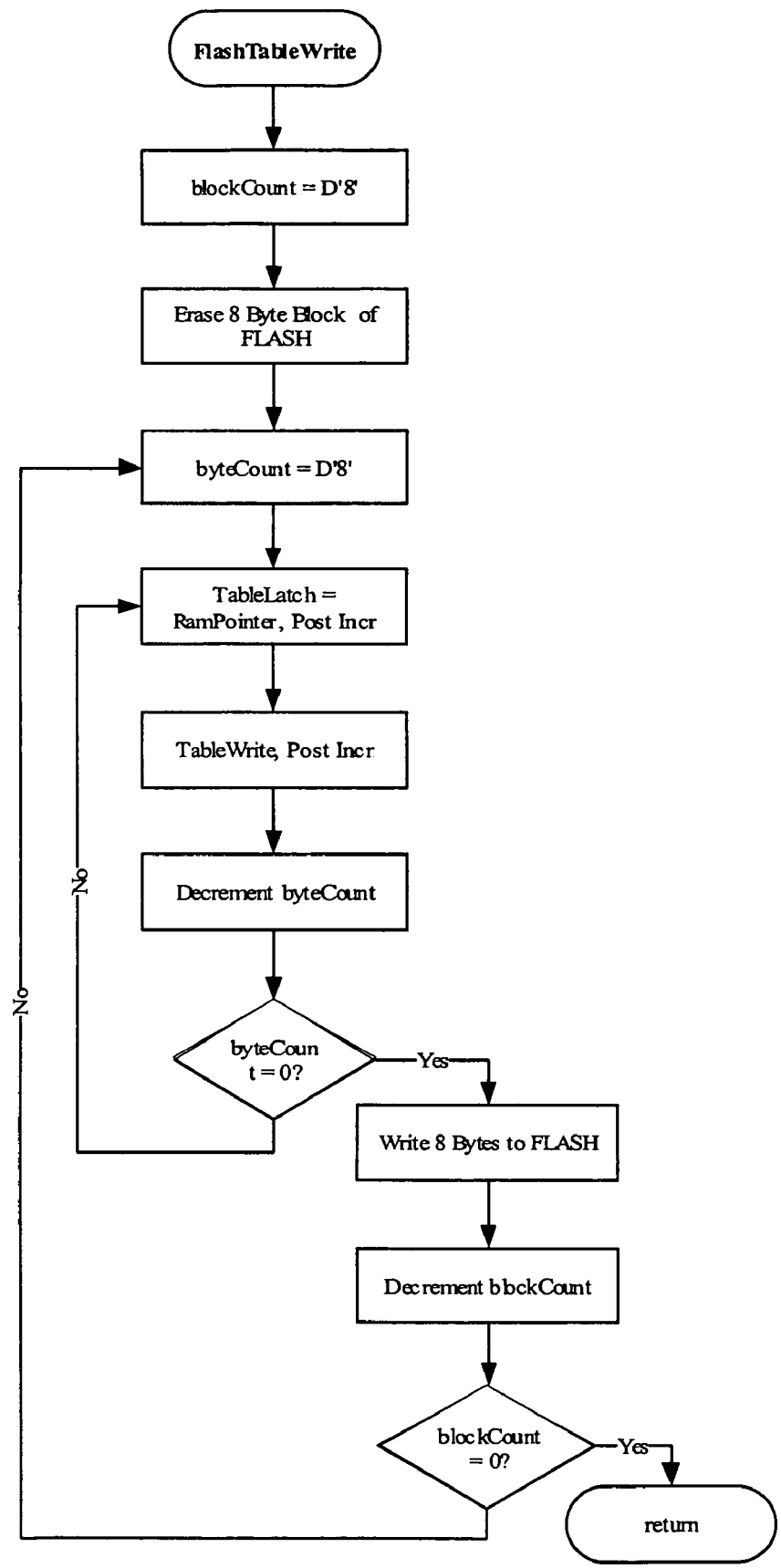
FIG. 22, FlashTableWrite, is a flow chart illustrating the write sequence to a table following a gauge or tank calibration.
Figure 23A:
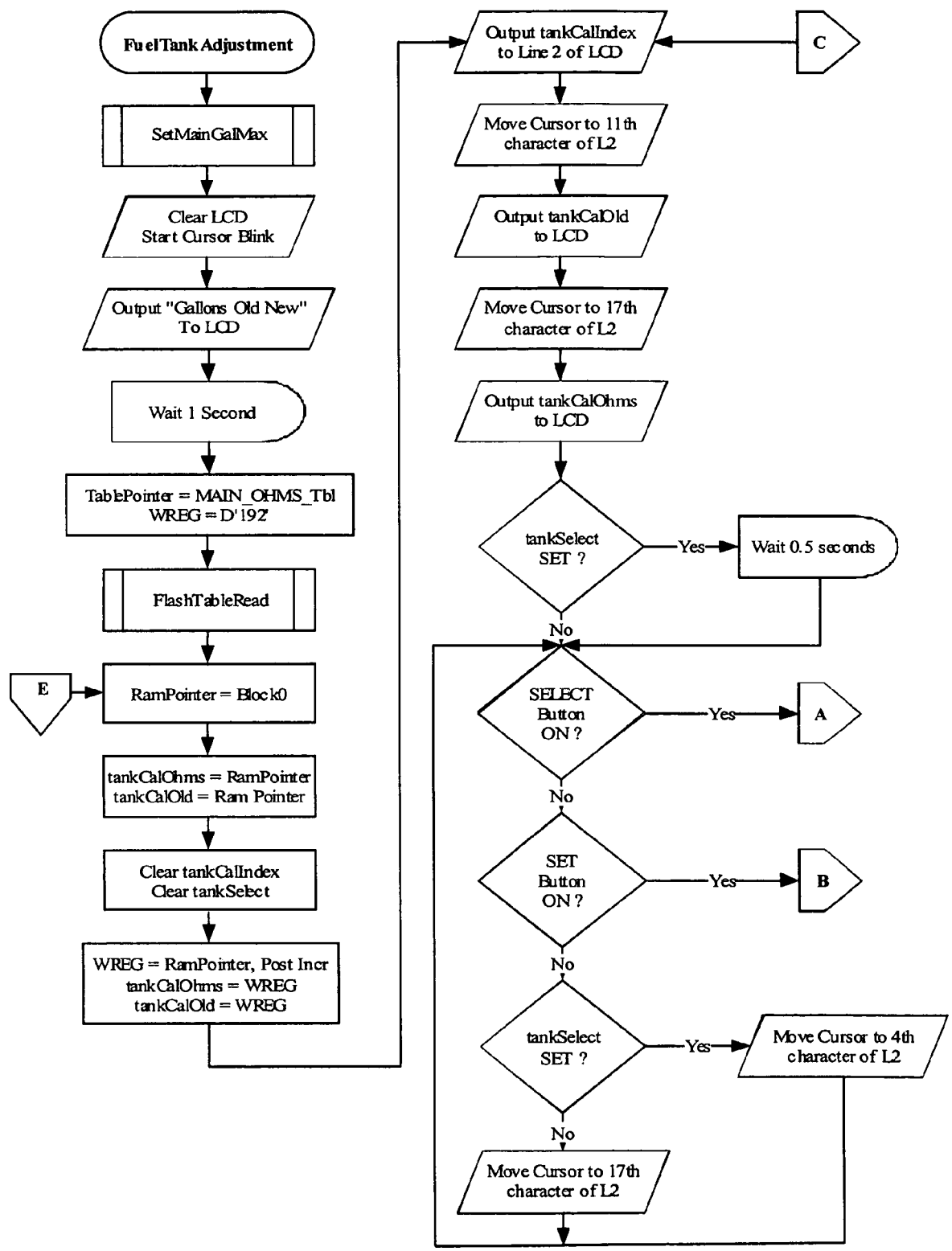
FIGS. 23a, 23b and 23c, FuelTankAdjustment, are flow charts illustrating the fuel tank adjustment sequence.
Figure 23B:
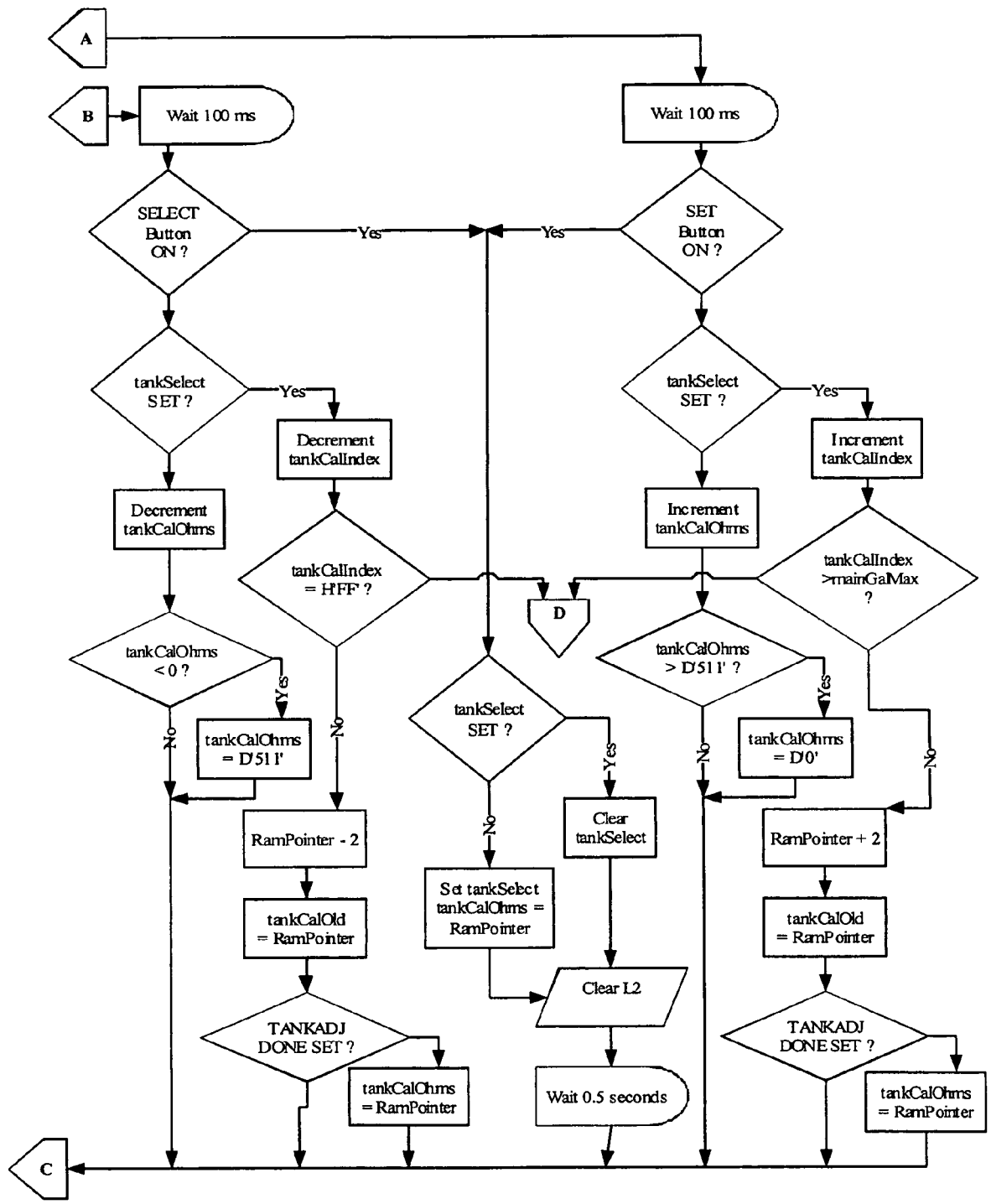
Figure 23C:
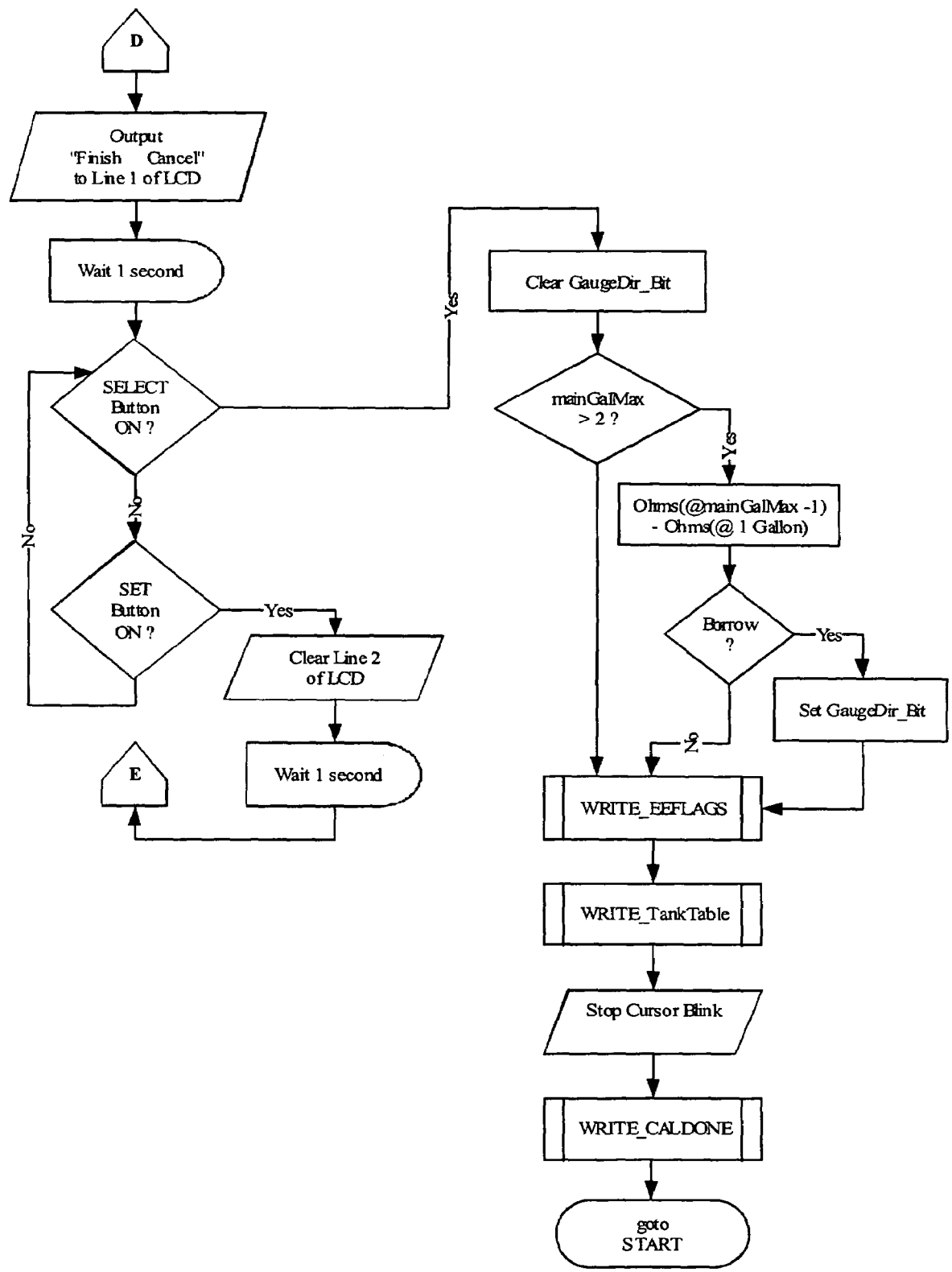
Figure 24:
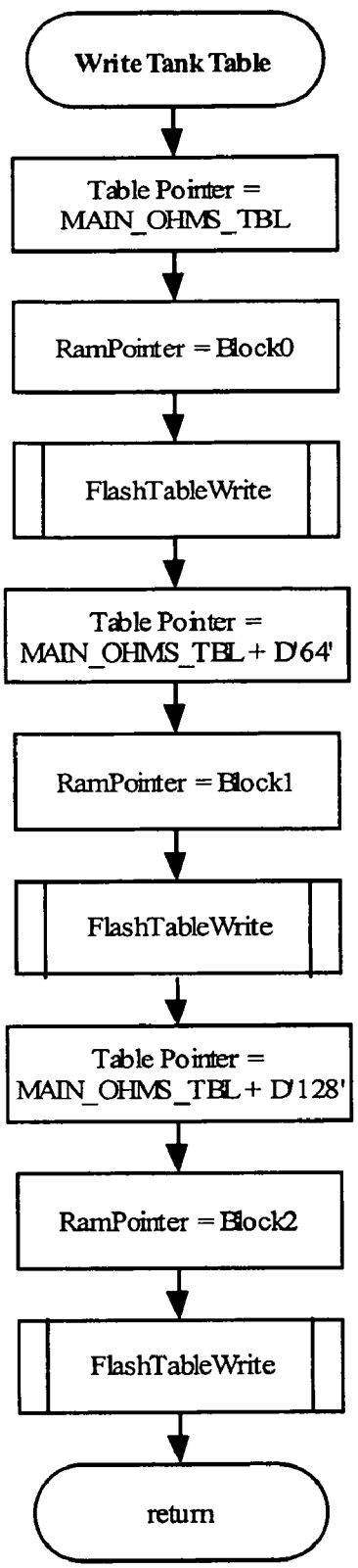
FIG. 24, WriteTankTable, is a flow chart illustrating how the fuel tank table is written to FLASH.
Figure 25A:
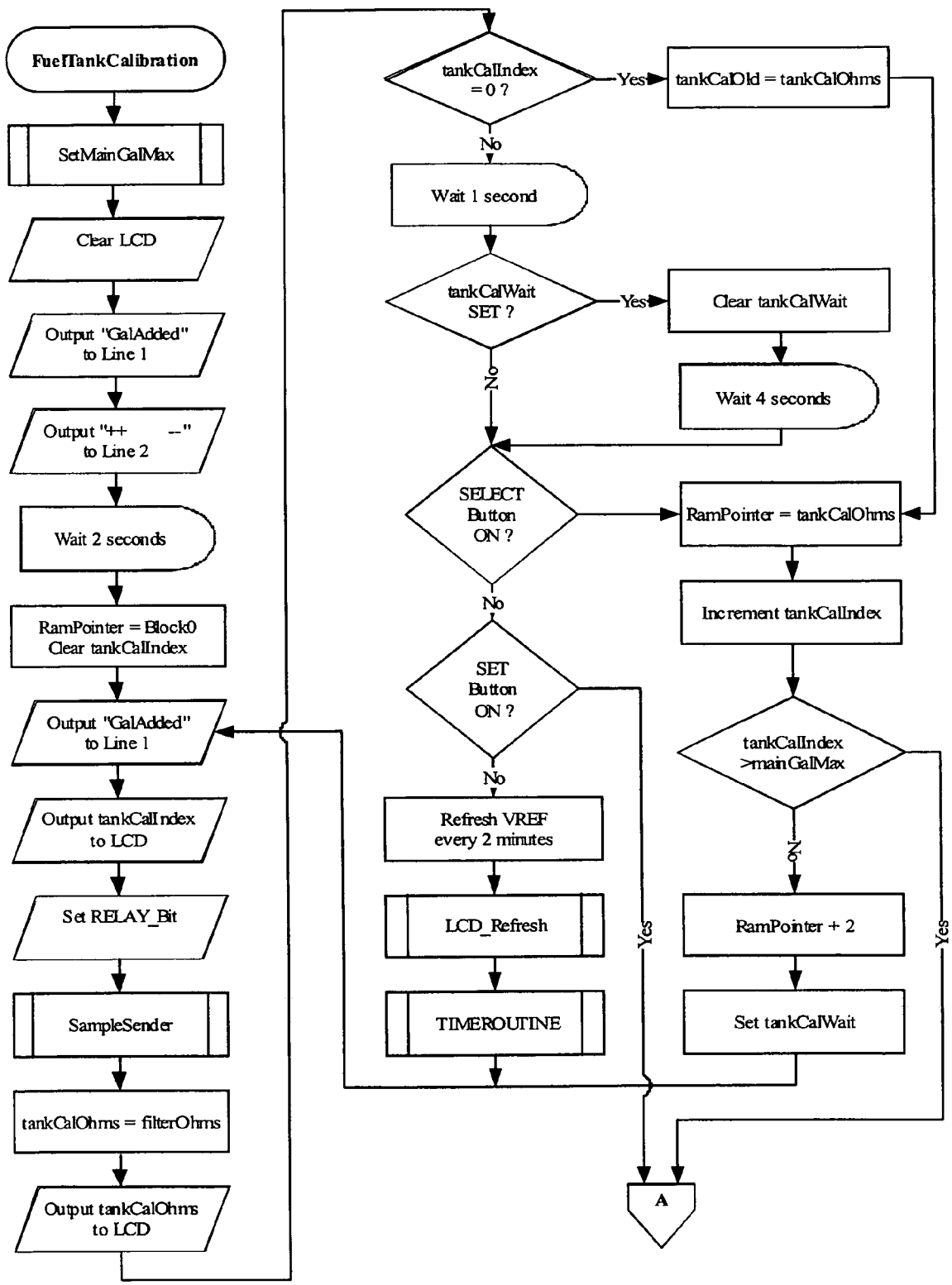
FIGS. 25a and 25b, FuelTankCalibration, are flow charts illustrating the automatic calibration sequence of the fuel tank.
Figure 25B:
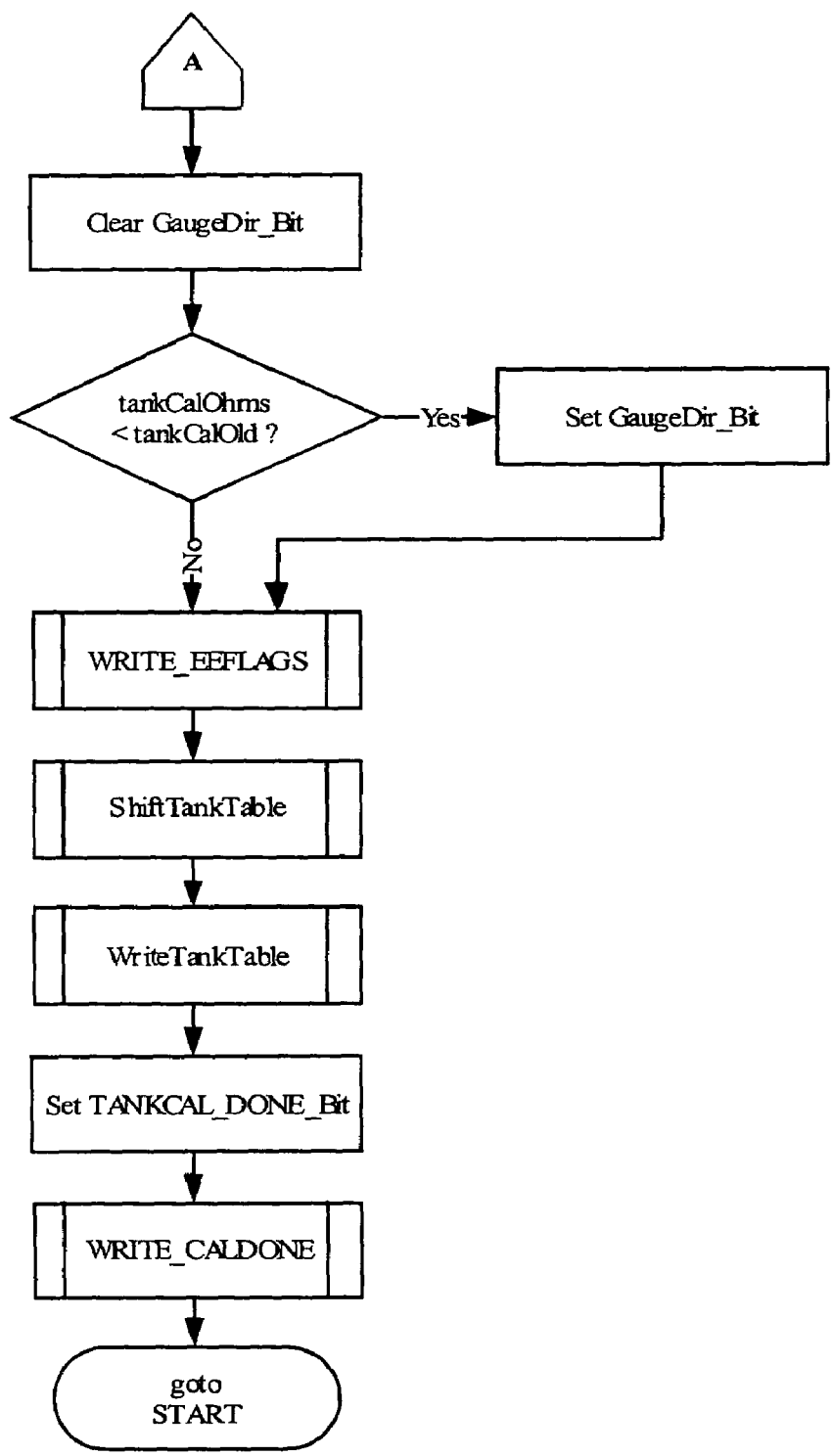
Figure 26:
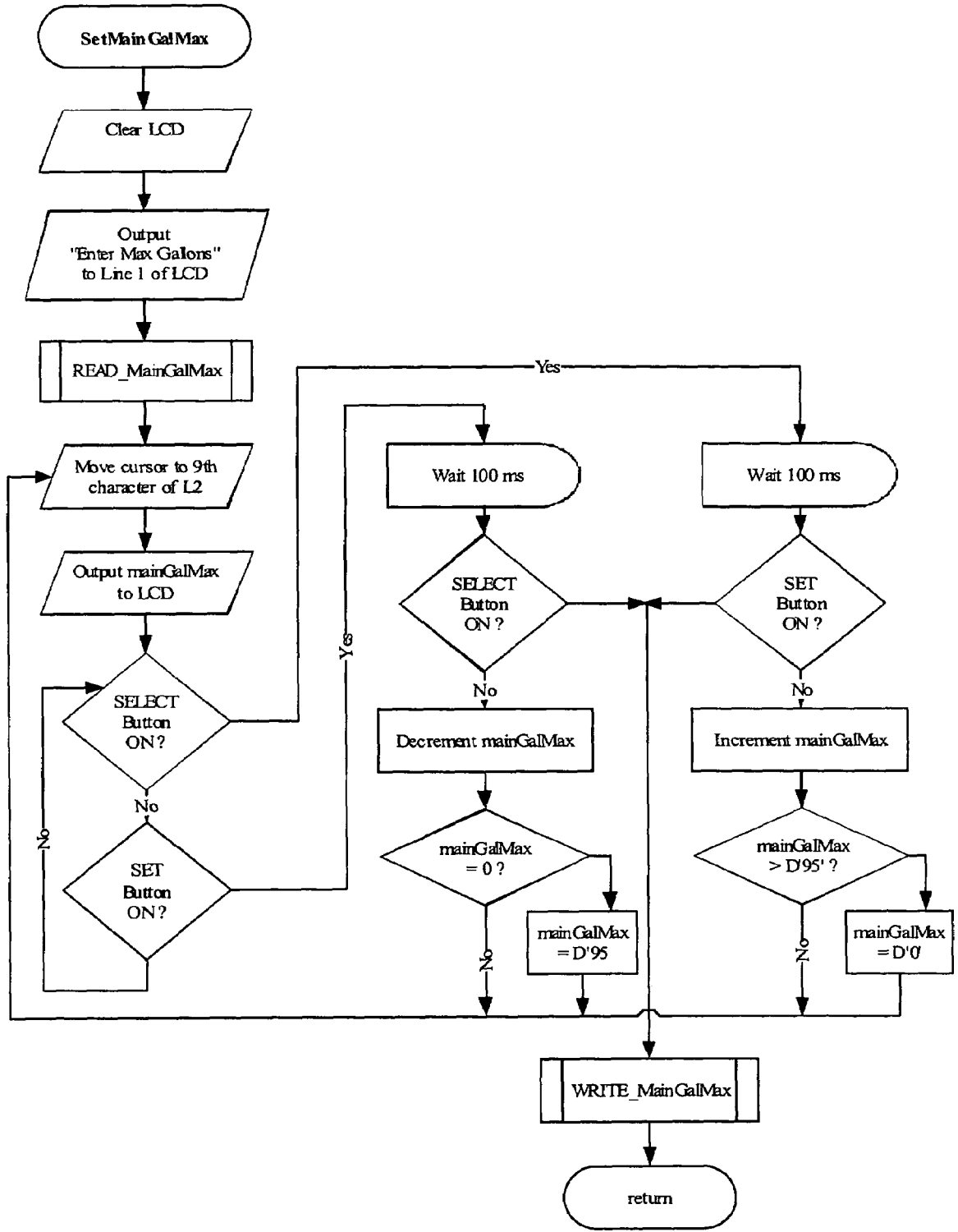
FIG. 26, SetMainGalMax, is a flow chart illustrating the adjustment sequence for the maximum fuel tank capacity.
Figure 28:
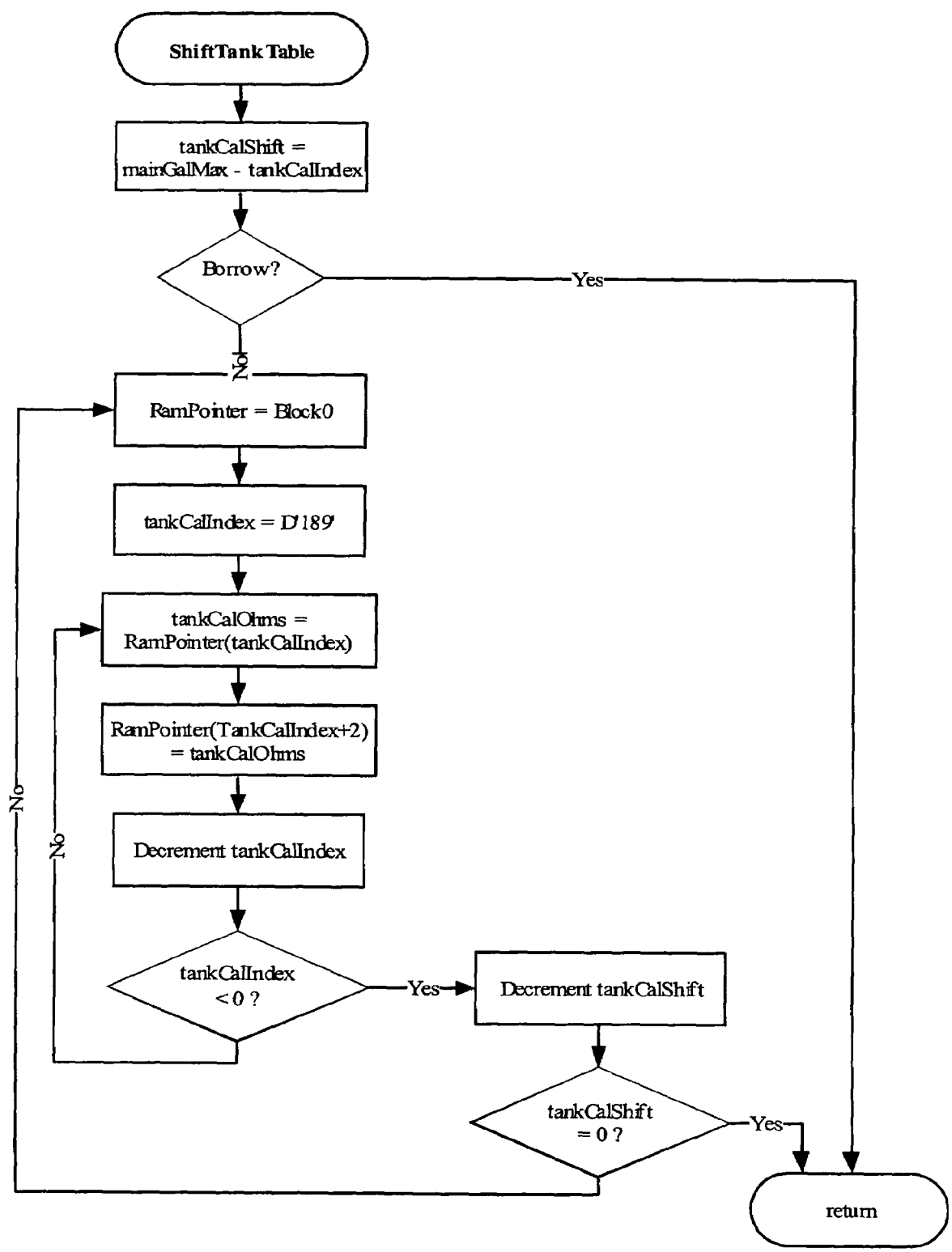
FIG. 28, ShiftTankTable, is a flow chart illustrating the sequence of shifting the data recorded in the fuel tank calibration to compensate for uncalibrated positions at the bottom of the table.

If the user has both the Select and Set buttons depressed, the invention moves into Cal. Routine (FIGS. 13a and 13b), in which signals can be calibrated and adjusted. The DTC screen (FIGS. 14a and 14b) is the first menu available in calibration mode and is useful for displaying Diagnostic Trouble Codes corresponding to a problem with the invention. The next available menu is the Diagnostic Screen, (FIGS. 15a and 15b), which displays raw date from the main tank, auxiliary tank, and gauge for troubleshooting or calibration purposes. The Odometer Calibration (FIG. 16) and Odometer Adjustment (FIG. 17), respectively, are also calibration menus. The Injector calibration (FIGS. 18a, 18b, and 18c) and Injector Adjustment (FIG. 19) allow the user to automatically or manually configure the fuel injector input. The Gauges Calibration (FIGS. 20a, 20b, and 20c) is available next, and it uses the Flash Table is read (FIG. 21) and write functions (FIG. 22). The next calibration menu is the Fuel Tank Calibration (FIGS. 25a and 25b) during which the maximum gallons value is entered (FIG. 26). This menu also samples the fuel level (FIG. 7), shifts the tank table (FIG. 28), and writes the resulting table to FLASH memory (FIG. 24). The final calibration menu is the Fuel Tank Adjustment (FIGS. 23a, 23b and 23c), which also writes the tank table (FIG. 24).

Figure 29:
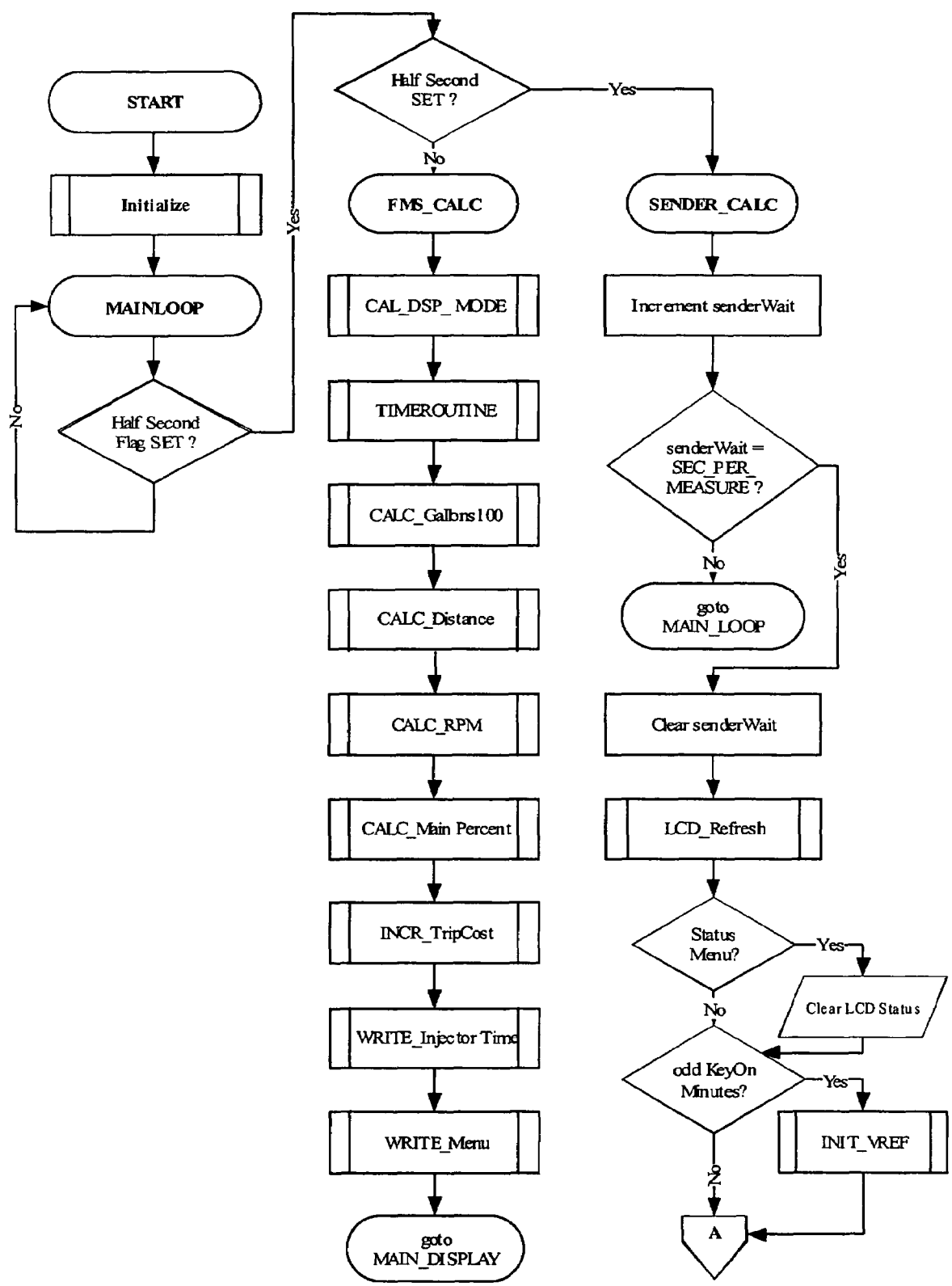
FIGS. 29 and 30, MAINLOOP, are flow charts illustrating the Main Loop sequence, which contains all the subroutines required for normal operation of the module.
Figure 30:
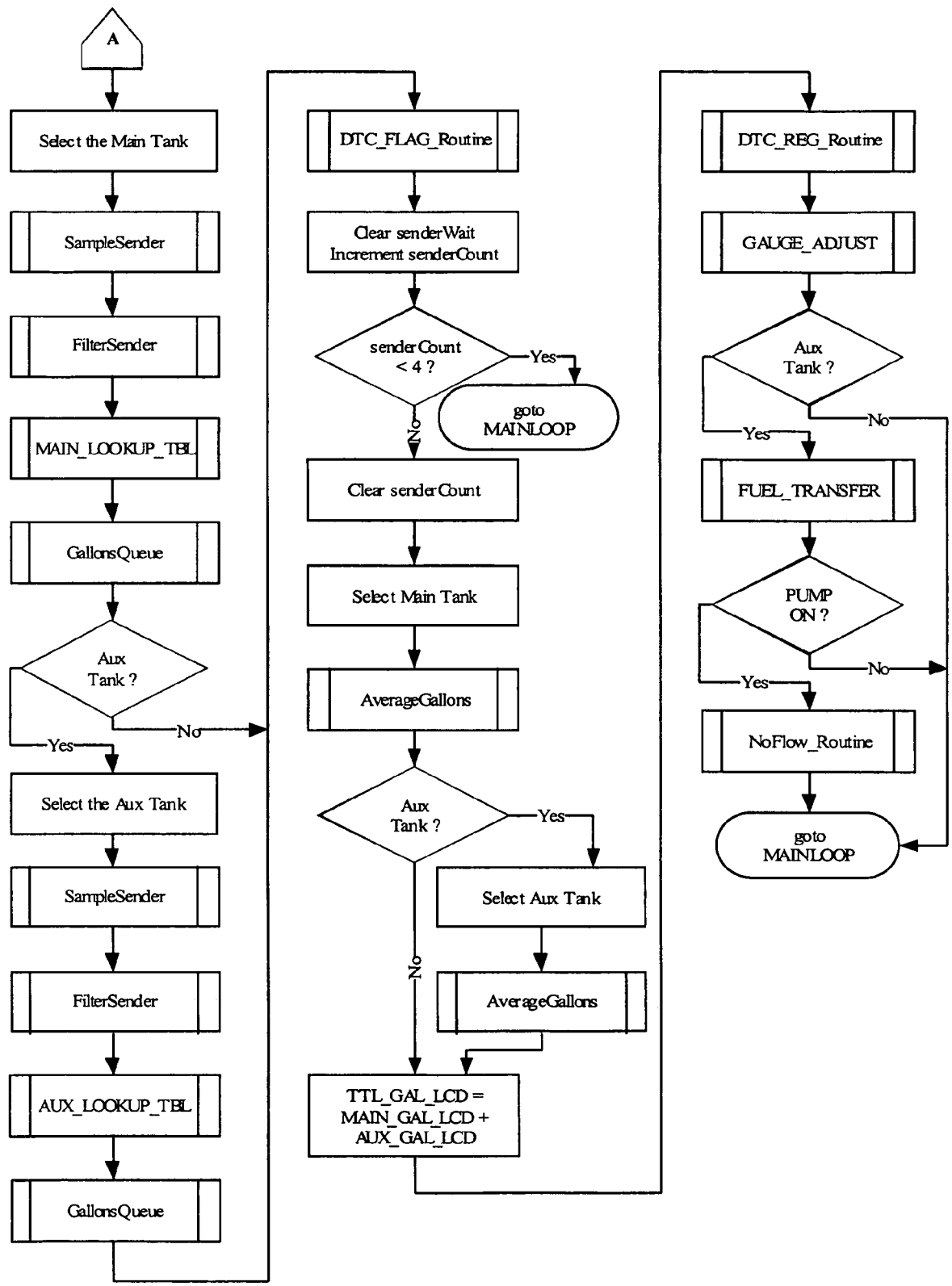

If the Select and Set buttons are not depressed at startup the invention enters the Main Loop (FIGS. 29 and 30). This section of the invention contains all the subroutines required for normal operation of the invention. Execution of the Main Loop is started by an interrupt-based timer, which overflows every half second. Thus, every even half second the Sender calculations are performed and every odd half second the FMS calculations are performed.

Figure 8:
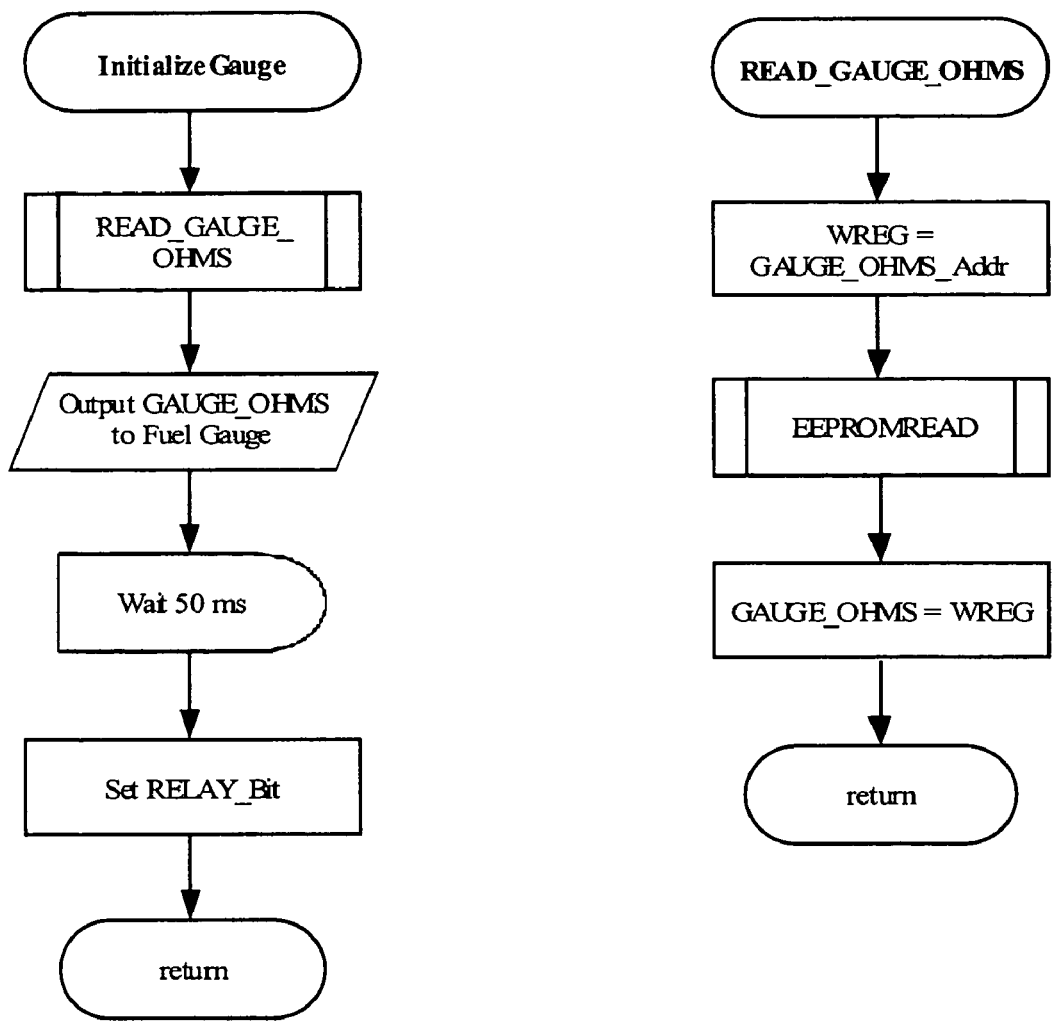
FIG. 8, InitializeGauge and READ_GAUGE_OHMS, is a flow chart illustrating how the initial gauge position is restored from the computer's EEPROM.
Figure 9:
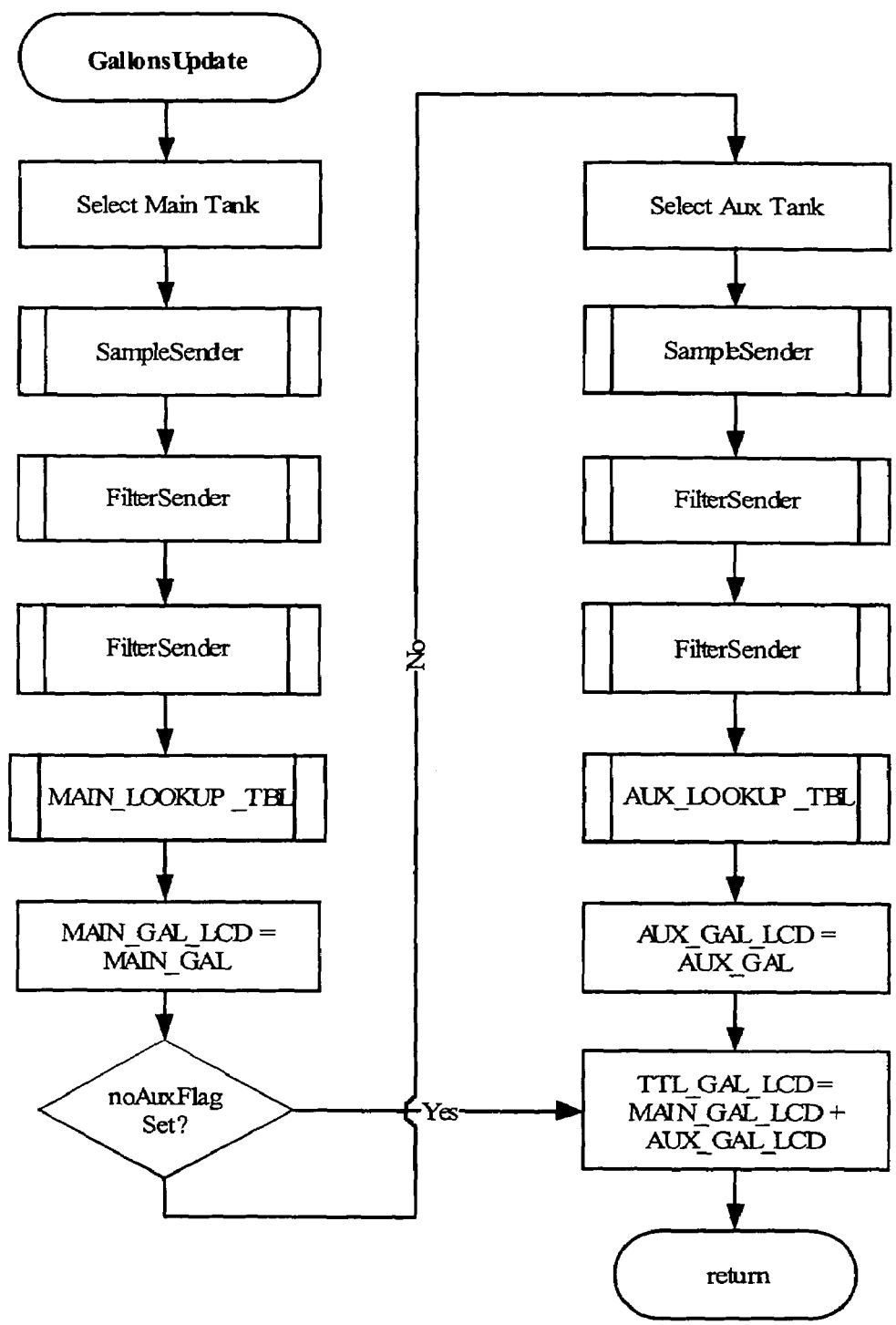
FIG. 9, GallonsUpdate, is a flow chart illustrating the measurement and update of the fuel levels of both main and auxiliary tanks without filtering.
Figure 10A:
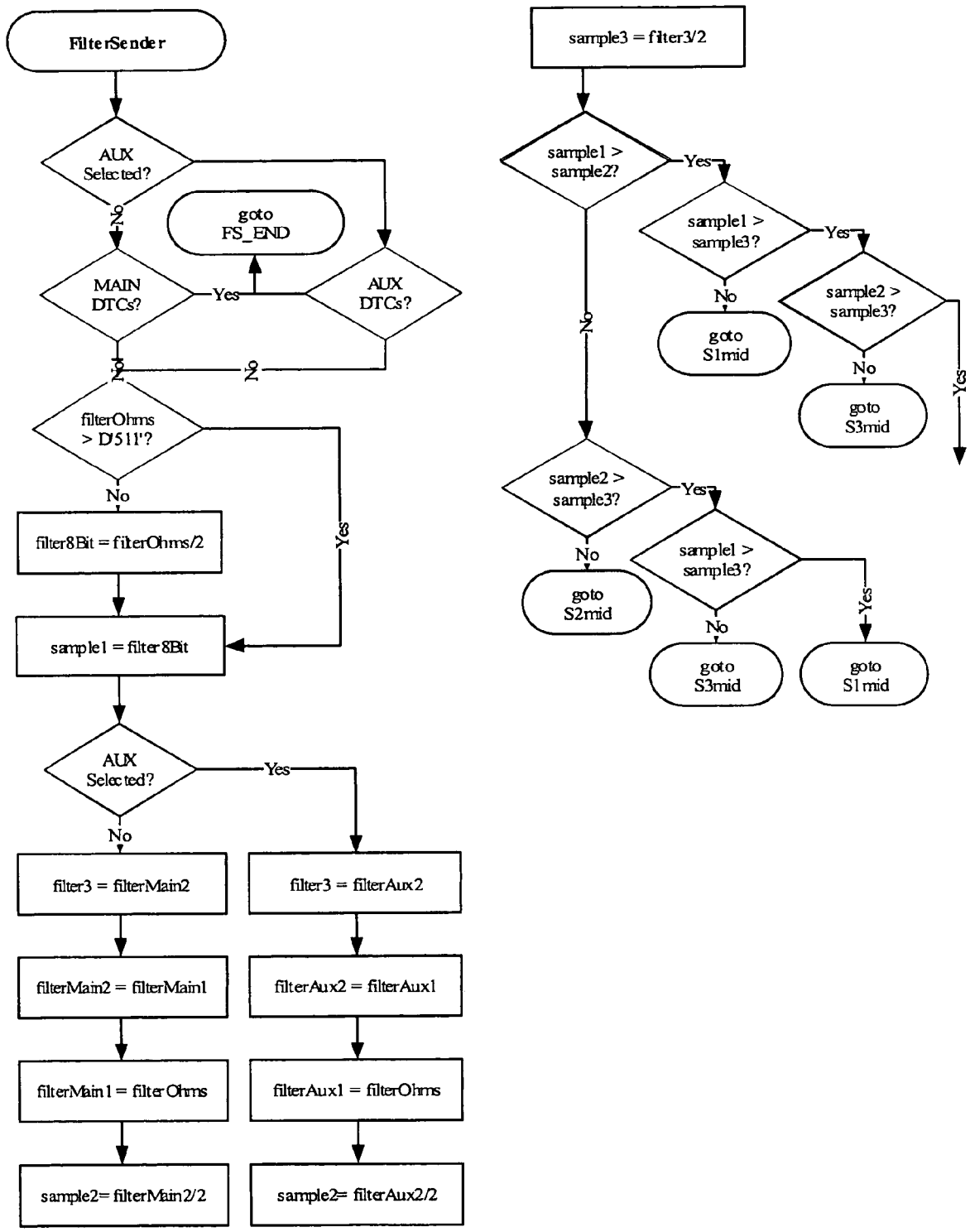
FIGS. 10a and 10b, FilterSender, are flow charts illustrating the filtering of the last three measurements from the main or auxiliary tank.
Figure 10B:
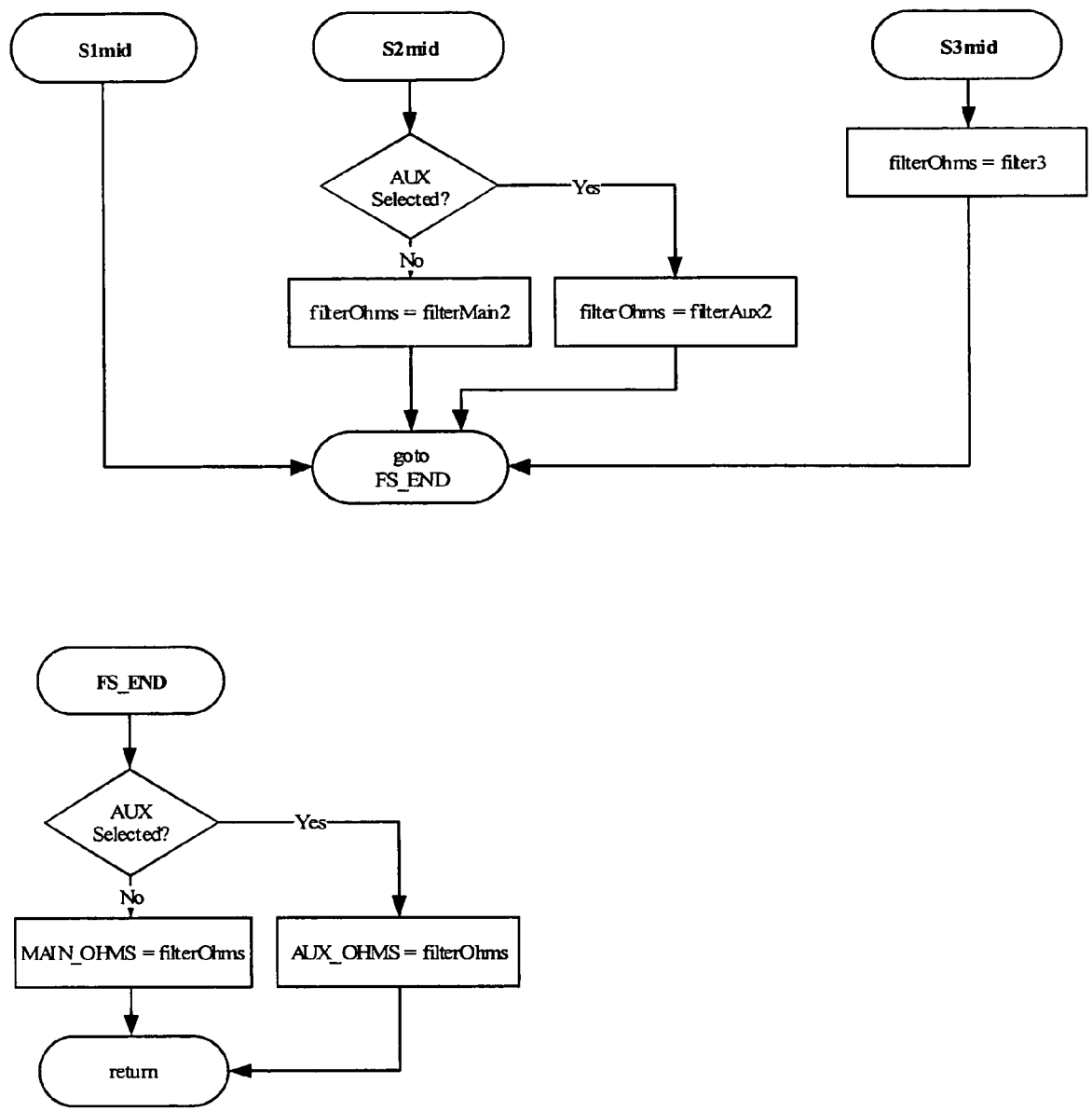
Figure 11A:
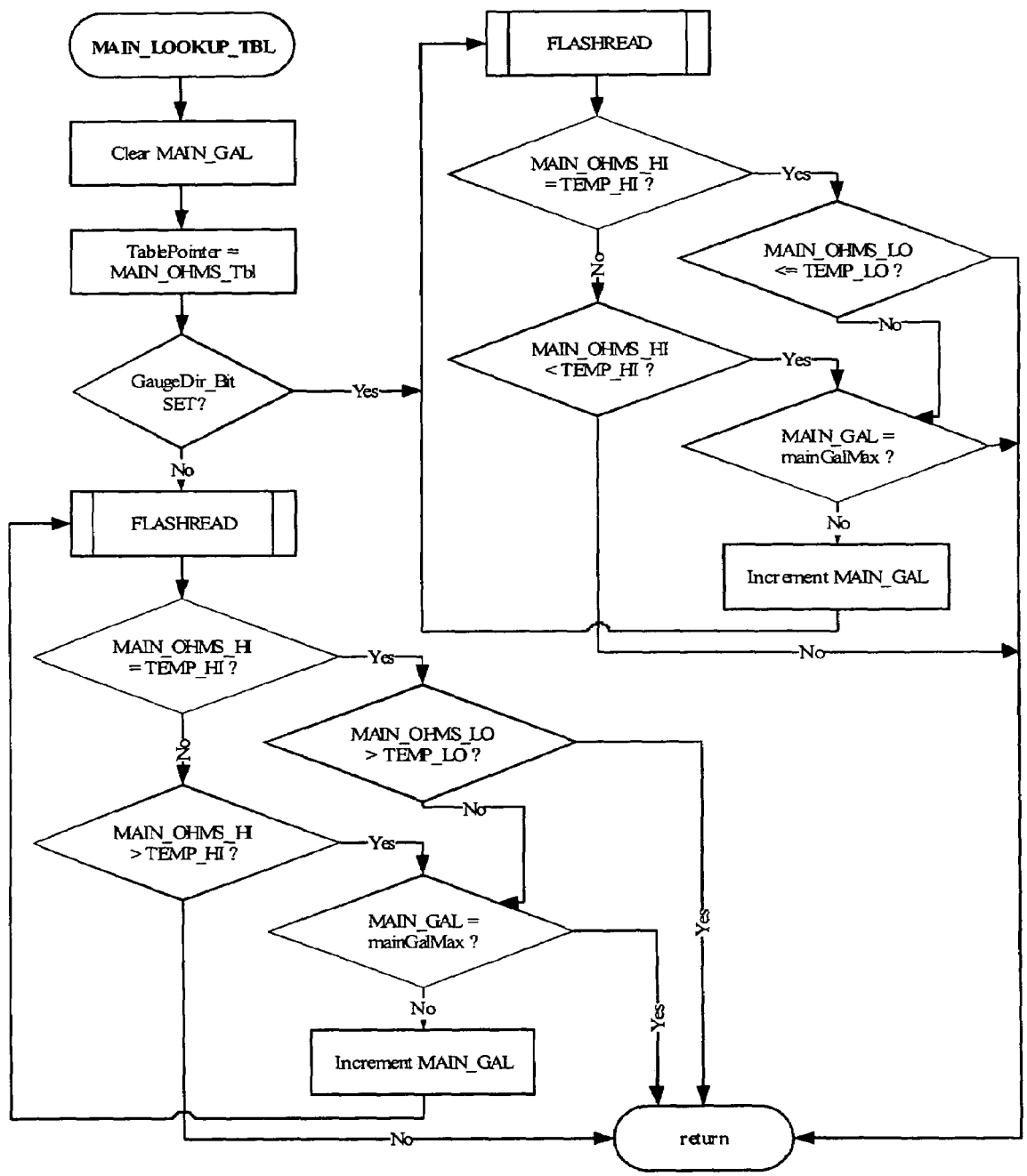
FIGS. 11a and 11b, MAIN_LOOKUP_TBL, are flow charts illustrating how the resistance reading is converted to a number of gallons of fuel for the main fuel tank.
Figure 11B:
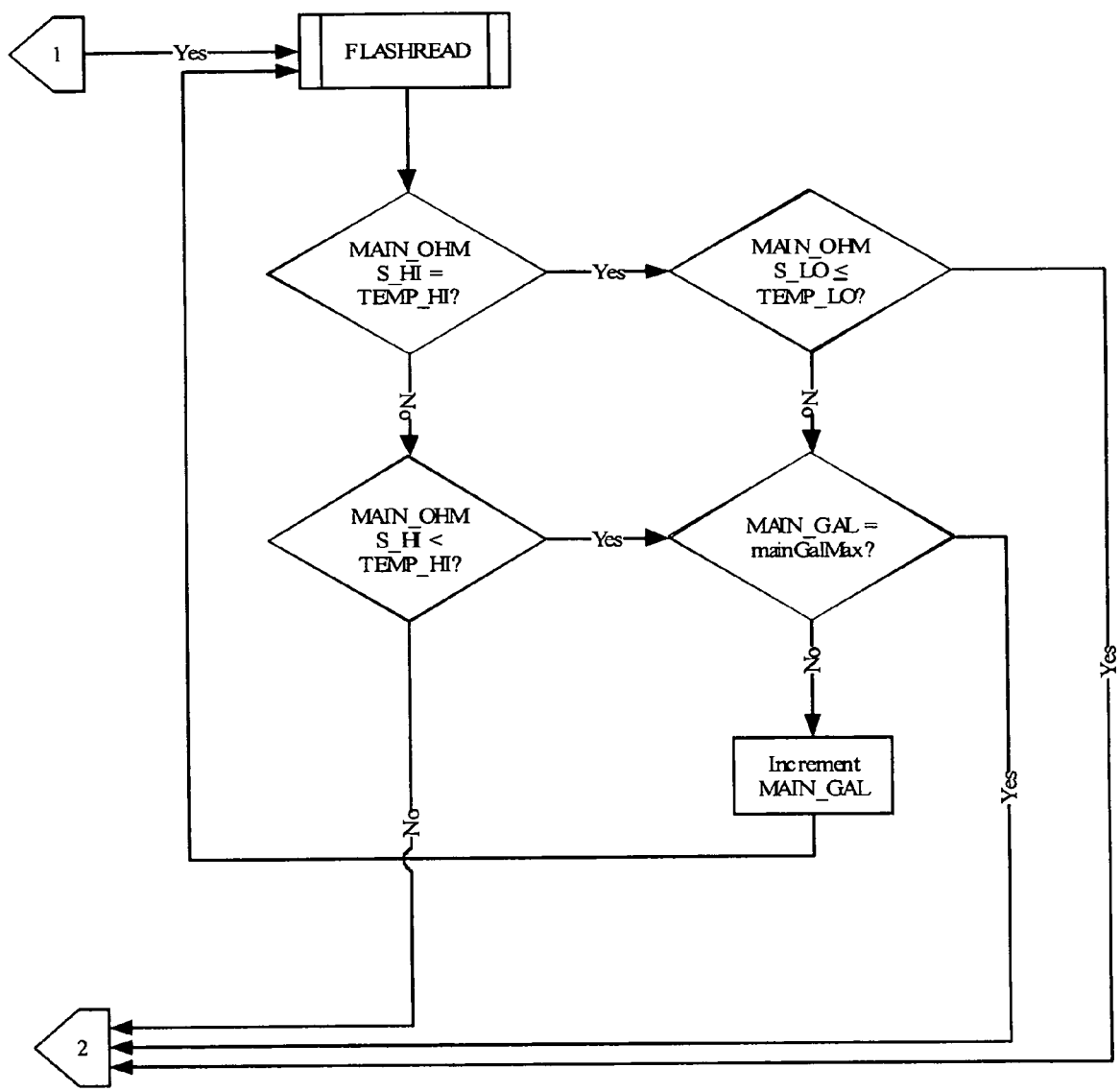

At the start of the Sender calculations, the senderWait variable is incremented. The program checks if the specified number of seconds have elapsed since the last execution of the sender calculations (senderWait=2 seconds). If this condition is not met, the program returns to the MAINLOOP (FIGS. 29 and 30) to wait for the next interrupt; otherwise, the LCD_Refresh subroutine (FIGS. 4a and 4b) is called. If the module is on the "STATUS" menu, the Status field is cleared to allow the status message to flash on the LCD. If an odd number of keyOnMinutes have elapsed, the reference voltage is refreshed by calling the INIT_VREF (FIG. 6) subroutine. The Main Tank is then Selected. The Main sending unit resistance is sampled by calling SampleSender (FIG. 7), and initializing and reading the gauges (FIG. 8), followed up updating the number of gallons (FIG. 9). The reading is filtered and checked for DTCs by calling filterSender (FIGS. 10a and 10b). The resistance reading is converted to a number of gallons by calling MAIN_LOOKUP_TBL (FIGS. 11a and 11b). The gallons number is stored in a queue of the last four values by calling GallonsQueue.

Figure 12A:
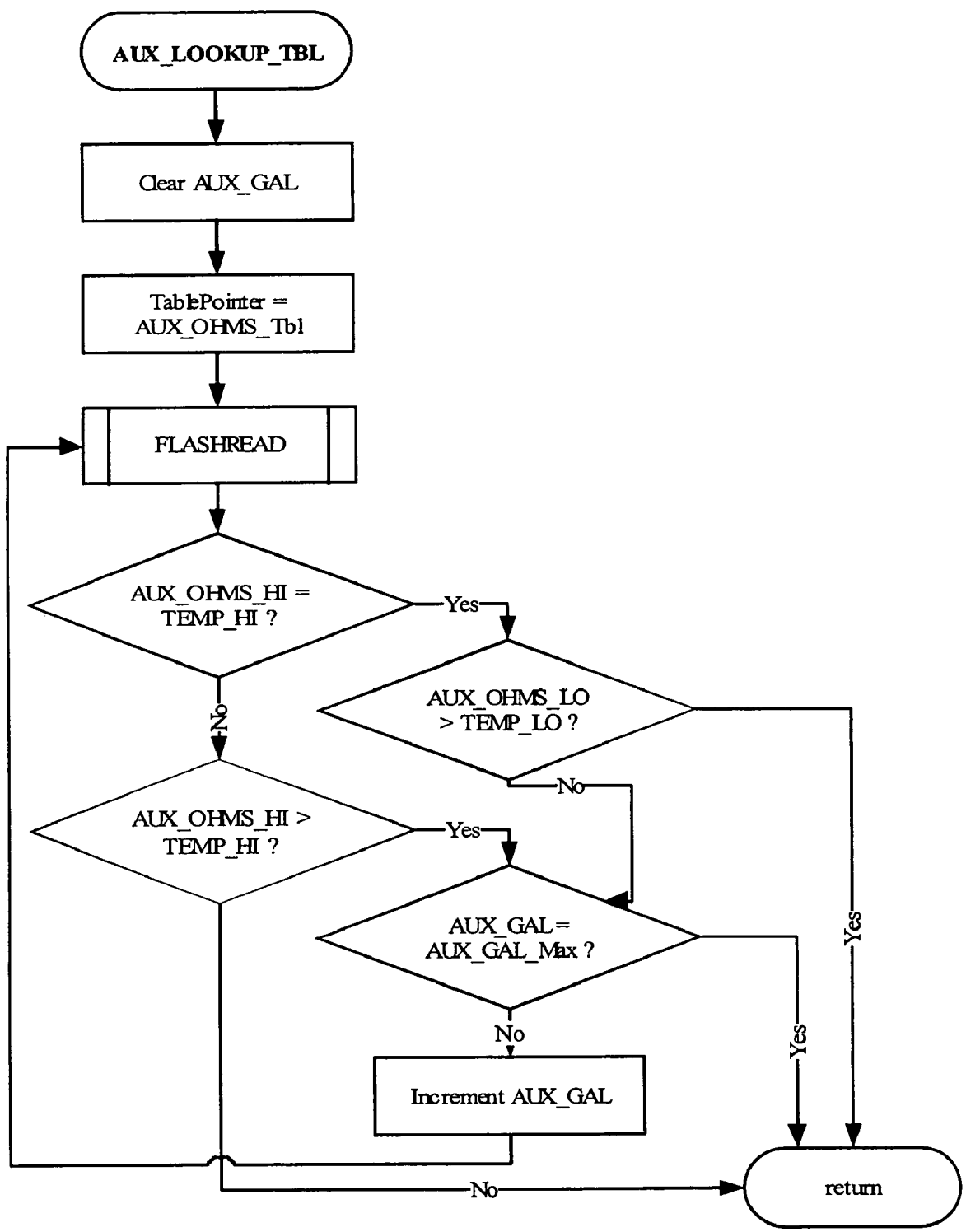
FIGS. 12a and 12b, AUX_LOOKUP_TBL, are flow charts illustrating how the resistance reading is converted to a number of gallons of fuel for the auxiliary fuel tank.
Figure 12B:
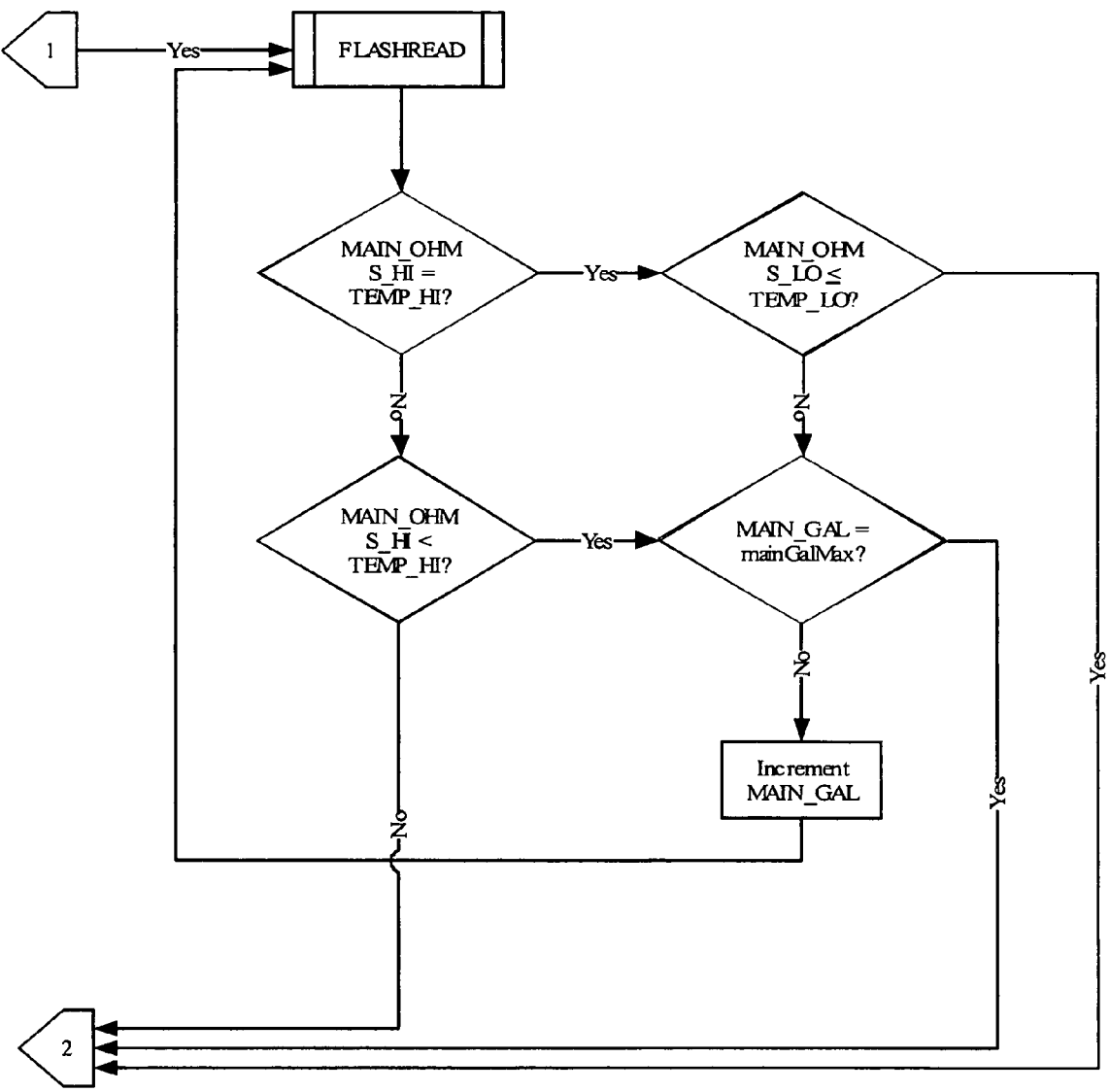
Figure 41A:
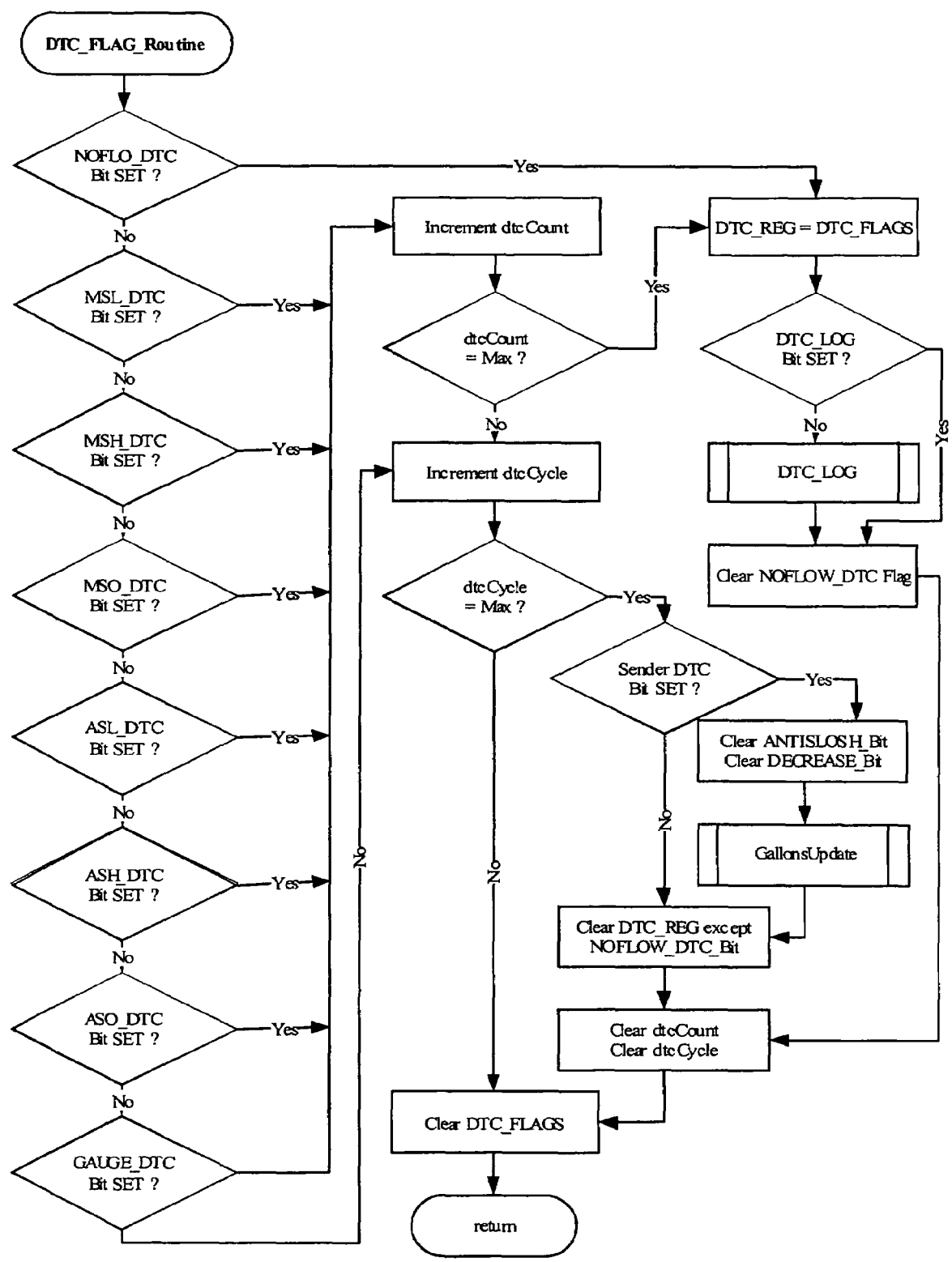
FIGS. 41a and 41b, DTC_FLAG_Routine, are flow charts illustrating the counting of flags for Diagnostic Trouble Codes.
Figure 41B:
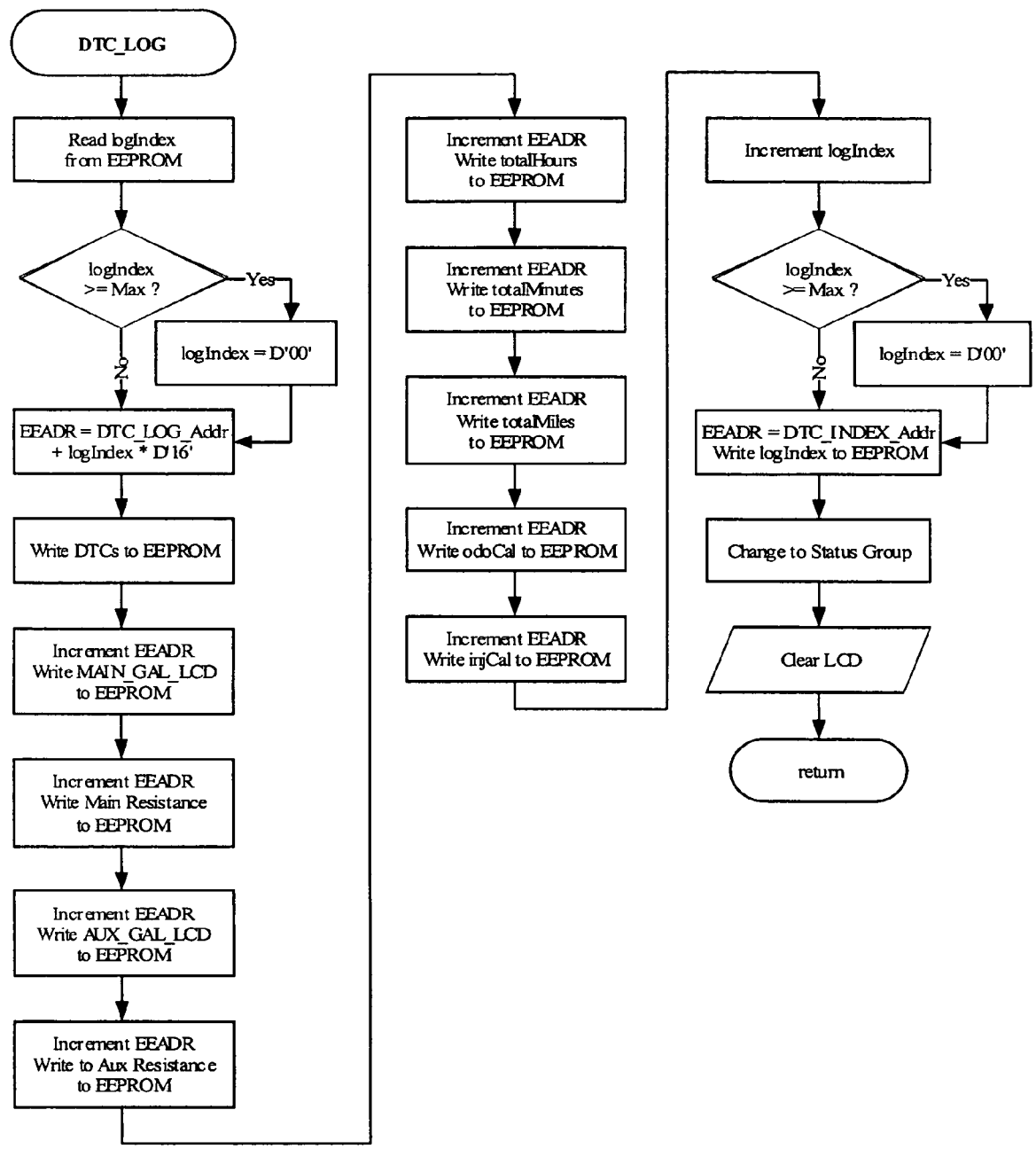

If the vehicle has an auxiliary fuel tank, the Auxiliary tank is selected and the above sequence is repeated: SampleSender, FilterSender, AUX_LOOKUP_TBL (FIGS. 12a and 12b), GallonsQueue. The DTC_FLAG_Routine (FIGS. 41a and 41b) is called to count Flags for Diagnostic Trouble Codes.

The senderWait variable is cleared and the senderCount variable is incremented. If the senderCount is less than 4, the program returns to the MAINLOOP (FIGS. 29 and 30). Otherwise, the senderCount is cleared.

Figure 40A:
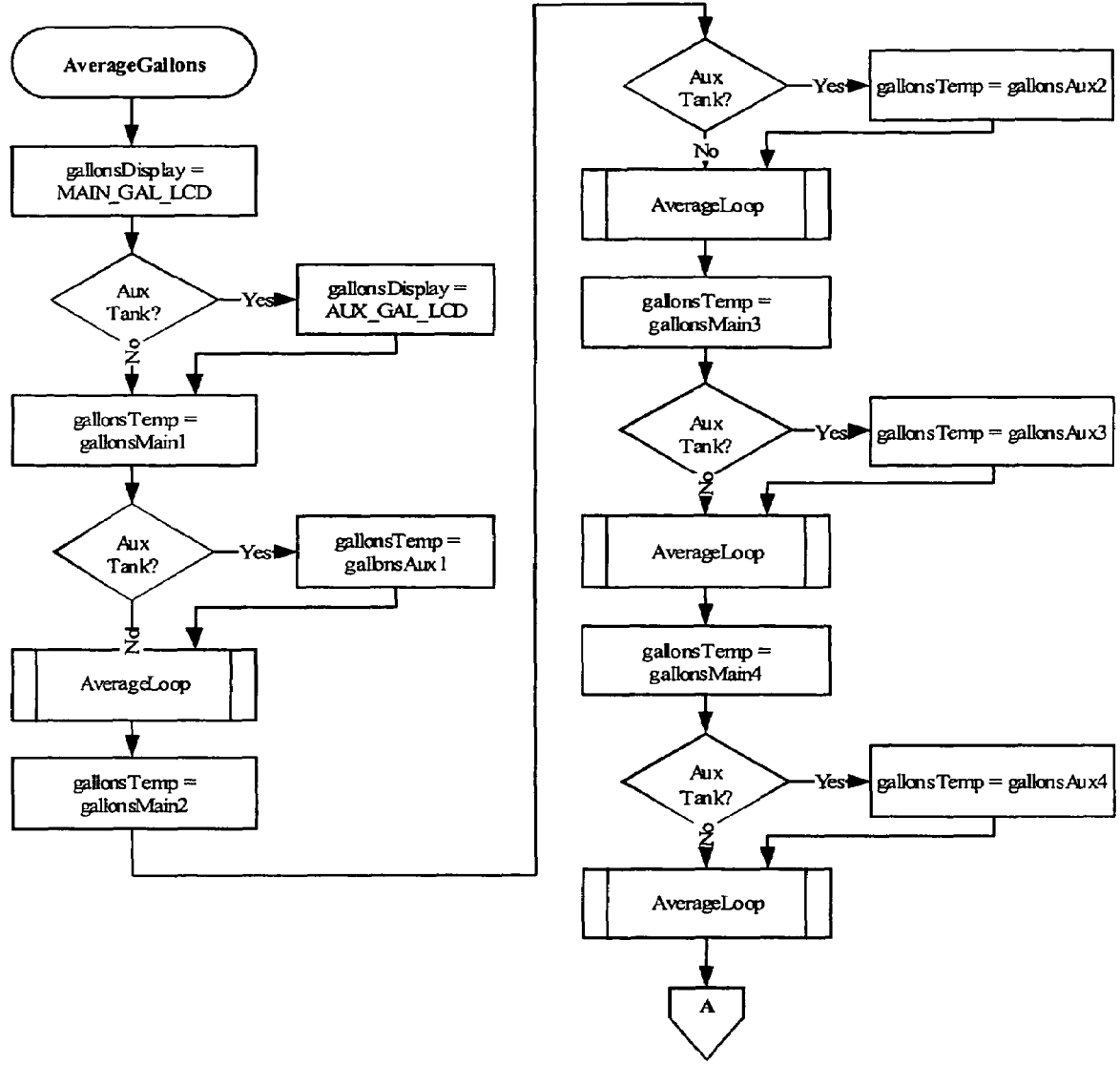
FIGS. 40a, 40b and 40c, AverageGallons, are flow charts illustrating the average of the last four gallons readings from the main or auxiliary tank.
Figure 40B:
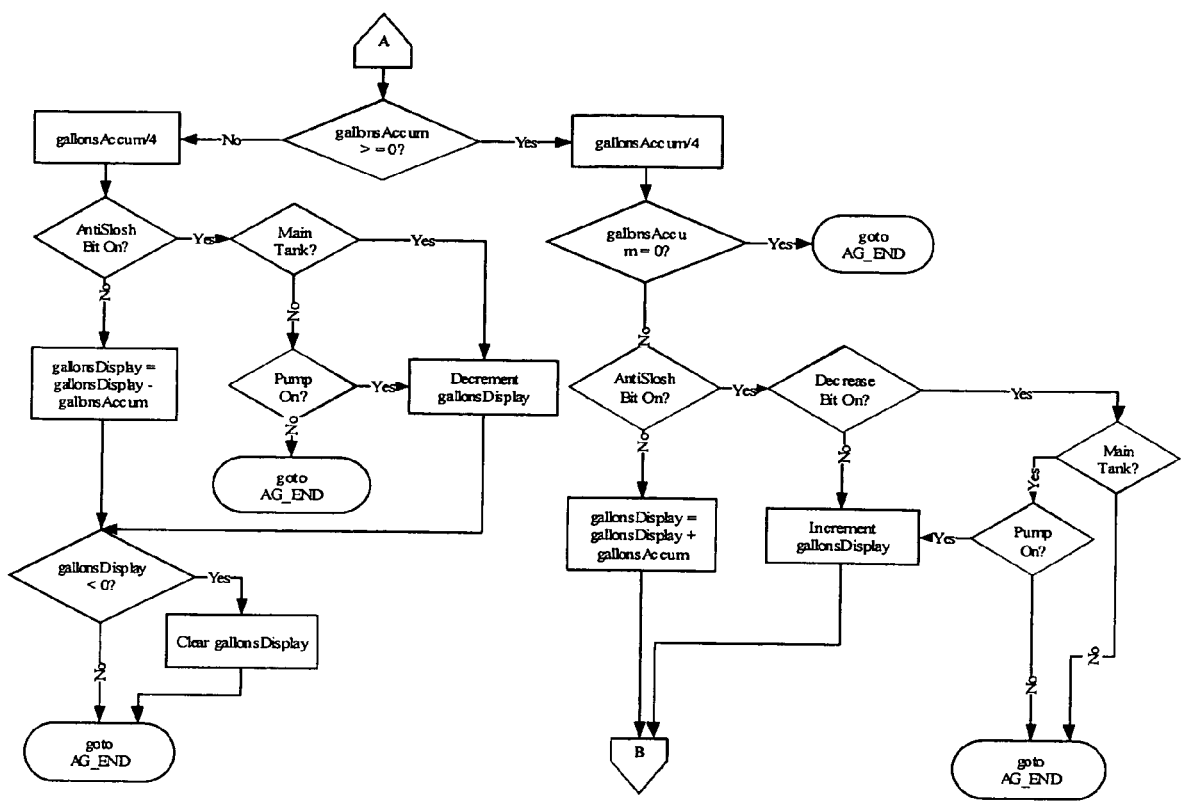
Figure 40C:
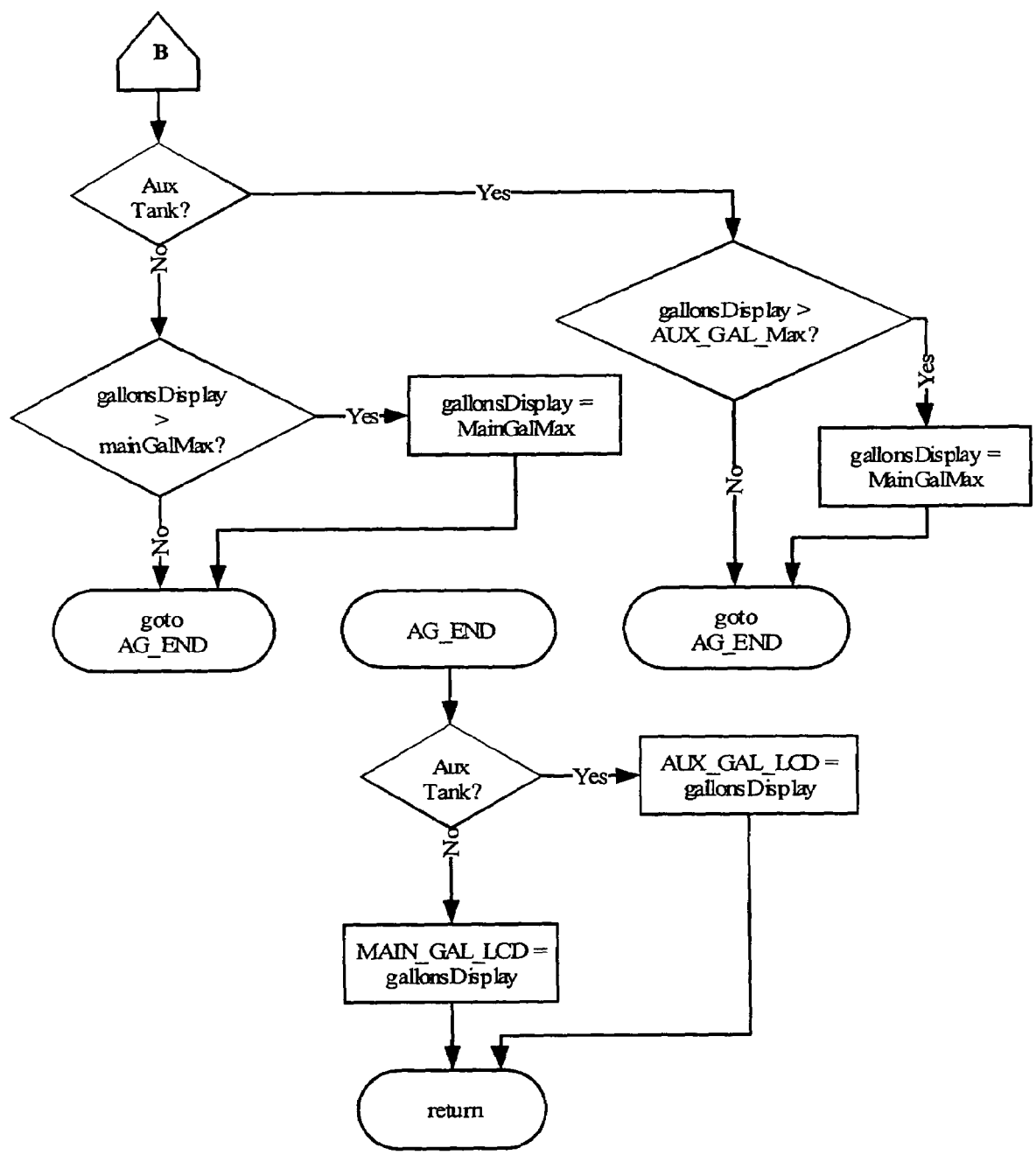
Figure 42:
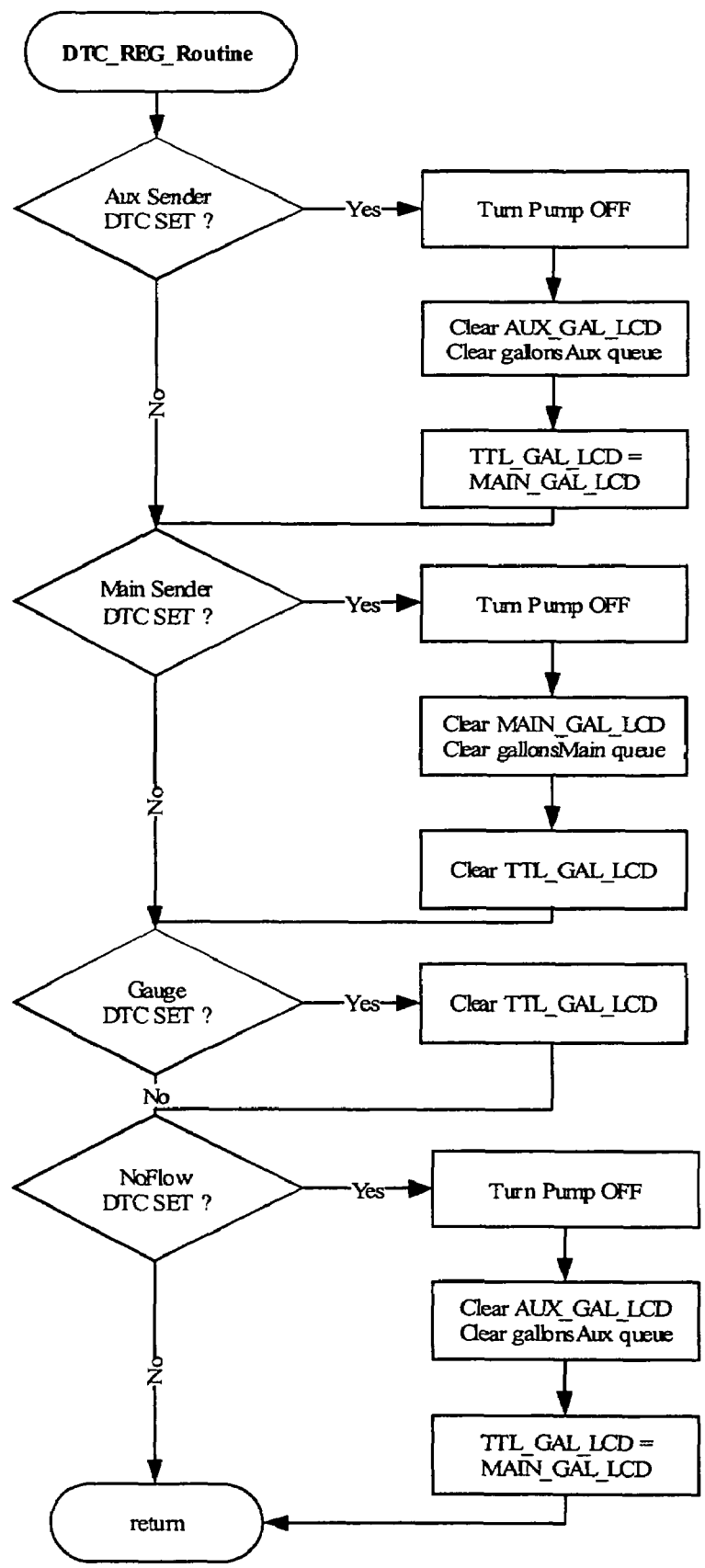
FIG. 42, DTC_REG_Routine, is called to log and respond to DTC flags.
Figure 43:
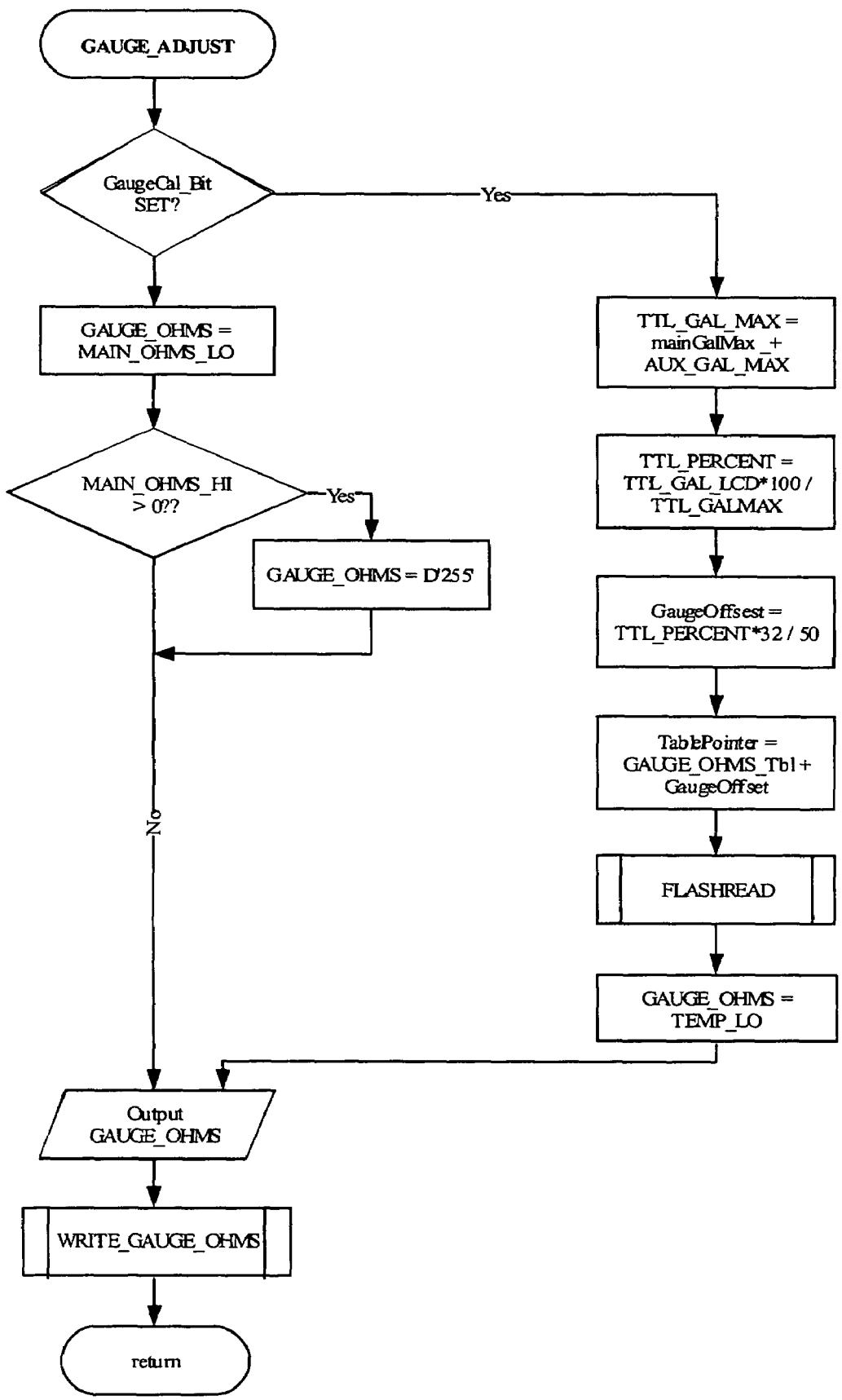
FIG. 43, GAUGE_ADJUST, is a flow chart illustrating calculation of the fuel gauge position based on the levels of the main and auxiliary fuel tanks.
Figure 44A:
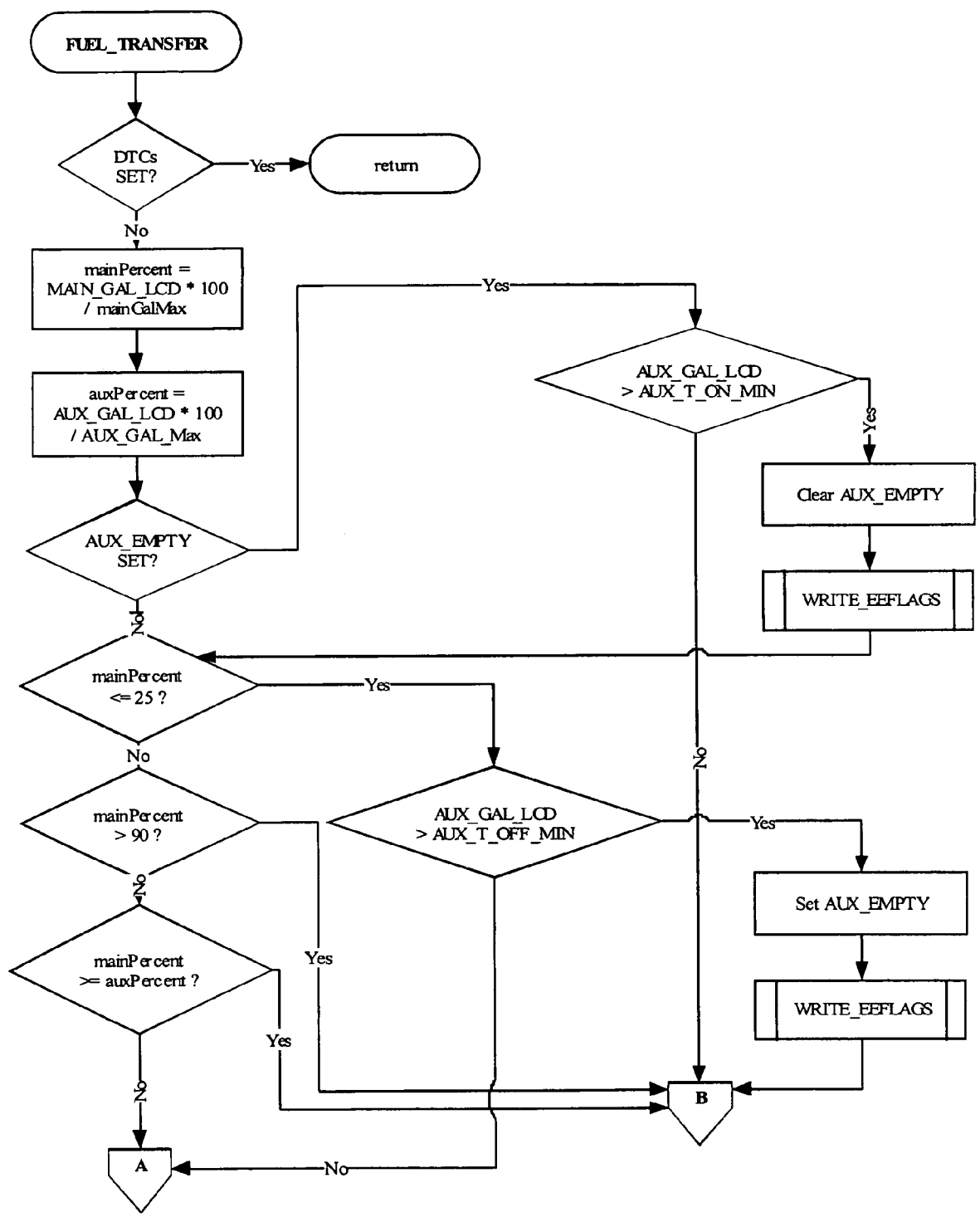
FIGS. 44a and 44b, FUEL_TRANSFER, is a subroutine called to check for conditions to start or stop the transfer of fuel.
Figure 44B:
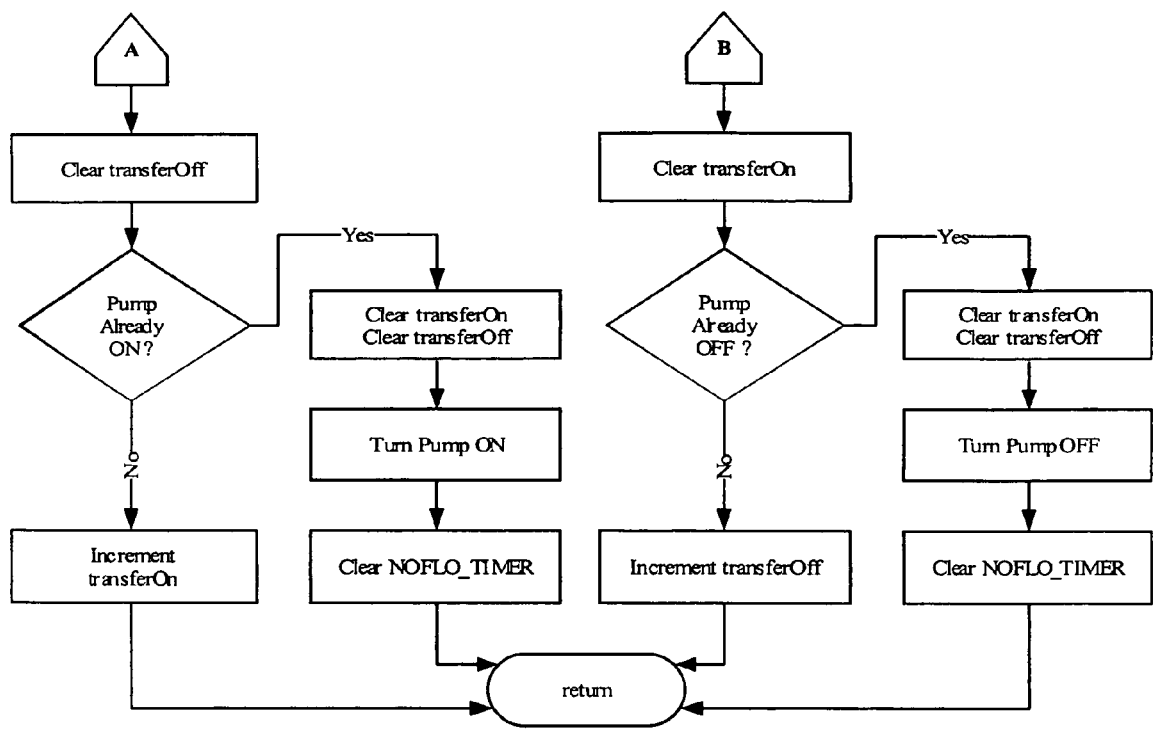

The Main Tank is selected and AverageGallons (FIGS. 40a, 40b, and 40c) is called to create an average of the four readings of gallons in the queue. If the vehicle has an Auxiliary fuel tank, the Aux tank is selected and AverageGallons (FIGS. 40a, 40b, and 40c) is called to average the four Auxiliary tank readings. The total gallons is calculated using the formula: TTL_GAL_LCD=MAIN_GAL_LCD+AUX_GAL_LCD The DTC_REG_Routine (FIG. 42) is called to log and respond to DTC flags. The GAUGE_ADJUST subroutine (FIG. 43) is called to update the position of the fuel gauge. If the vehicle does not have an Auxiliary fuel tank, the program returns to the MAINLOOP (FIGS. 29 and 30). Otherwise, the FUEL_TRANSFER subroutine (FIGS. 44a and 44b) is called to check for conditions to start of stop the transfer of fuel. If the Pump is ON, the NoFlow_Routine (FIG. 45) is called to verify that the flow rate of the pump is appropriate. The program then returns to the MAINLOOP (FIGS. 29 and 30) to wait for the next timer interrupt.

Figure 27A:
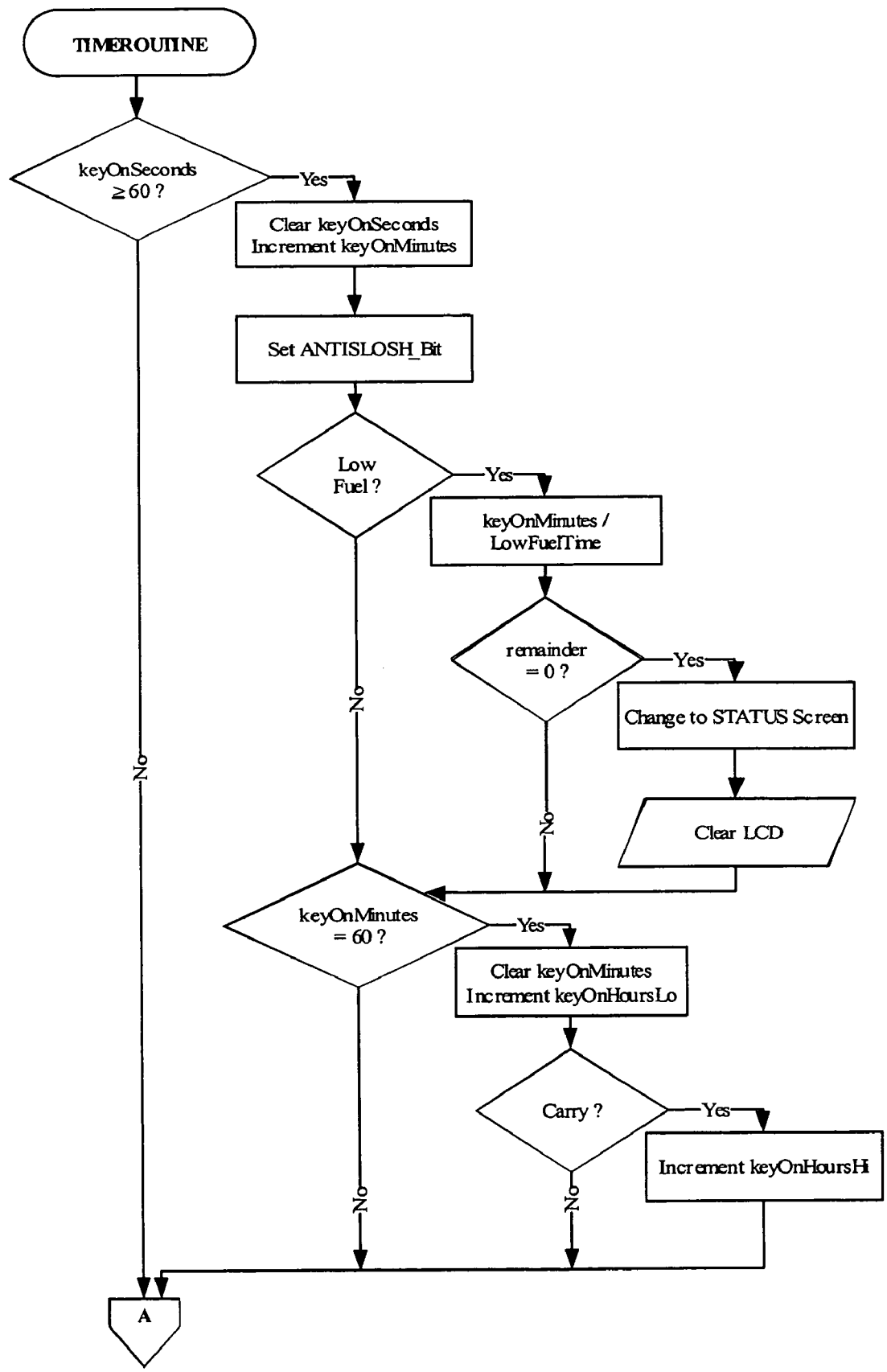
FIGS. 27a, 27b and 27c, TIMEROUTINE, are flow charts illustrating the timer routine sequence, which updates the keyOn, Trip1, Trip2, and Total times.
Figure 27B:
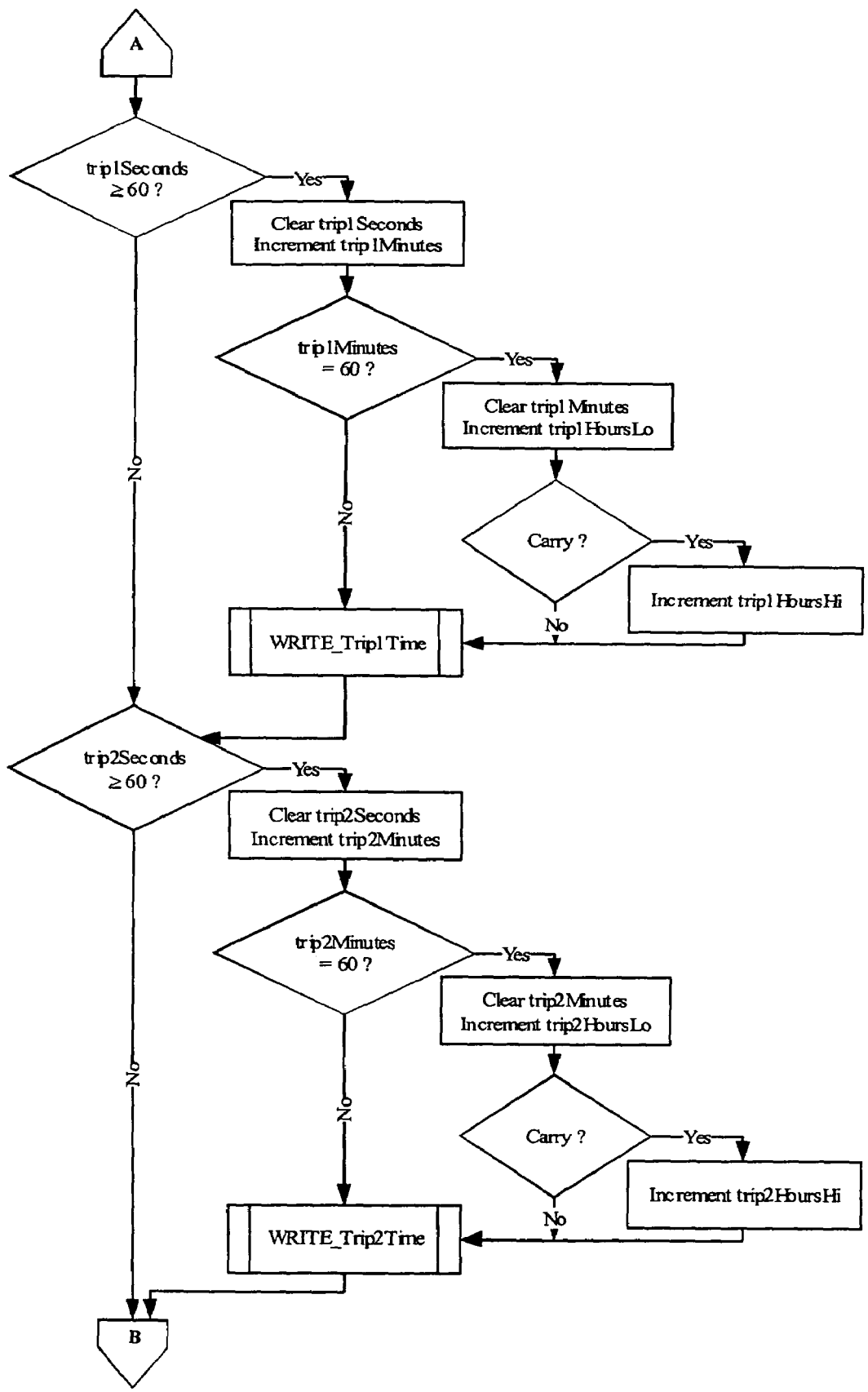
Figure 27C:
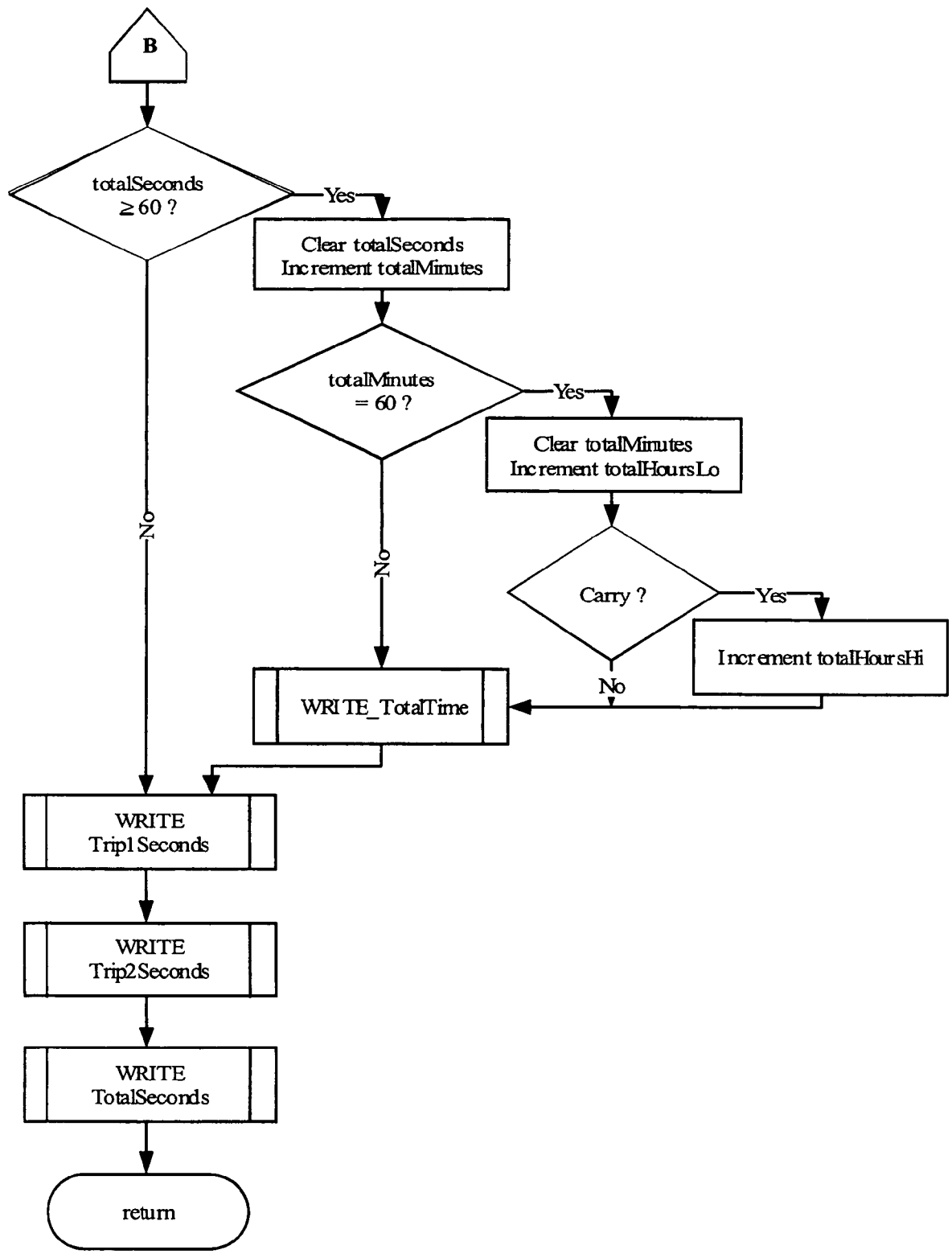
Figure 31:
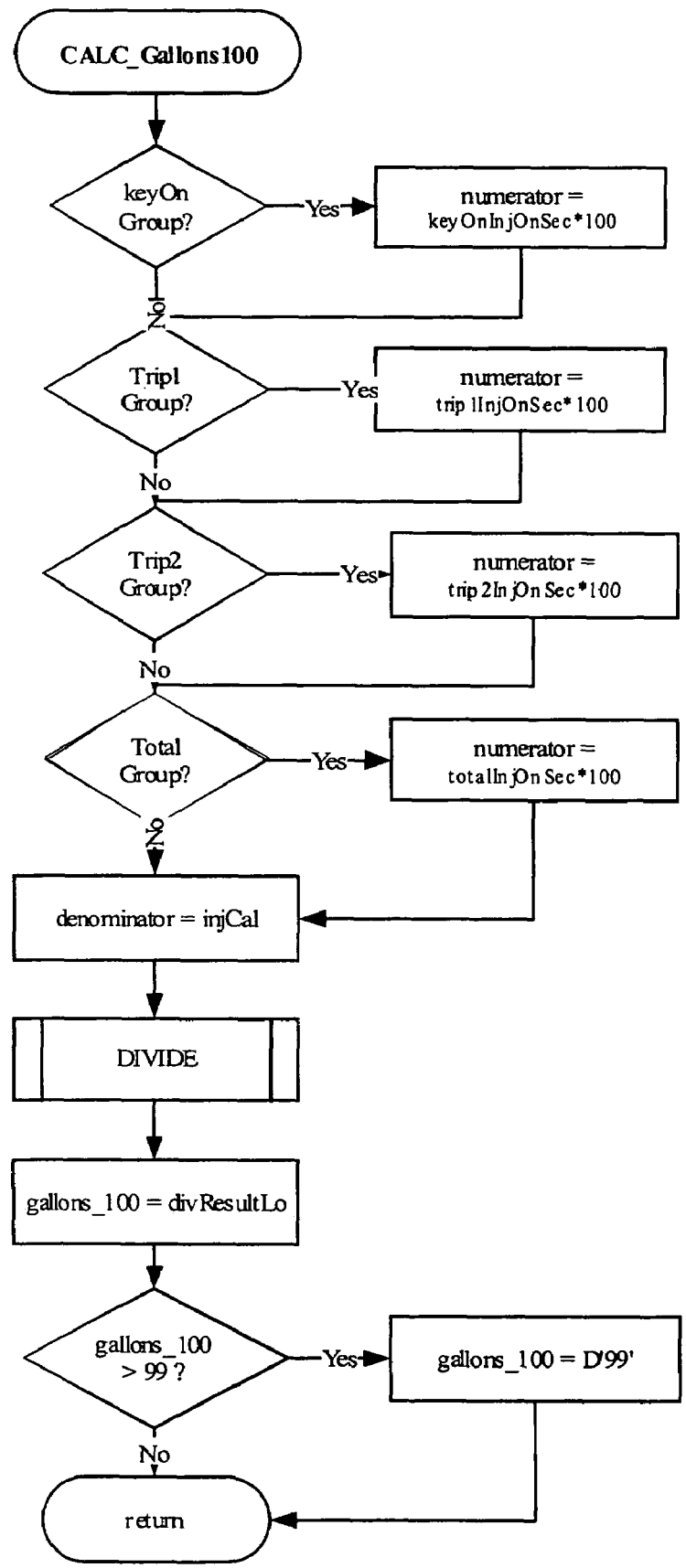
FIG. 31, CALC_Gallons100, is a flow chart illustrating the gallon calculation sequence, where the number of gallons to 1/100th of a gallon are calculated for keyOn, Trip 1, Trip 2, and Total menus.
Figure 32A:
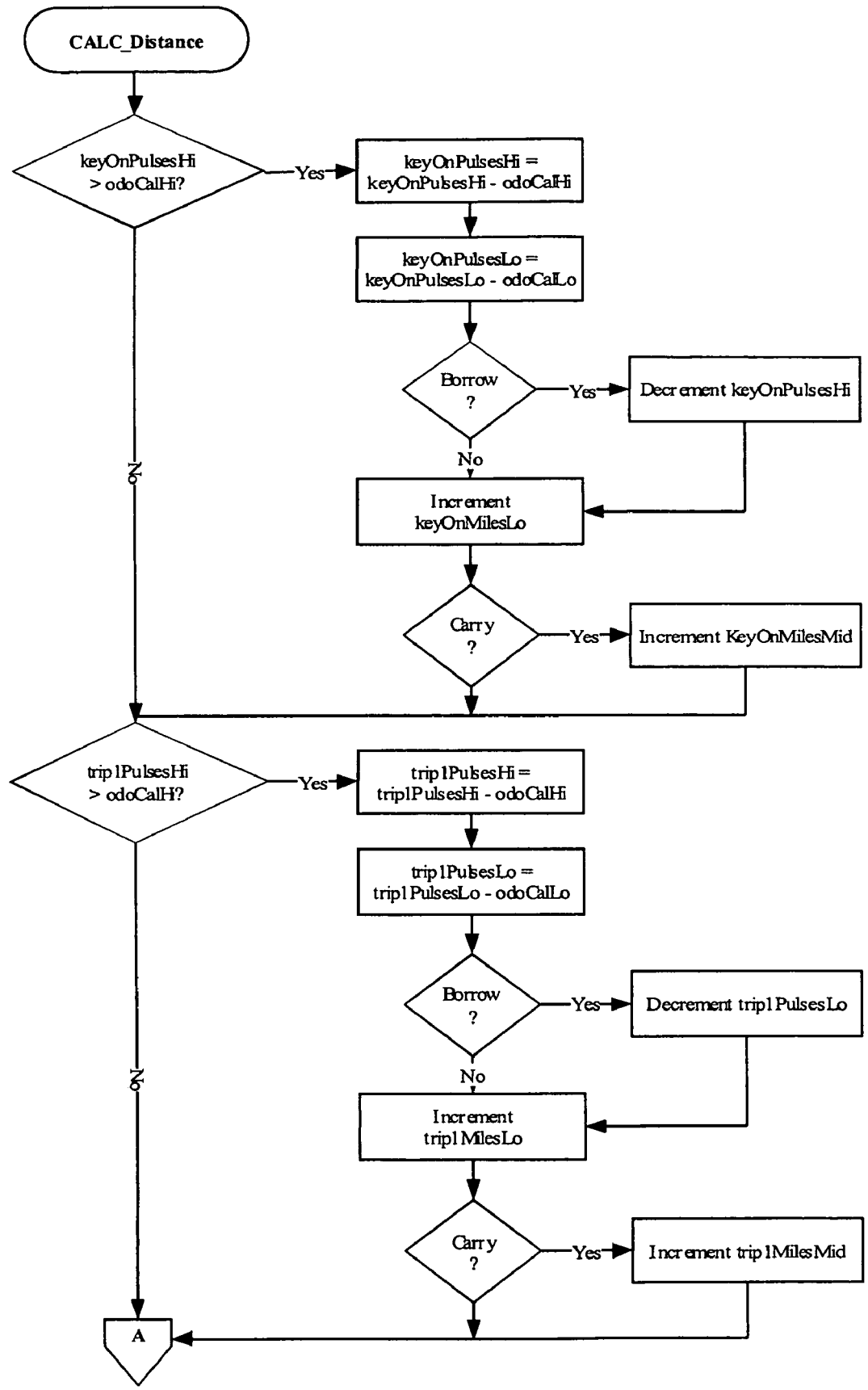
FIGS. 32a, 32b and 32c, CALC_Distance, are flow charts illustrating the distance calculation sequence which updates data on keyOn, Trip 1, Trip 2, and Total Distance menus.
Figure 32B:
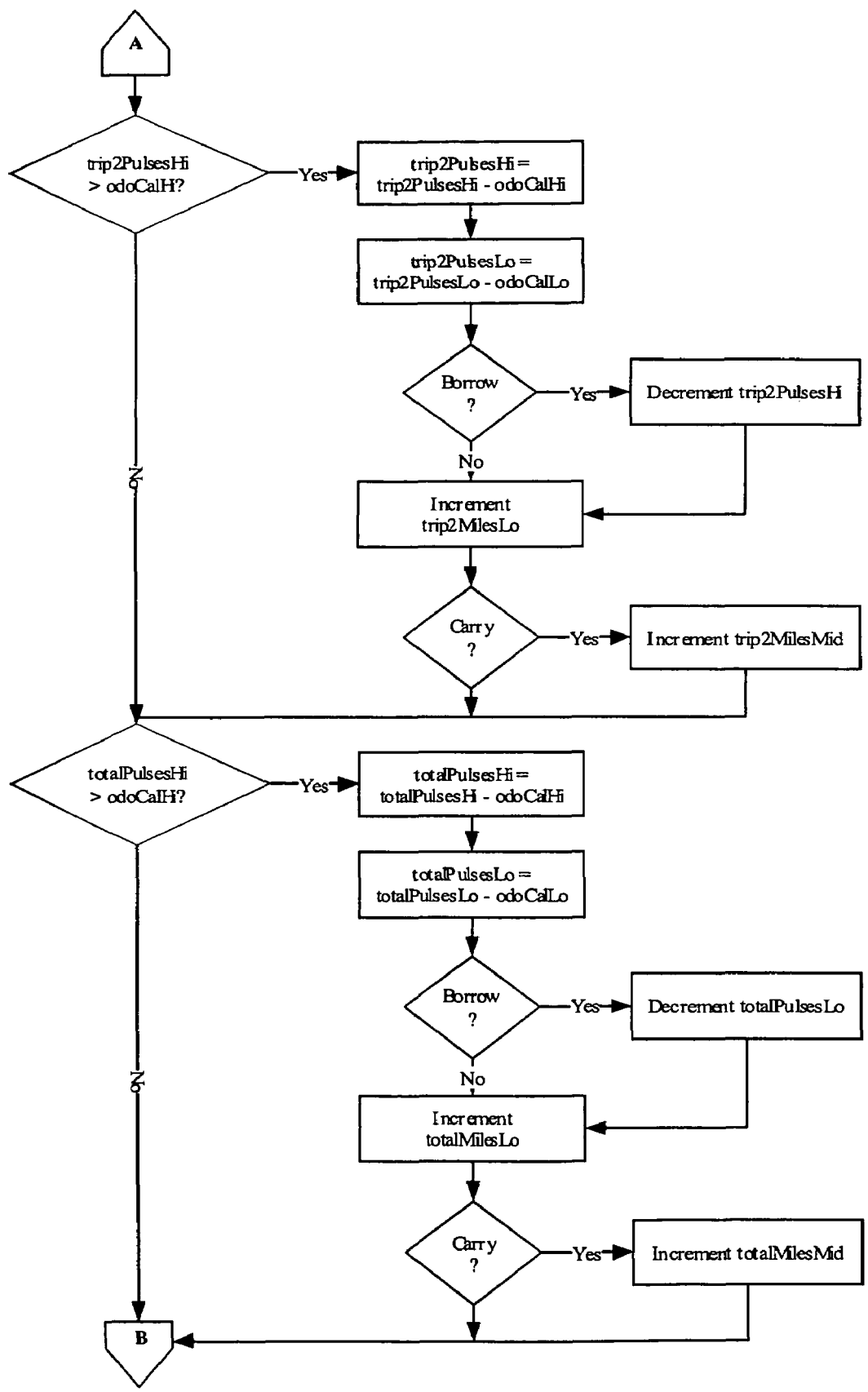
Figure 32C:
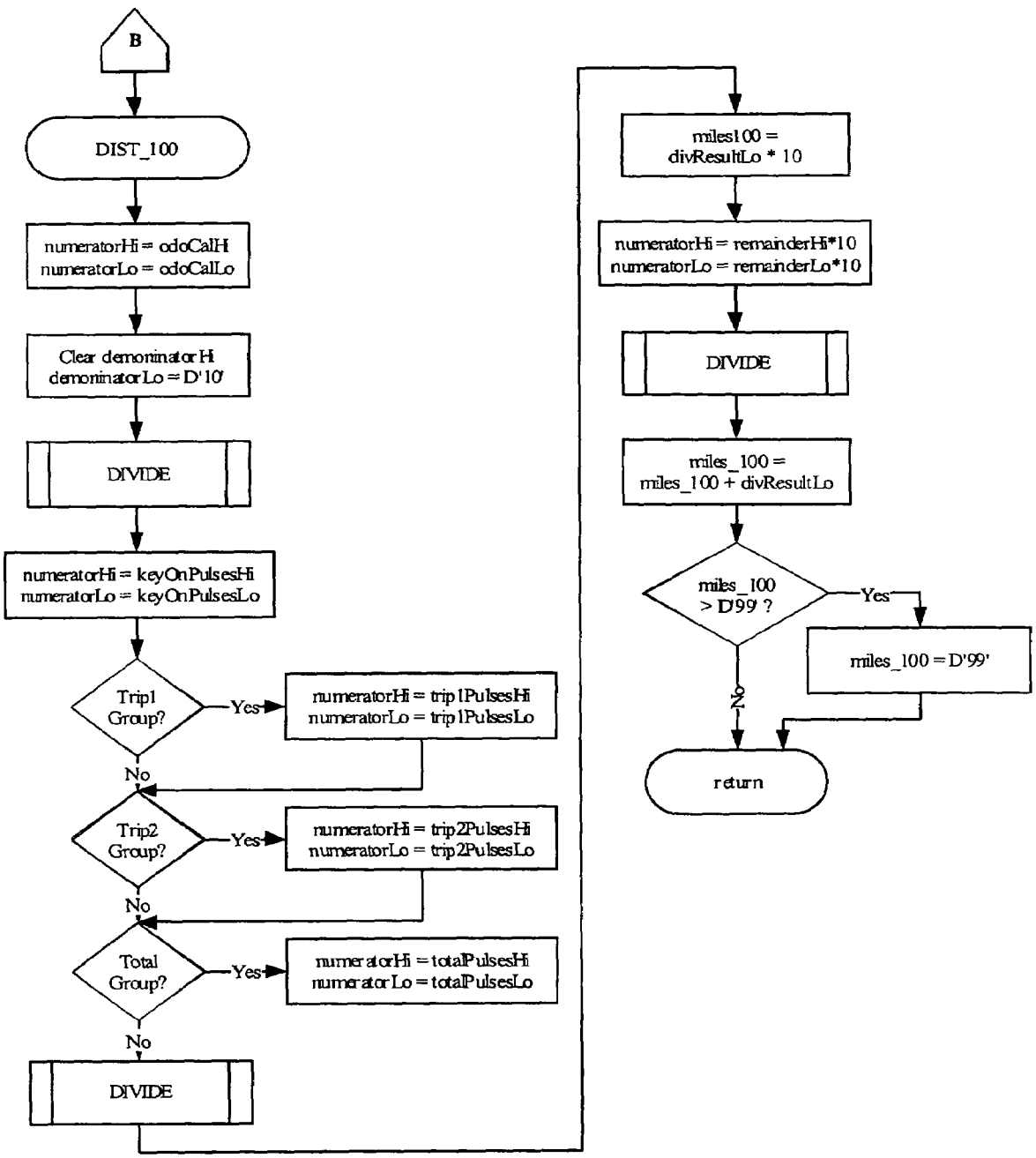
Figure 33:
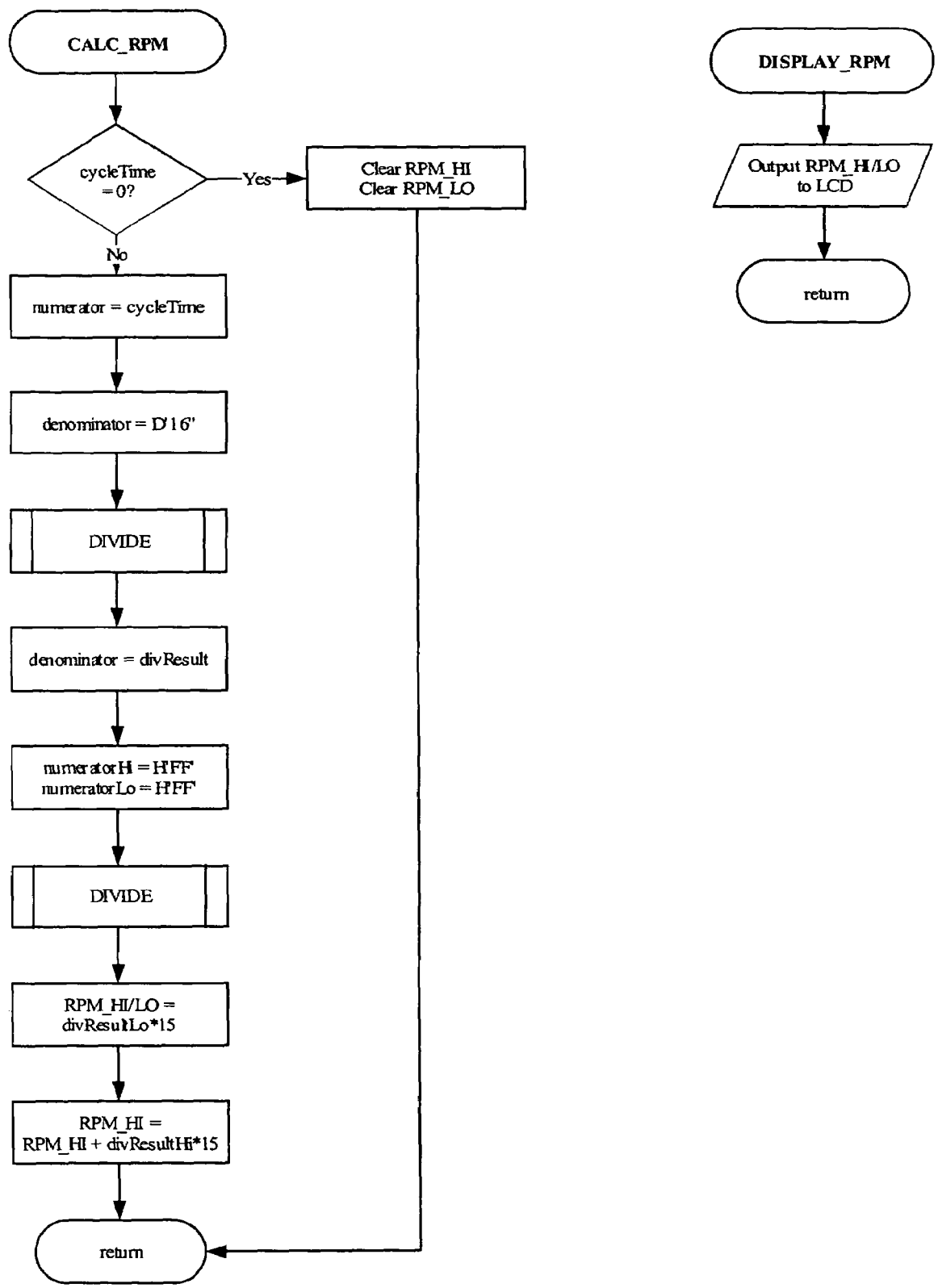
FIG. 33, CALC_RPM, is a flow chart illustrating the sequence used in calculating revolutions per minute based on the period of the fuel injector.
Figure 34:
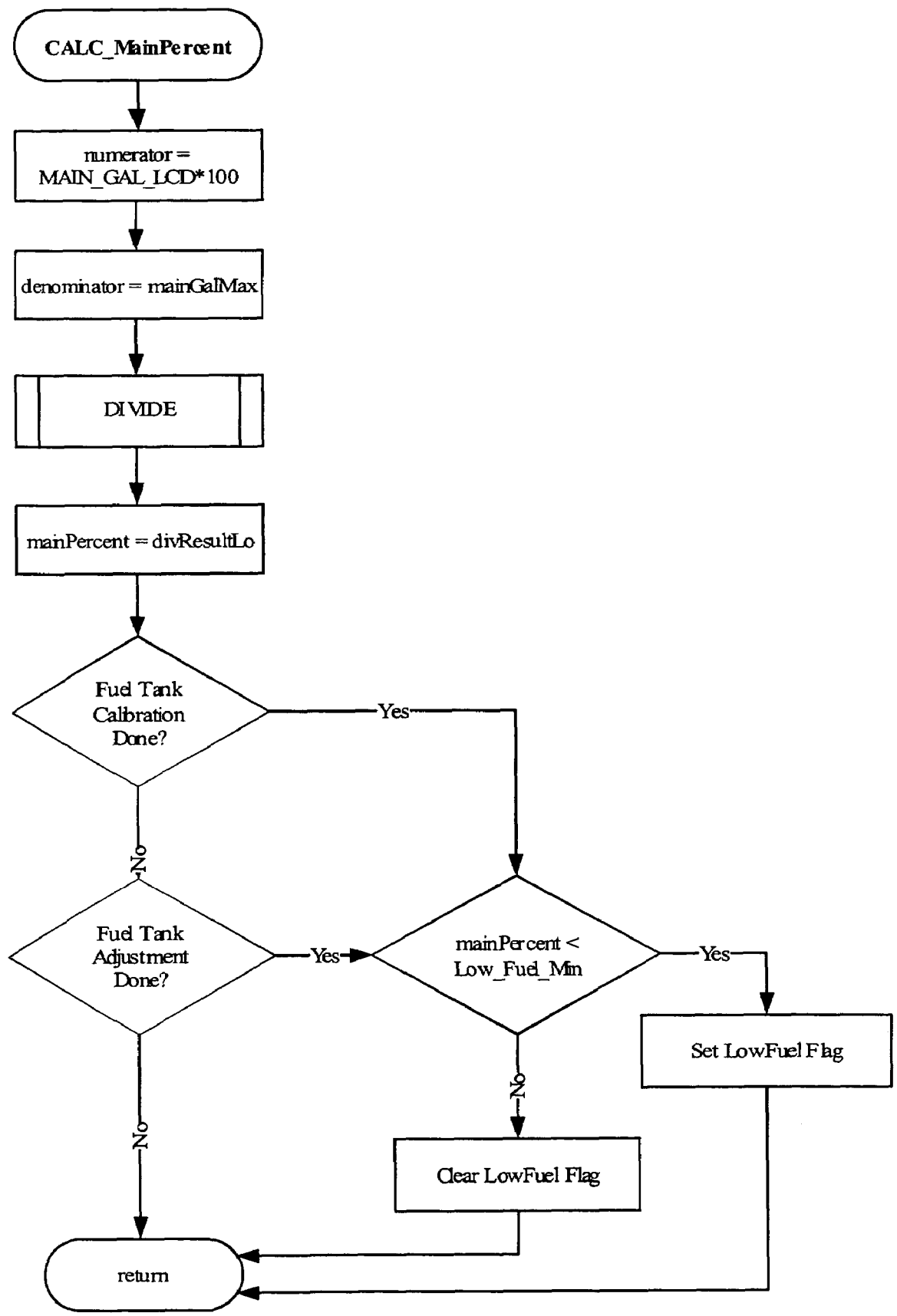
FIG. 34, CALC_MainPercent, is a flow chart illustrating the calculation sequence for determining the percentage of fuel in the main tank and setting fuel warning levels.
Figure 35:
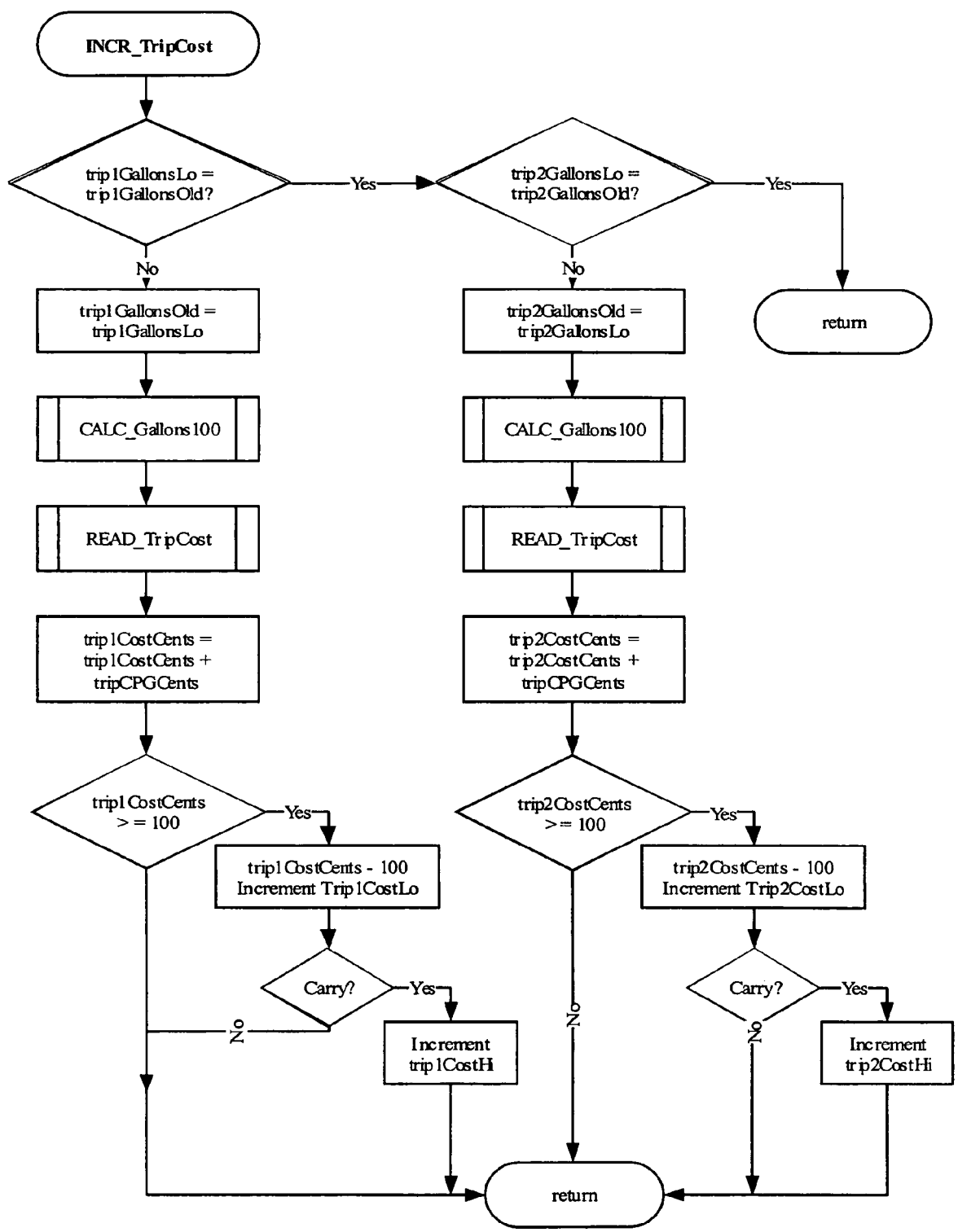
FIG. 35, INCR_TripCost, is a flow chart illustrating the trip cost calculation sequence, which reviews whether the Trip 1 or Trip 2 gallons have changed and update the accumulated cost.
Figure 36:
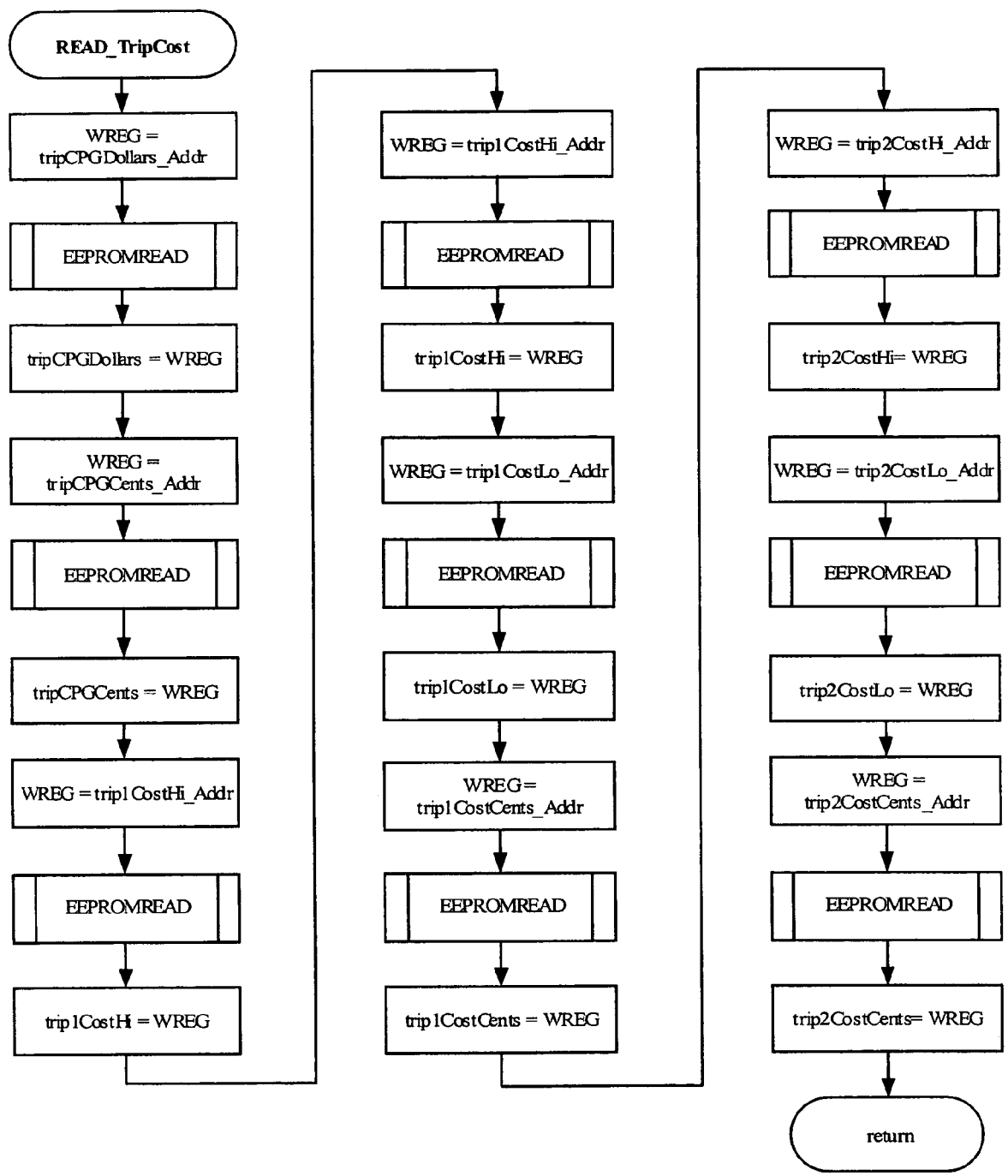
FIG. 36, READ_TripCost, is a flow chart illustrating the sequence of reading the accumulated cost stored in EEPROM.
Figure 37:
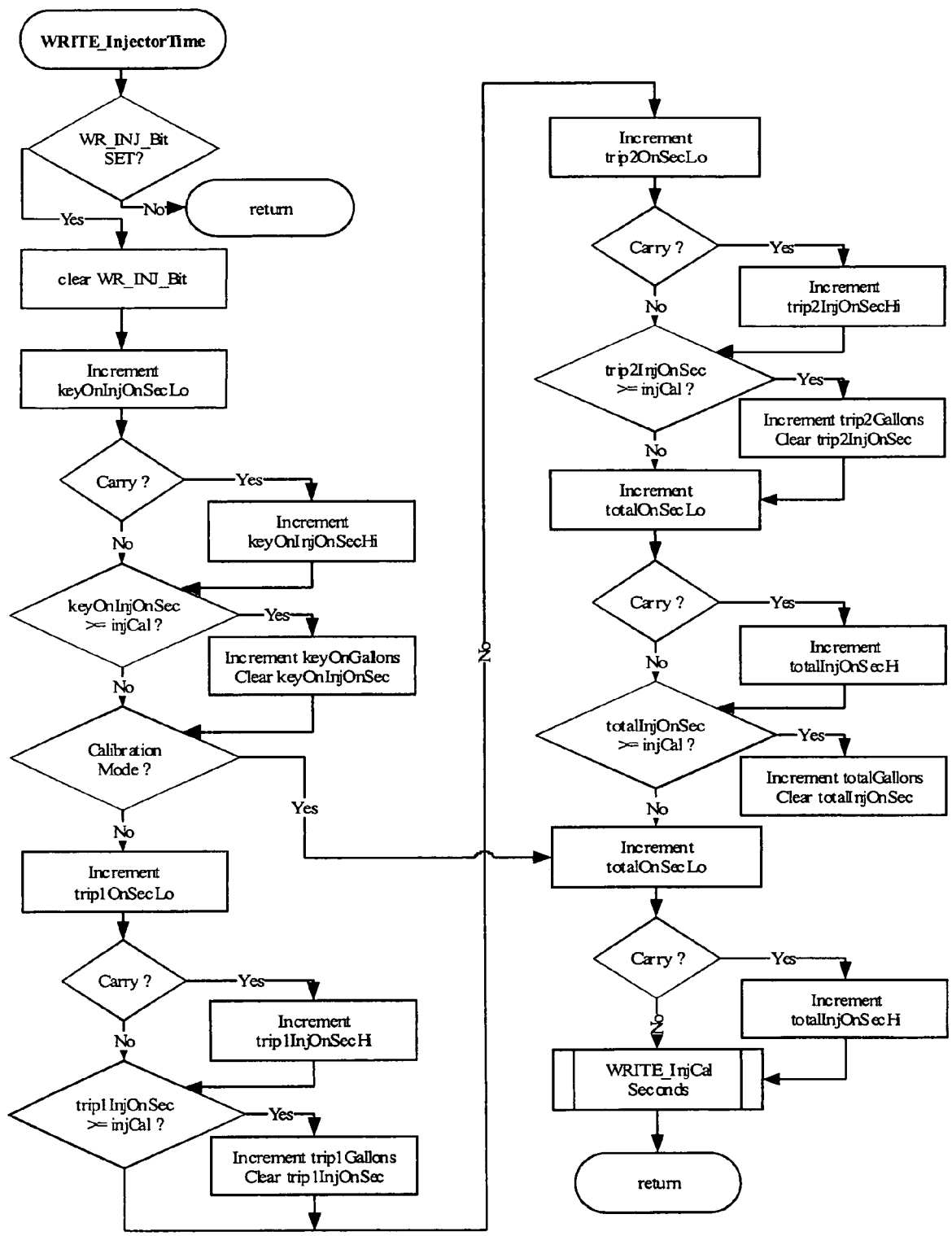
FIG. 37, WRITE_InjectorTime, is a flow chart illustrating how the accumulated injector ON Time is stored for the keyOn, Trip 1, Trip 2, and Total menus.
Figure 38:
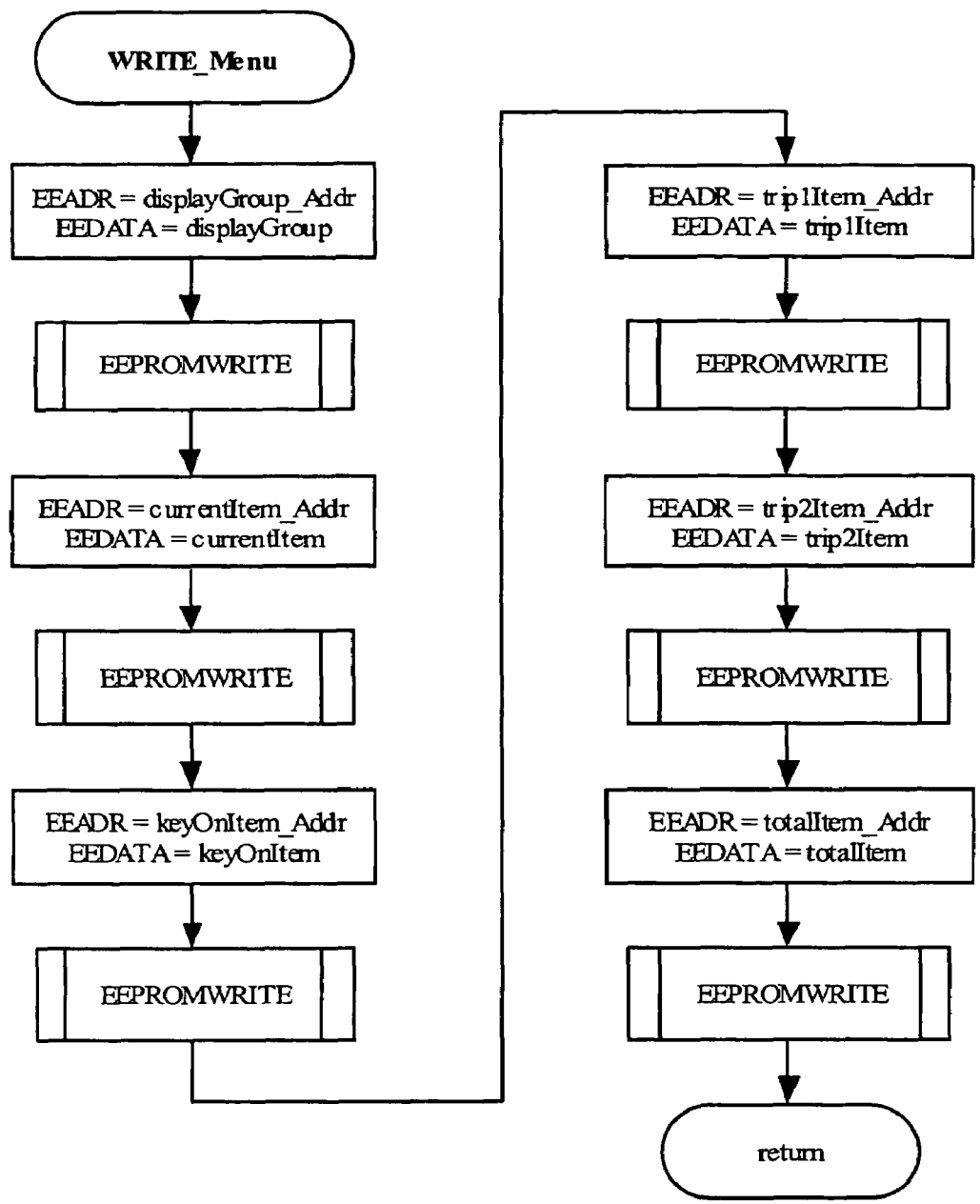
FIG. 38, WRITE_Menu, is a flow chart illustrating the sequence for storing the currently selected MENU and ITEM.

The FMS calculations are started by calling CAL_DSP_MODE to display a rotating character in the top-right corner of the LCD when the injector calibration is running. The TIMEROUTINE (FIGS. 27a, 27b, and 27c) is called to update the KeyOn, Trip1, Trip2, and Total times. The CALC_Gallons100 subroutine (FIG. 31) is called to calculate the 100ths of gallons used for the KeyOn, Trip1, Trip2, or Total menu. The CALC_Distance subroutine (FIGS. 32a, 32b, and 32c) is called to update the KeyOn, Trip 1, Trip 2, and Total distances. CALC_RPM (FIG. 33) is called to calculate the current RPM based on the period of the fuel injector. CALC_MainPercent (FIG. 34) is called to calculate the percentage of fuel in the Main Tank. INCR_TripCost (FIG. 35) is called to check if the Trip1 or Trip2 gallons have changed and update the accumulated cost utilizing subroutines CALC_Gallons100 (FIG. 31) and READ_TripCost (FIG. 36). WRITE_InjectorTime (FIG. 37) is called to store the accumulated injector ON Time for the KeyOn, Trip1, Trip2, and Total menus. The WRITE_Menu subroutine (FIG. 38) is called to store the currently selected Menu and tem.

Figure 39A:
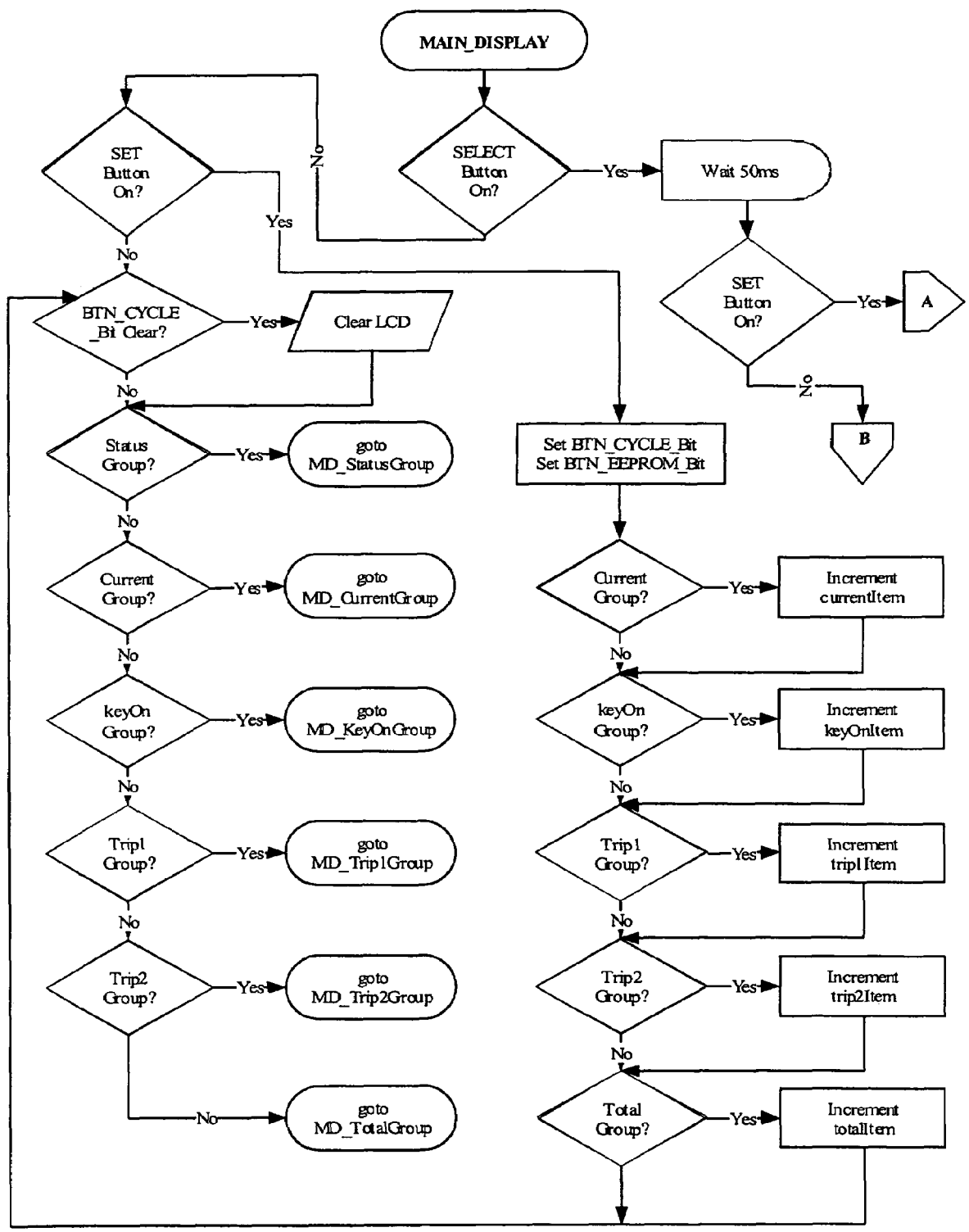
FIGS. 39a, 39b and 39c, MAIN_DISPLAY, are flow charts illustrating the main display sequence, which is used to check if any of the buttons on the LCD display have been pushed and updates the selected Menu and Item appropriately.
Figure 39B:
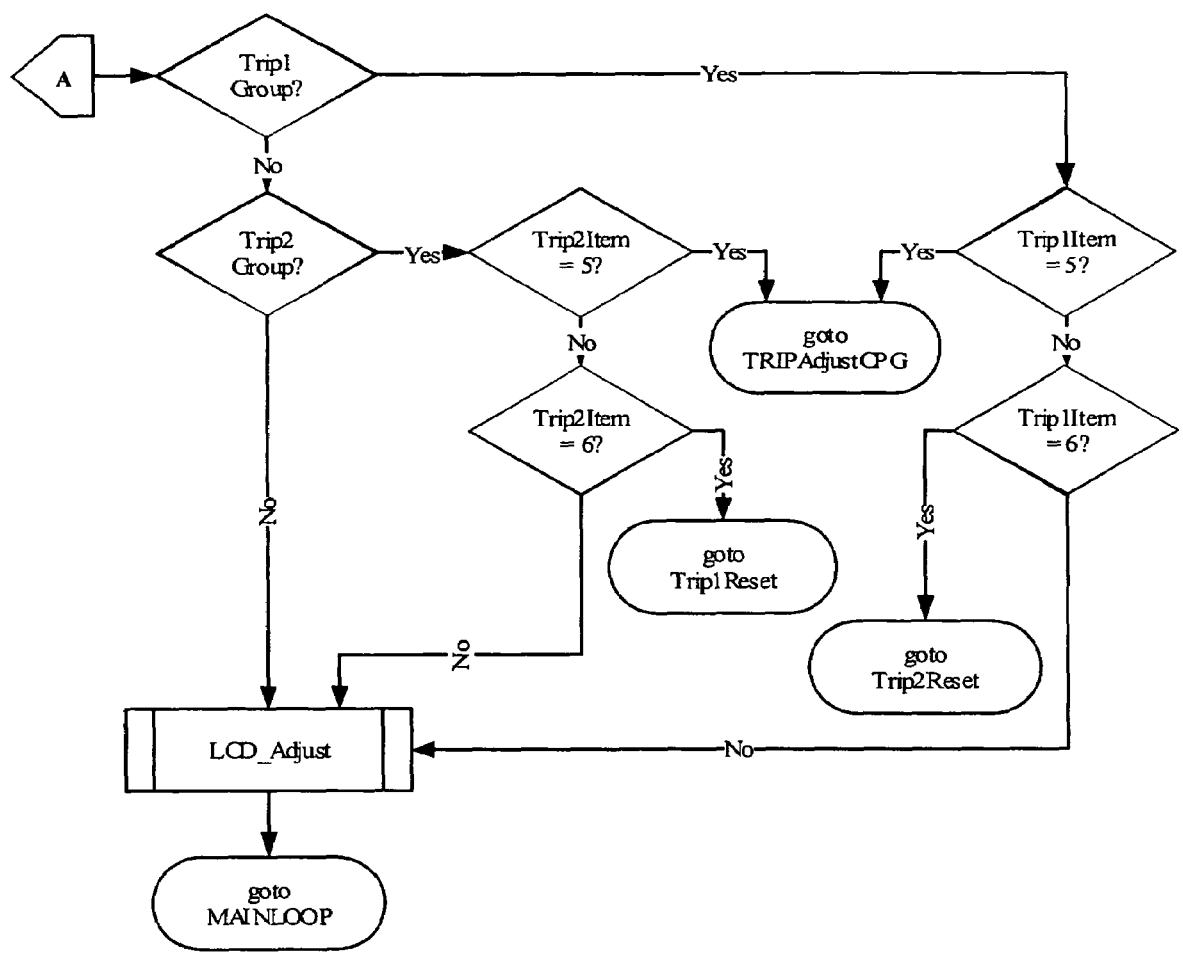
Figure 39C:
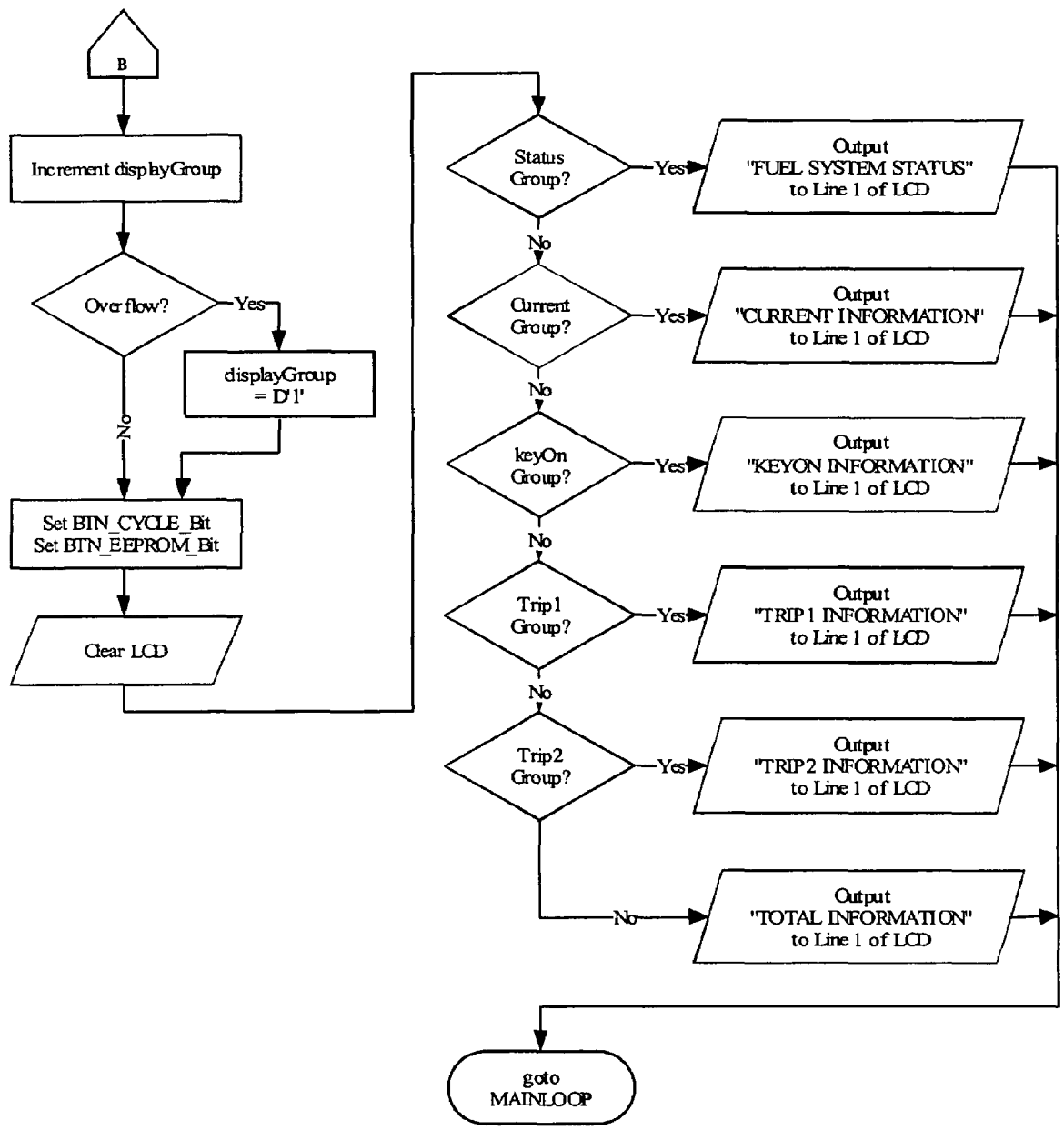

The invention then enters the MAIN_DISPLAY subroutine (FIGS. 39a, 39b, and 39c). The program checks if any of the buttons are pressed and updates the selected Menu and Item portions of the invention appropriately. Calculations are performed and the LCD is updated with most recent data for the currently selected FMS Menu and Item. The program returns to the MAINLOOP to wait for the next timer interrupt.

Figure 45:
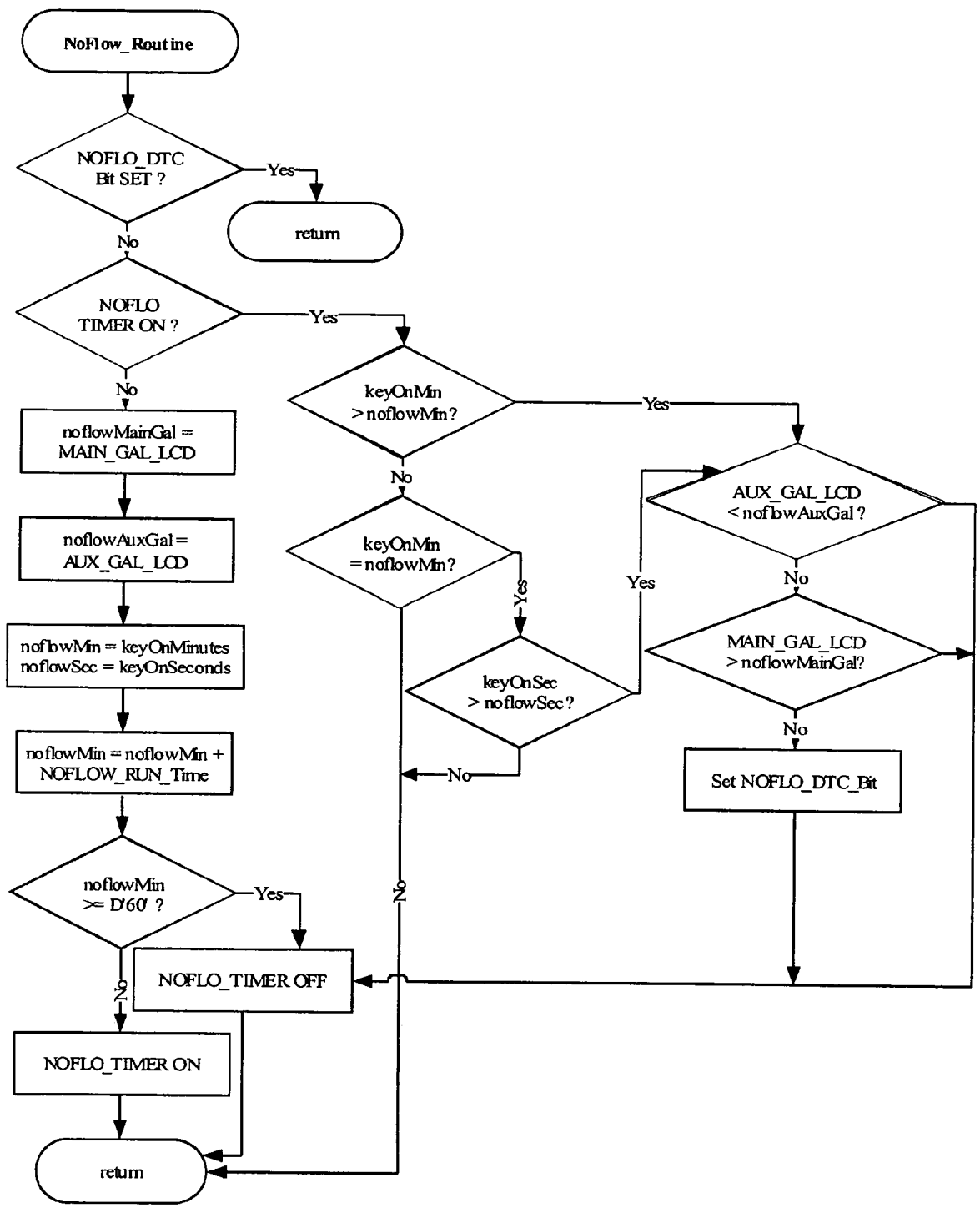
FIG. 45, NoFlow_Routine, is a flow chart illustrating the monitoring of the main and auxiliary fuel tanks to verify the flow rate of the pump is appropriate.

The SENDER_CALC routine begins with the LCD being refreshed (FIGS. 4a and 4b), followed by INIT-VREF (FIG. 6), SampleSender (FIG. 7), FilterSender (FIGS. 10a and 10b), MAIN_LOOKUP_TBL (FIG. 11a and 11b), AUX_LOOKUP_TBL (FIGS. 12a and 12b), GallonsQueue, AverageGallons (FIGS. 40a, 40b, and 40c), DTC_FLAG_Routine (FIG. 41a), DTC_LOG (FIG. 41b), DTC_REG_Routine (FIG. 42), GAUGE_ADJUST (FIG. 32), FUEL_TRANSFER (FIGS. 44a and 44b), and NoFlowRoutine (FIG. 45).

Figure 55:
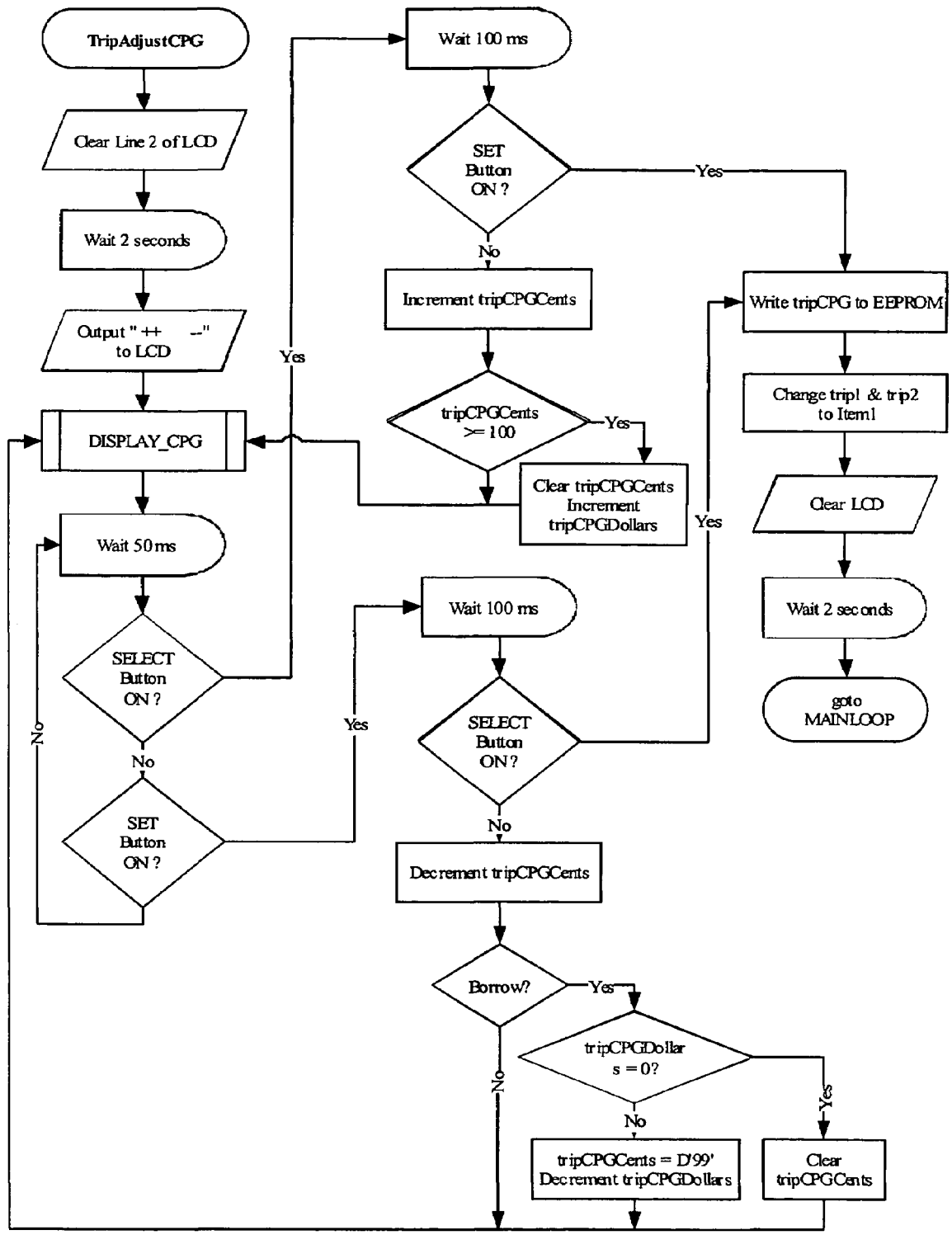
FIG. 55, TripAdjustCPG, adjusts the price of fuel.
Figure 56:
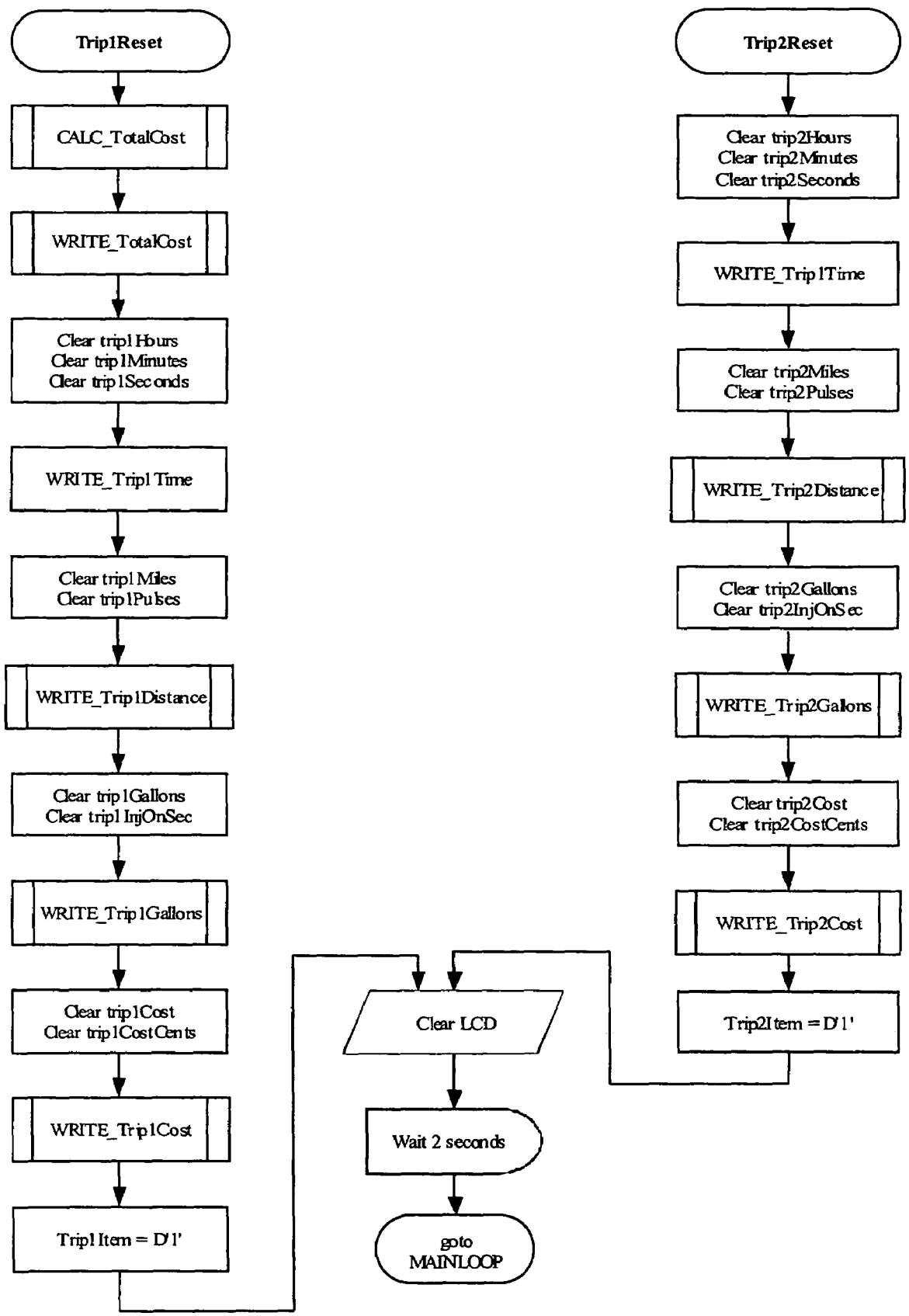
FIG. 56, Trip1Reset and Trip2Reset are flow charts illustrating the reset sequences for the first and second trip from FIGS. 52a–52r, and 53.
Figure 57A:
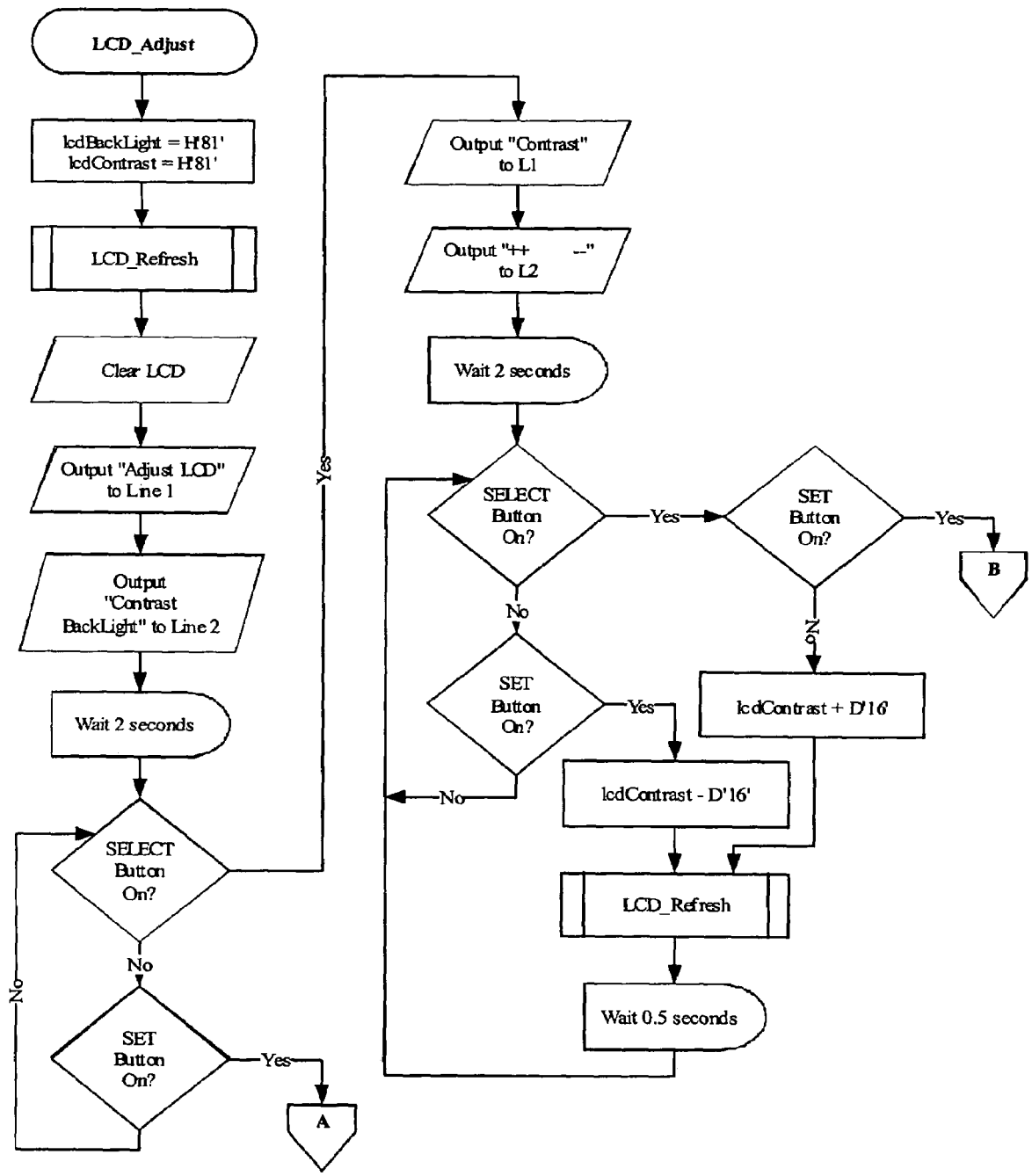
FIGS. 57a and 57b, LCD_Adjust, are flowcharts illustrating the adjustment of the LCD's backlight and contrast settings.
Figure 57B:
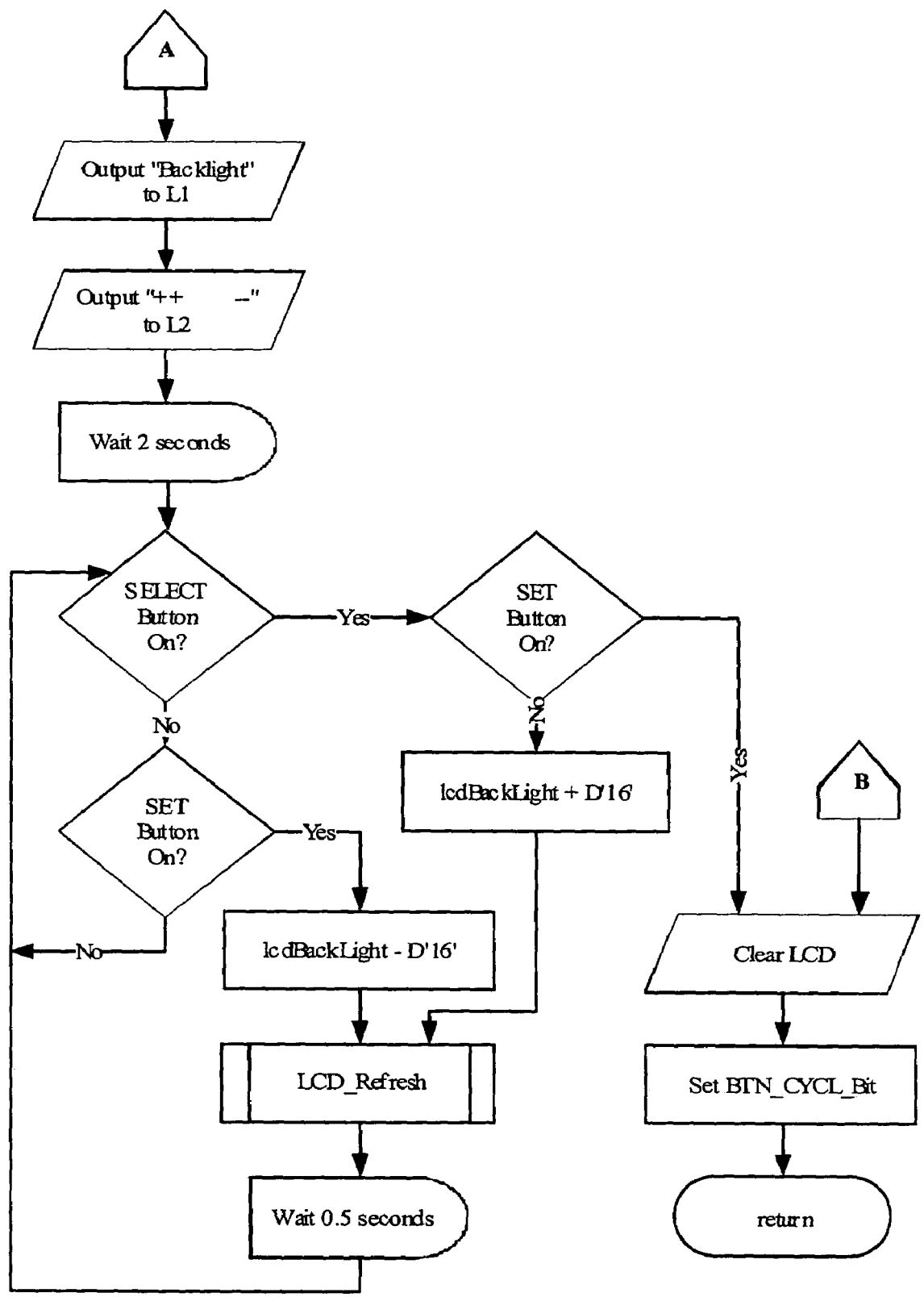

The MAIN_DISPLAY subroutine is called once every second at the end of the FMS calculations. First, the Select and Set buttons are checked to allow the user to navigate the menus and items. If both buttons are pressed simultaneously from most screens, the LCD_Adjust subroutine (FIGS. 57a and 57b) is called to adjust the backlight and contrast settings, which will affect the visibility of the LCD during day and night driving conditions. When the module is on Trip1Item5 or Trip2 Item5, pressing both buttons will call the TRIPAdjustCPG (FIG. 55) to adjust the current price of fuel. When the module is on Trip1Item6, Trip1 Reset (FIG. 56) is called. When the module is on Trip2Item6, Trip2 Reset (also found in FIG. 56) is called.

The program will return to the MAINLOOP (FIGS. 29 and 30) following any of these subroutines. If only the SELECT button is pressed, the module will increment the displayGroup variable to advance to the next Menu. The LCD is cleared and a header for the new menu is displayed on the top line of the LCD. The program then returns to the MAINLOOP. If only the SET button is pressed, the program increments the Item number of the currently selected Menu (currentItem, keyOnItem, trip1Item, trip2Item, or totalItem). The program continues execution below. If no buttons are pressed, the program jumps to the appropriate display function for the currently selected Menu and Item.

Figure 46:
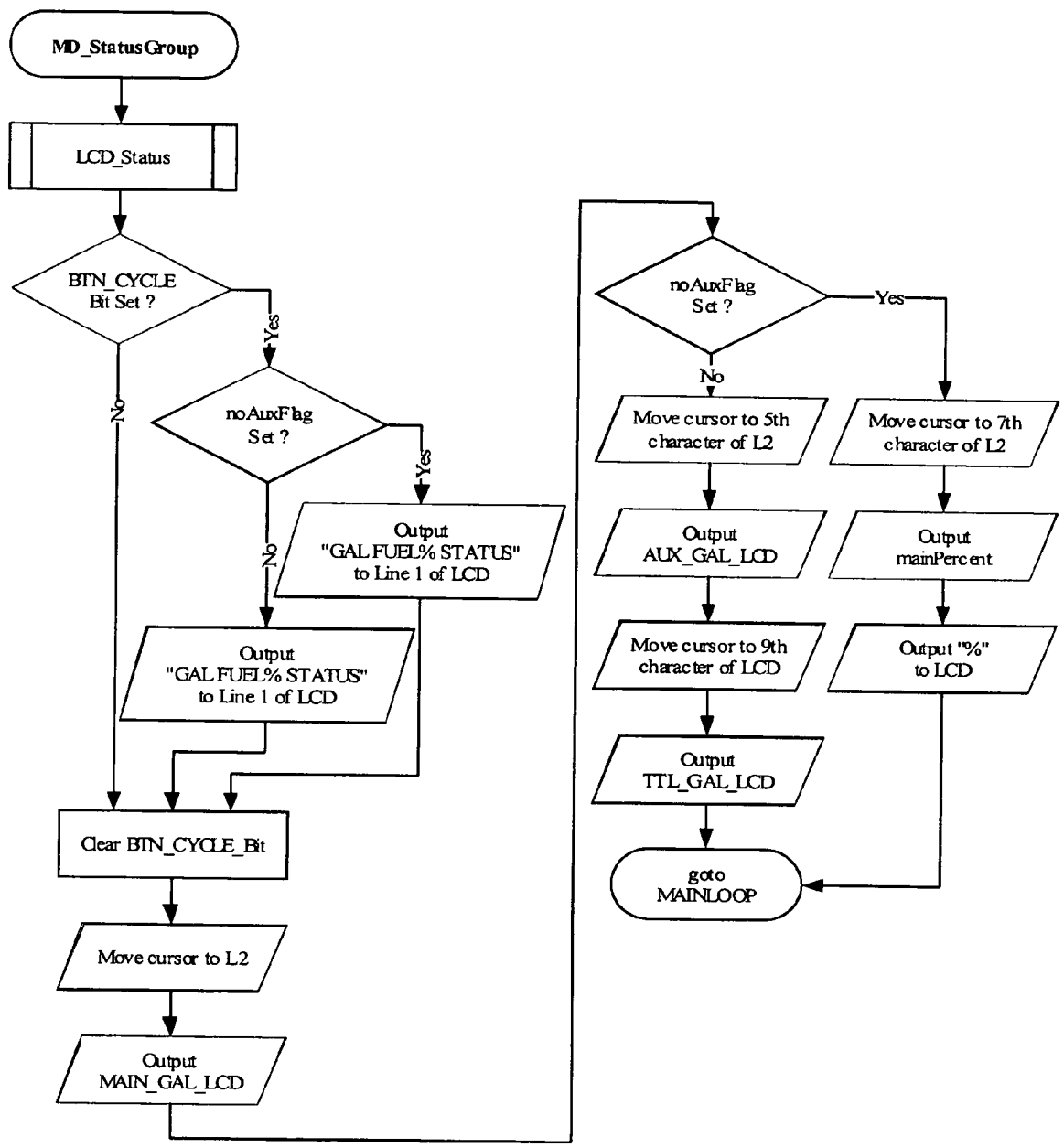
FIG. 46, MD_StatusGroup, subroutine outputs "MN AUX TTL STATUS" to the top line of the LCD if the vehicle has an Auxiliary fuel tank. Otherwise, it outputs "GAL %% STATUS" to line 1 of the LCD. It displays the fuel level(s) and status to line 2 of the LCD.

The MD_StatusGroup (FIG. 46) subroutine outputs "MN AUX TTL STATUS" to the top line of the LCD if the vehicle has an Auxiliary fuel tank. Otherwise, it outputs "GAL %%  STATUS" to the line 1 of the LCD. The number of gallons in the Main tank is output to the beginning of line 2 on the LCD. If the vehicle has an Auxiliary fuel tank, the Aux gallons and Total gallons are outputted to the LCD, otherwise, the mainPercent is output to the LCD. Finally, the status field is updated at the end of line 2. This field will normally flash "OK" to the user. If there is a DTC condition, the information will be displayed in this field. There are no additional screens or items in the Status menu.

Figure 47:
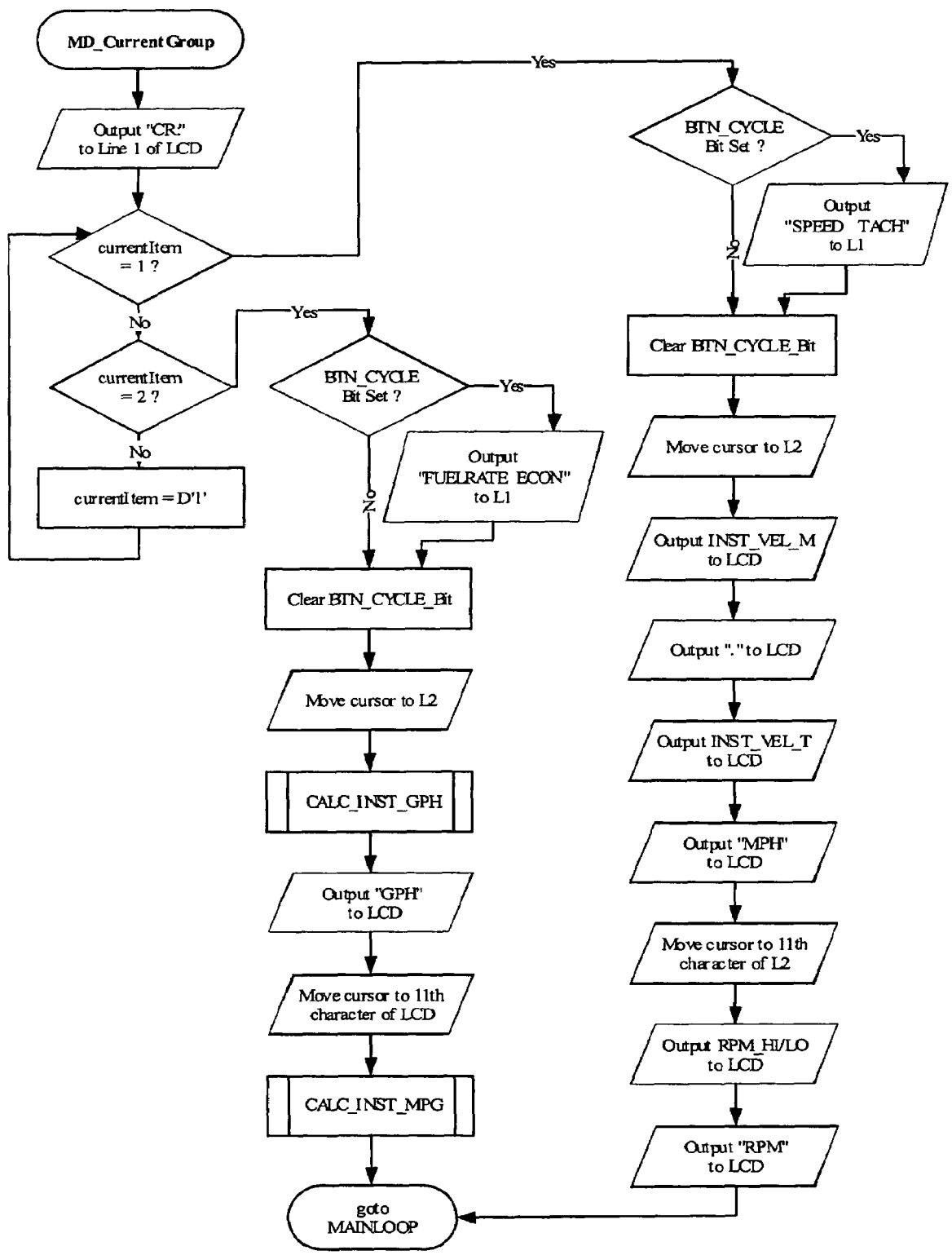
FIG. 47, MD_CurrentGroup is a flow chart illustrating calculation and display of the items in the Current Menu.
Figure 48:
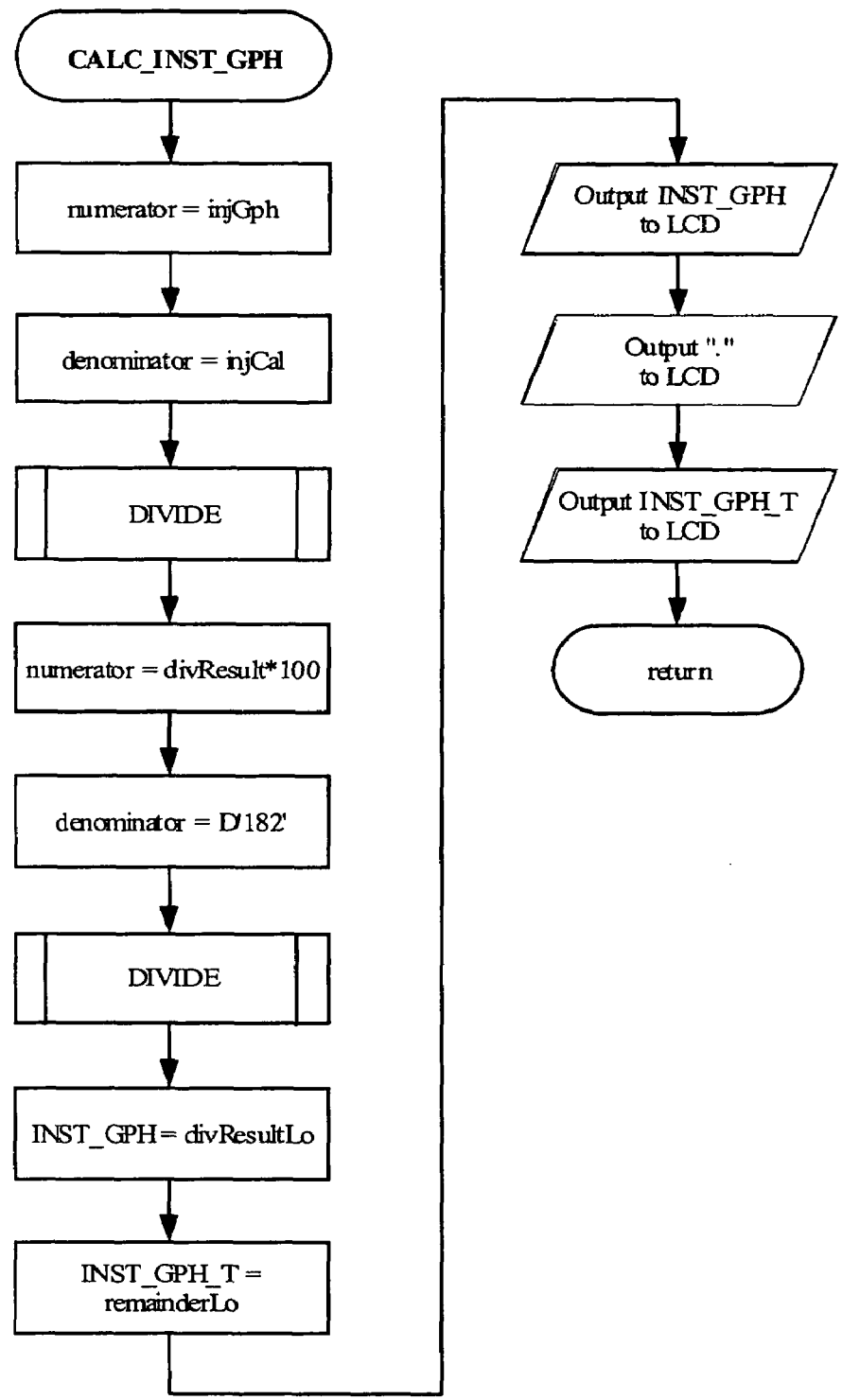
FIG. 48, CALC_INST_GPH, is a flow chart illustrating the instantaneous calculation of gallons per hour.
Figure 49:
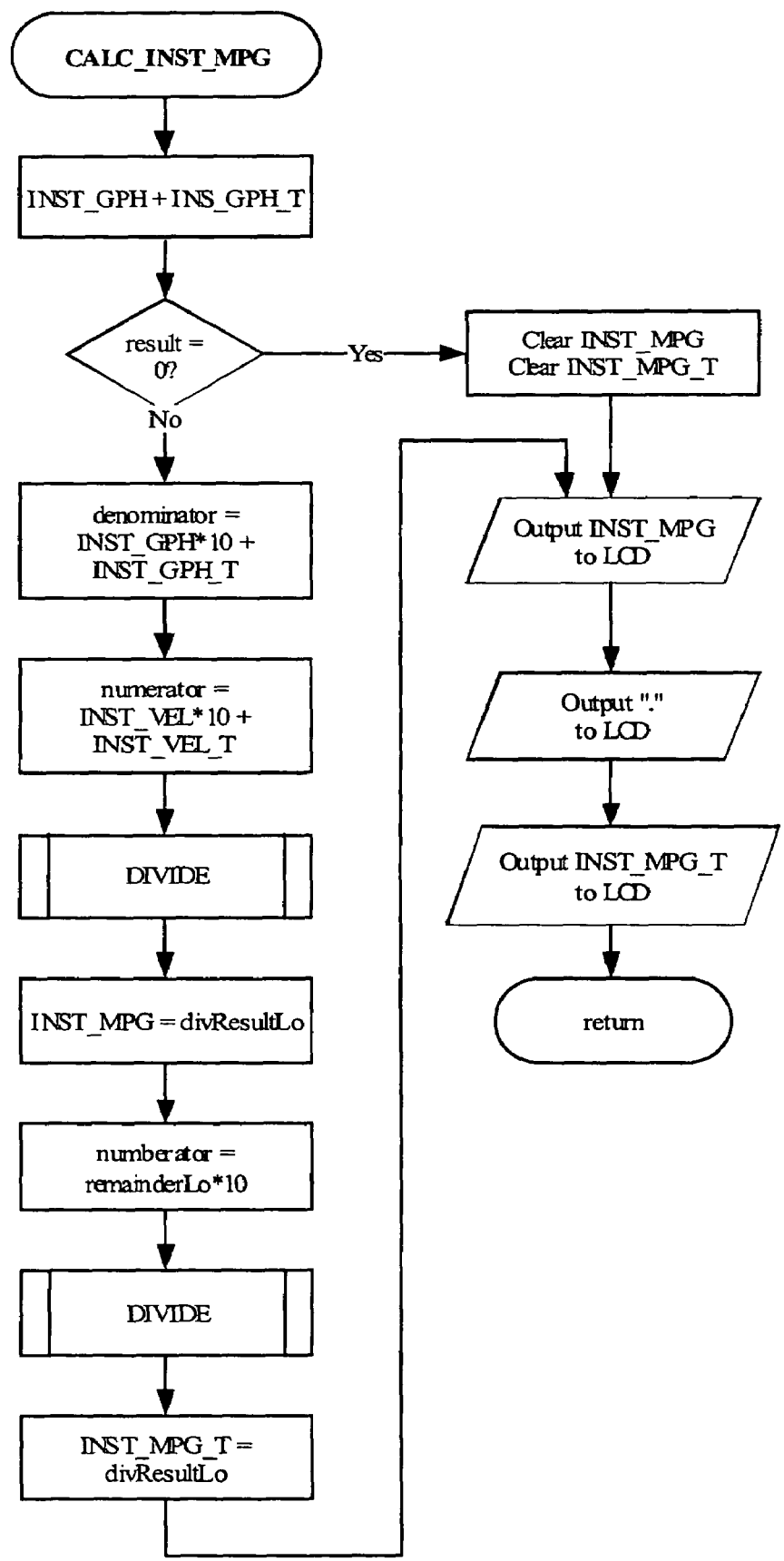
FIG. 49, CALC_INST_MPH, is a flow chart illustrating the instantaneous calculation of vehicle speed.

The MD_CurrentGroup (FIG. 47) contains two screens. Output "CR:" to line 1 of the LCD. If currentItem=1, output "SPEED TACH" to line 1 of the LCD. Output the instantaneous velocity and output "MPH to line 2 of the LCD. Output the engine RPM and output "RPM" to line 2 of the LCD. The program returns to the MAINLOOP. If currentItem=2, output "FUEL RATE ECON" to line 1 of the LCD. The program first outputs the instantaneous Gallons Per Hour and output "GPH" to line 2 of the LCD, with subroutine CALC_INST_GPH (FIG. 48), then outputs instantaneous Miles Per Gallon and "MPG" to line 2 of the LCD, using subroutine CALC_INST_MPG (FIG. 49). The program then returns to the MAINLOOP.

Figure 50:
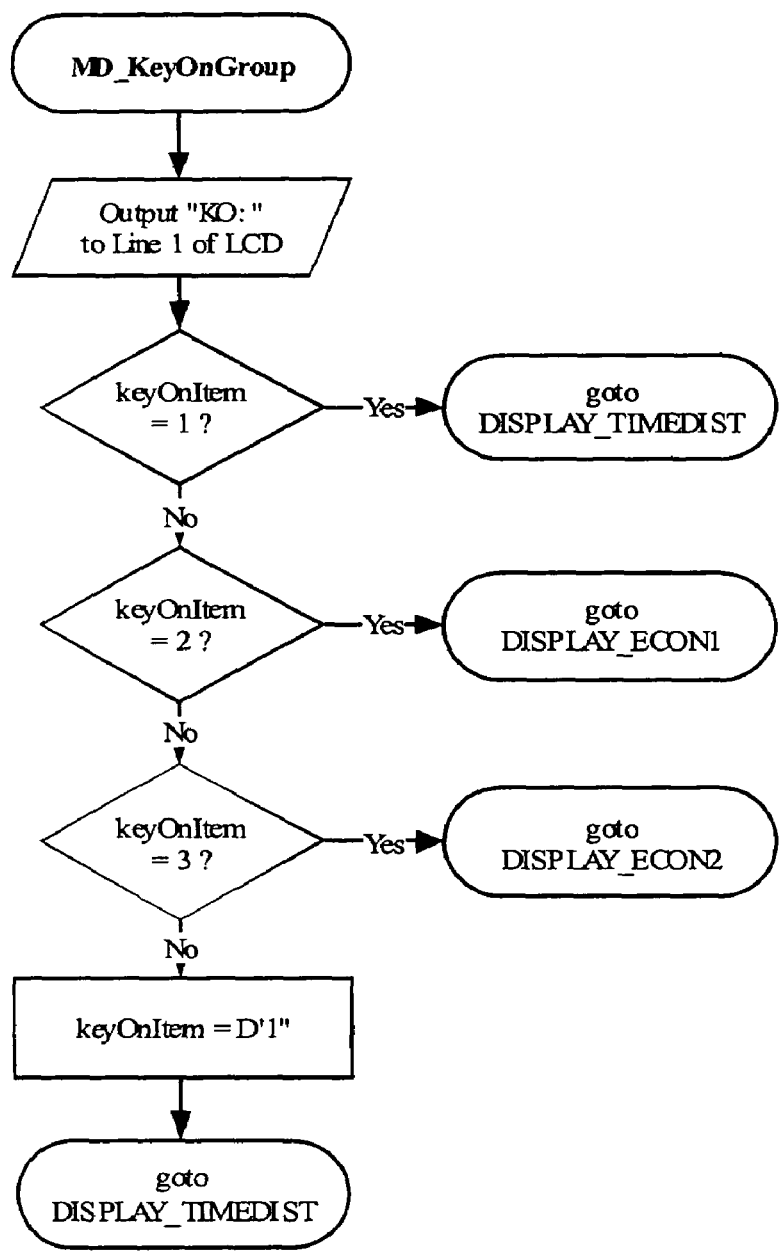
FIG. 50, MD_KeyOnGroup is a flow chart illustrating the calculation and display of Items in the KeyOn Menu. It contains three subroutines (FIGS. 51a, 51b, and 51c).
Figure 51A:
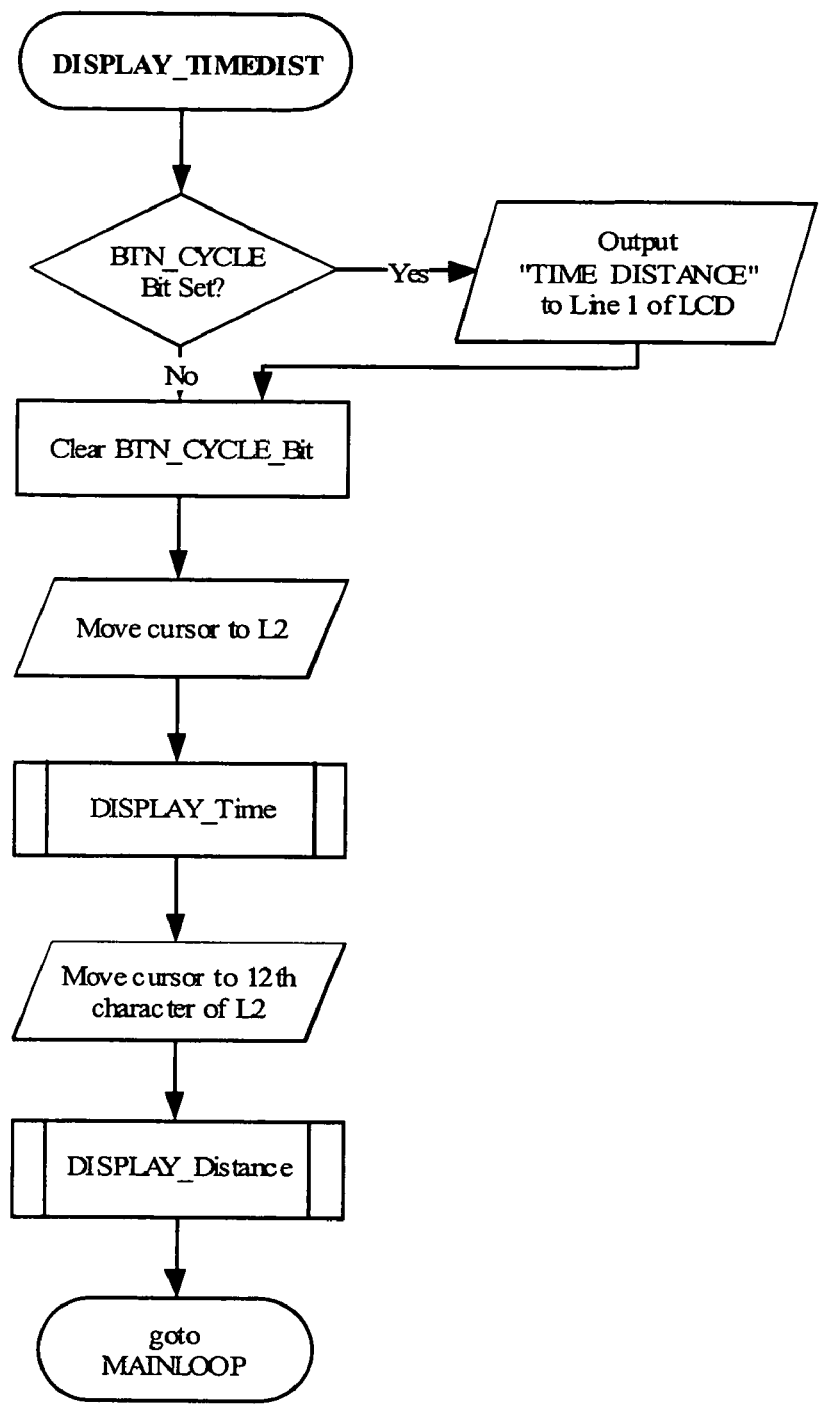
FIG. 51a, DISPLAY_TIMEDIST, displays the accumulated time and distance since the engine was started for the KeyOn, Trip1, Trip2, or Total Menu.
Figure 51B:
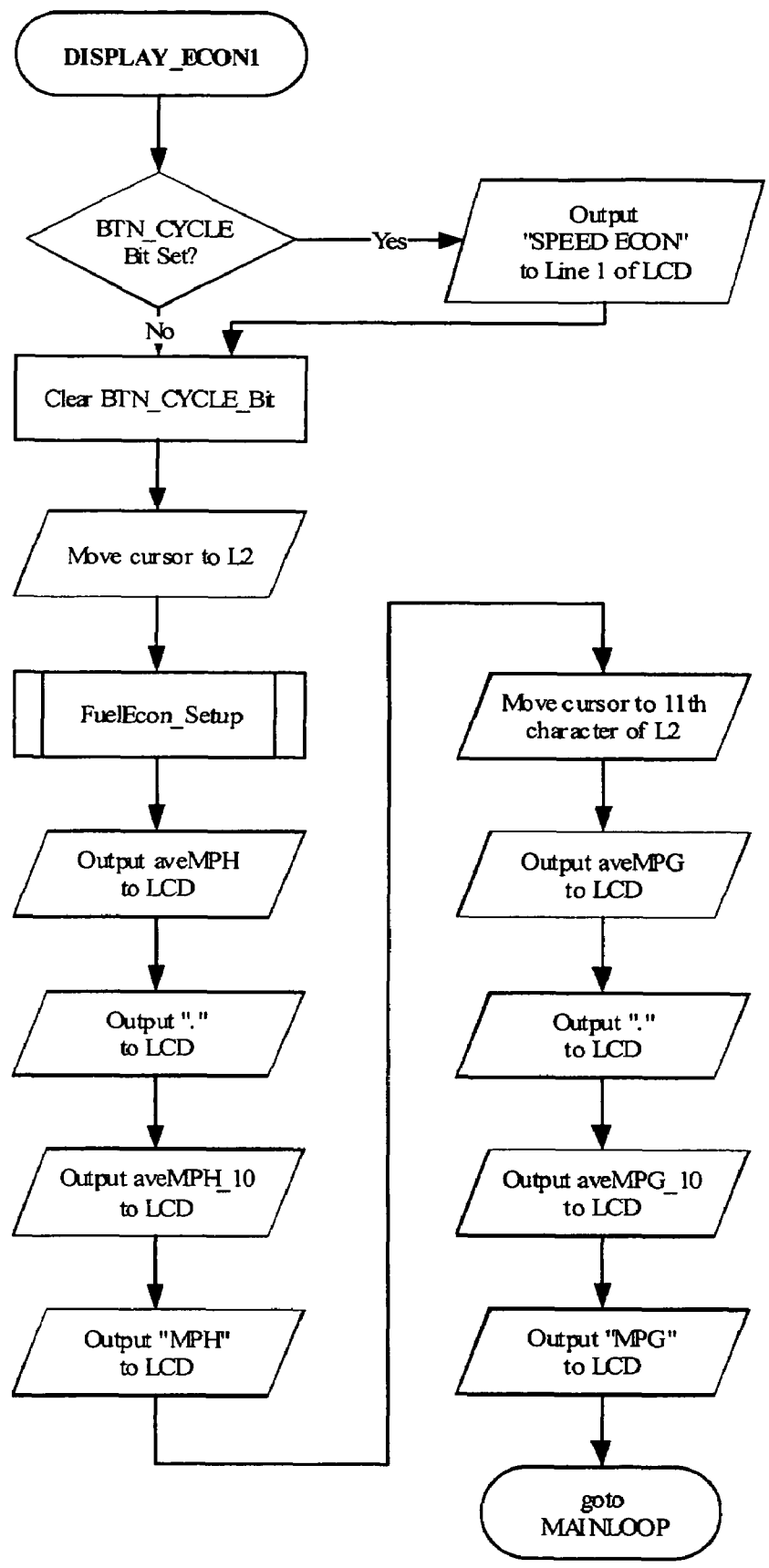
FIG. 51b, DISPLAY_ECON1, displays the average speed and average miles per gallon since the engine was started for the KeyOn, Trip1, Trip2, or Total Menu.
Figure 51C:
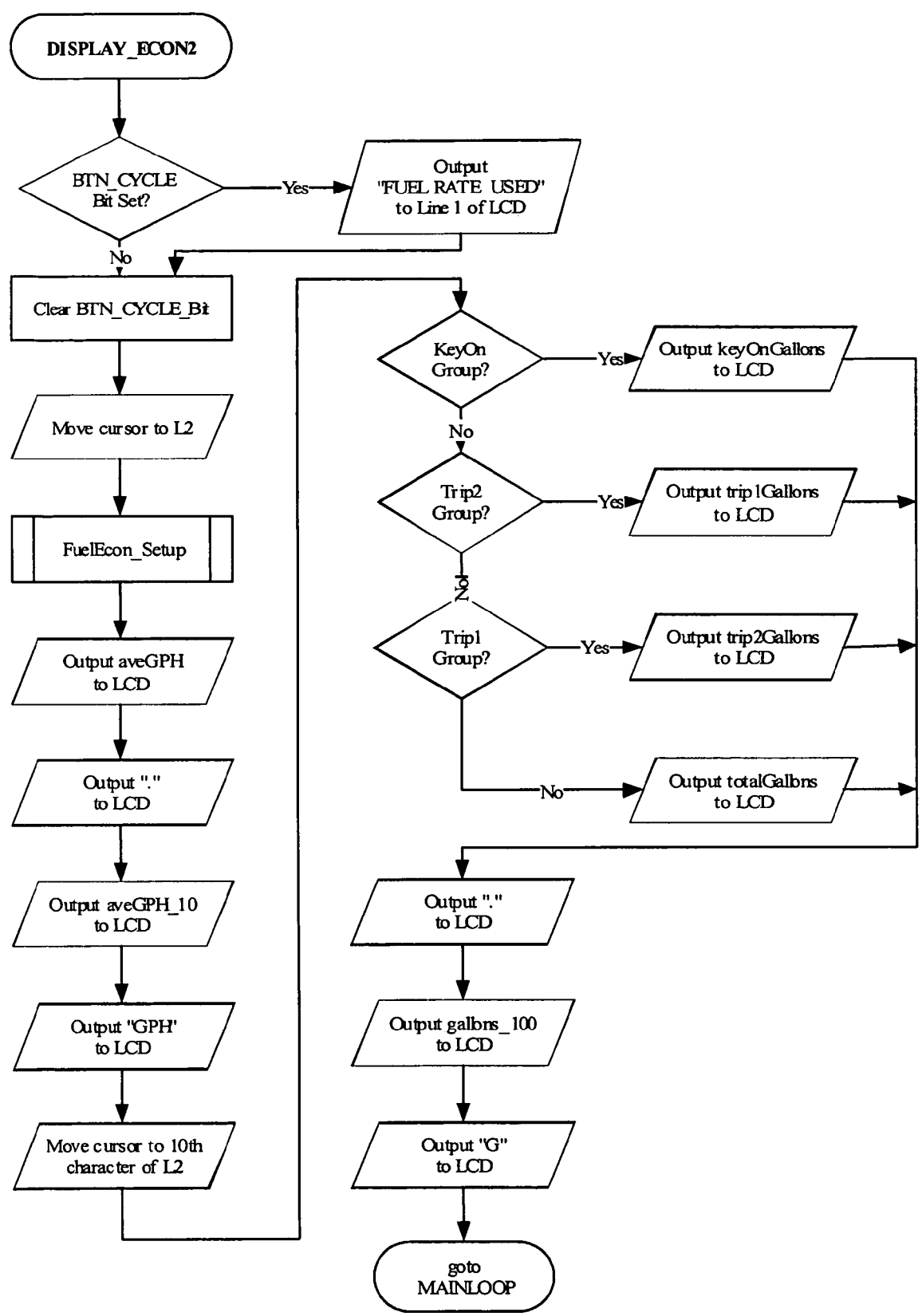
FIG. 51c, DISPLAY_ECON2, displays the average GPH and total gallons used since the engine was started for the KeyOn, Trip1, Trip2, or Total Menu.

The MD_KeyOnGroup sequence (FIG. 50) contains three screens. Output "KO:" to line 1 of the LCD. If keyOnItem=1, go to DISPLAY_TIMEDISTANCE (FIG. 51a) to display the accumulated time and distance since the engine was started. If keyOnItem=2, go to DISPLAY_ECON1 (FIG. 51b) to display the average speed and average miles per gallon since the engine was started. If keyOnItem=2, go to DISPLAY_ECON2 (FIG. 51c) to display the average GPH and total gallons used since the engine was started.

Figure 52A:
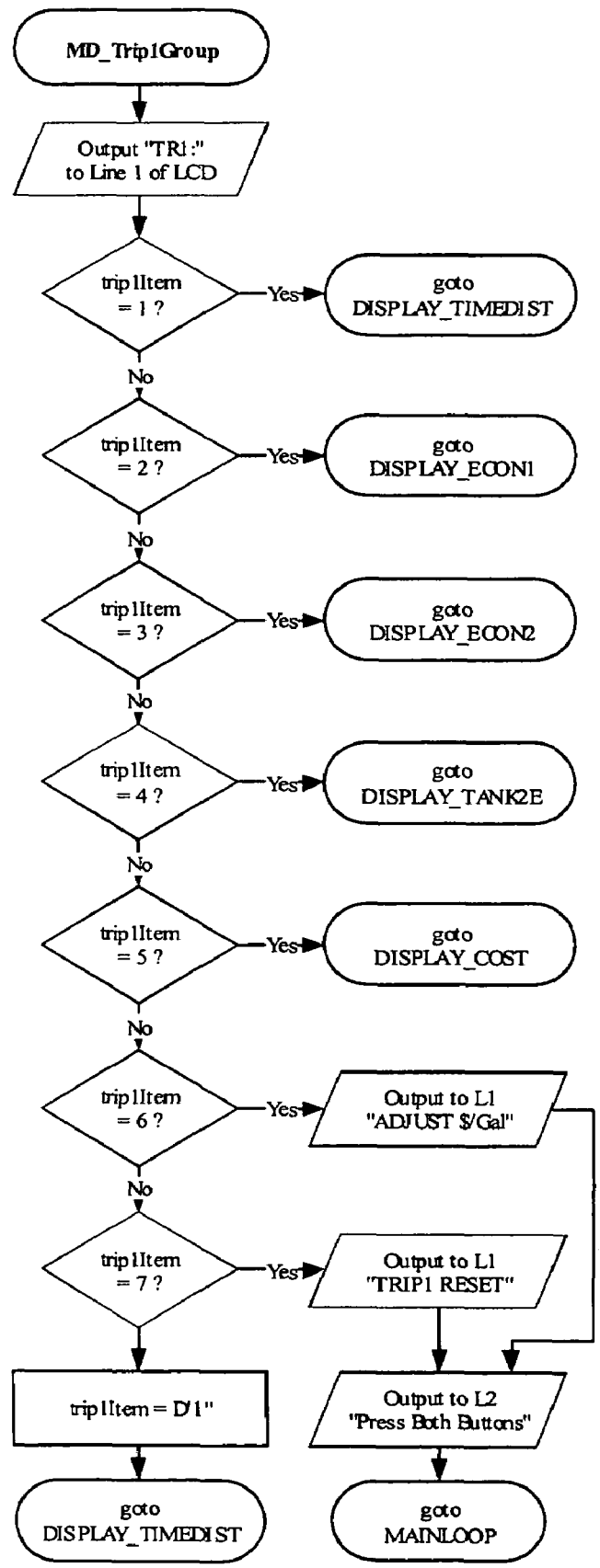
FIGS. 52a through 52r, MD_Trip1Group, contains a number of subroutines, contained in FIGS. 52b through 52r, illustrating the sequence of actions taken in calculating and displaying data from a first trip.
Figure 52B:
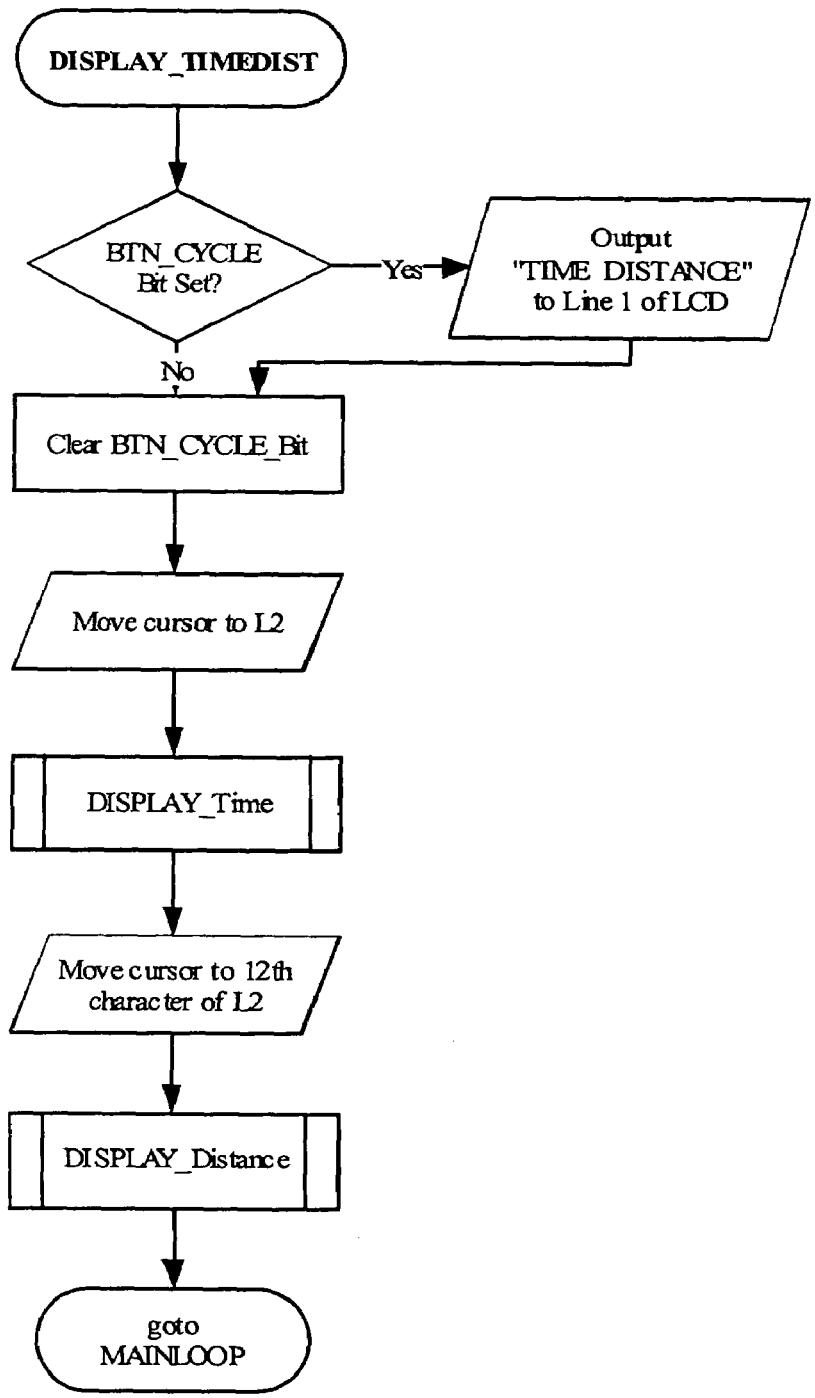
Figure 52C:
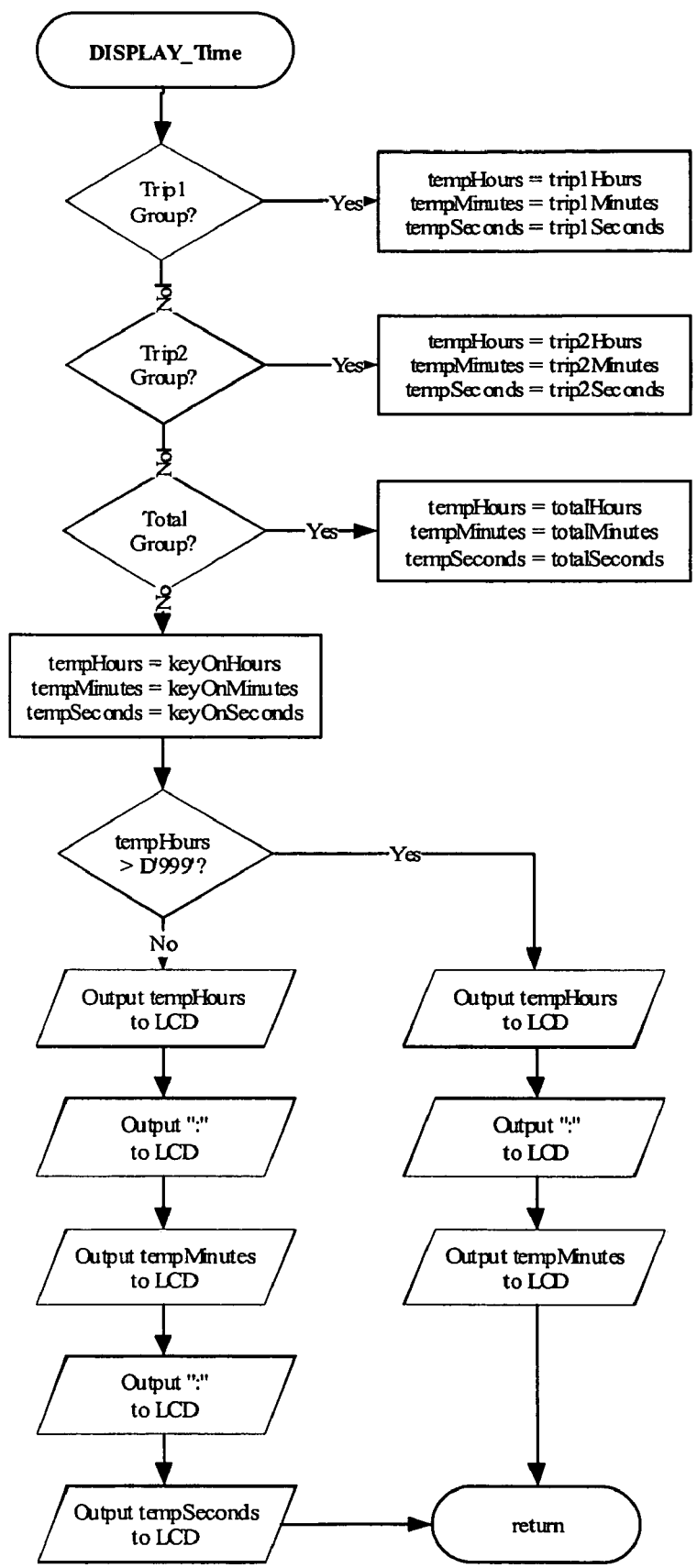
Figure 52D:
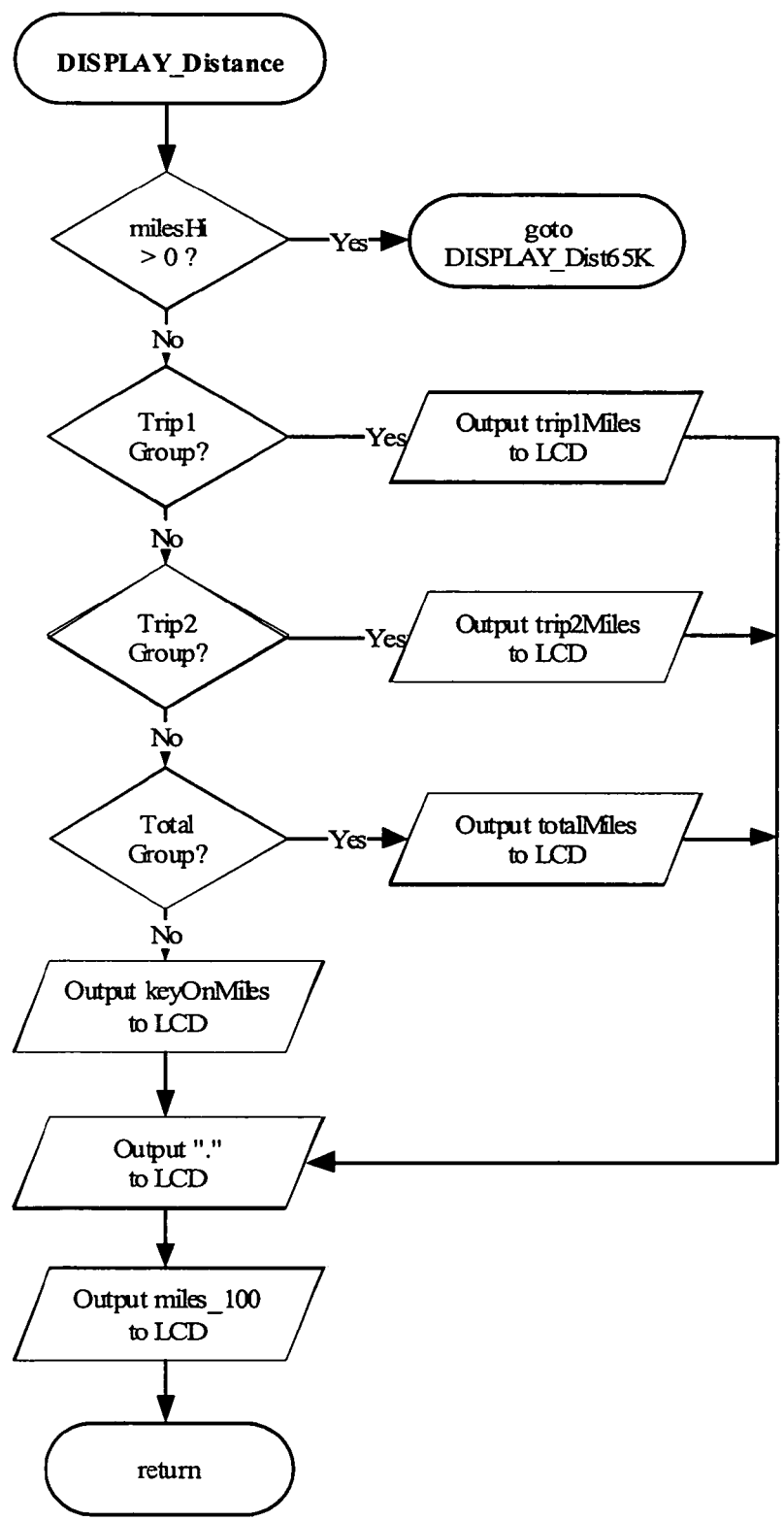
Figure 52E:
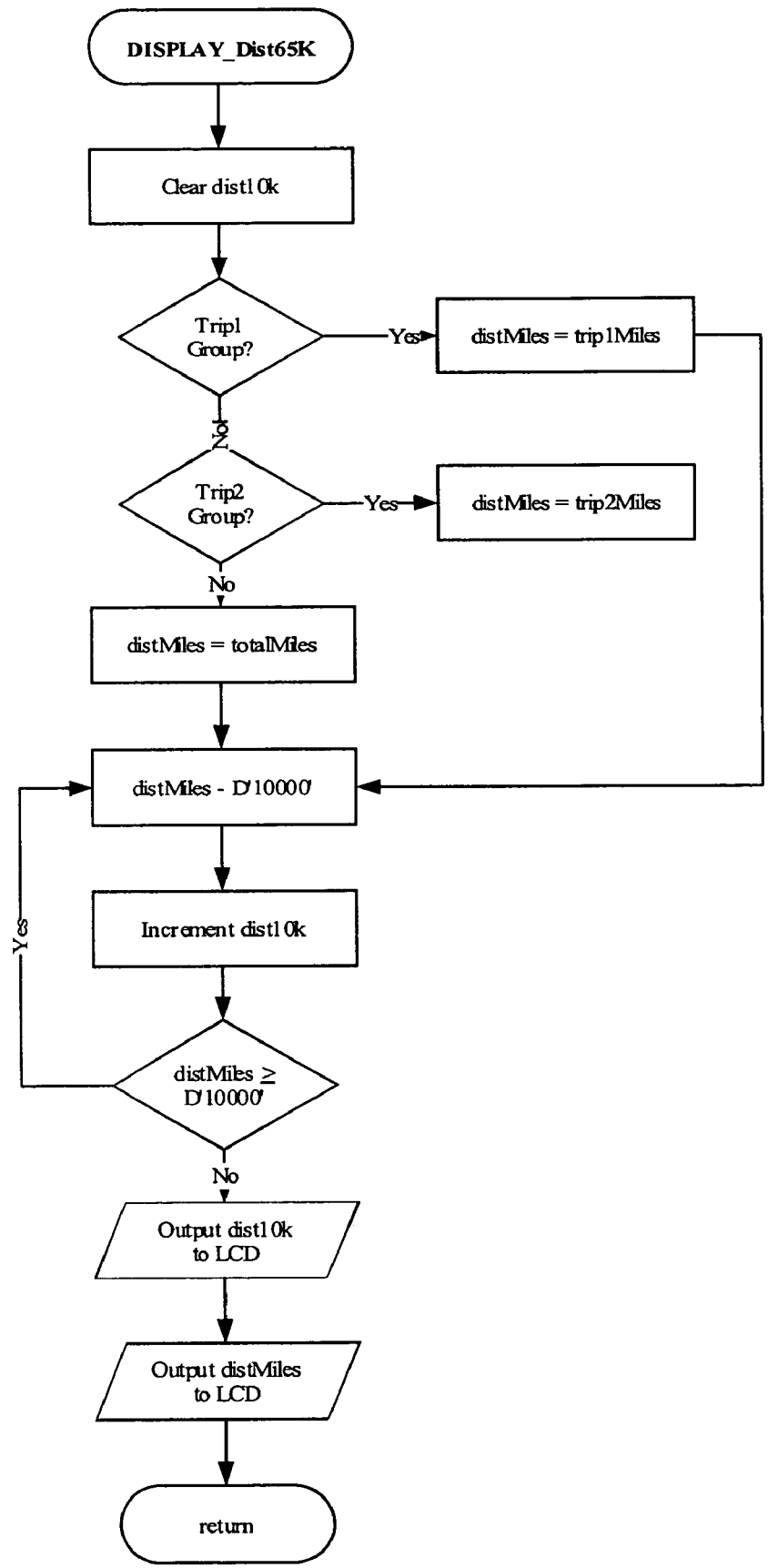
Figure 52F:
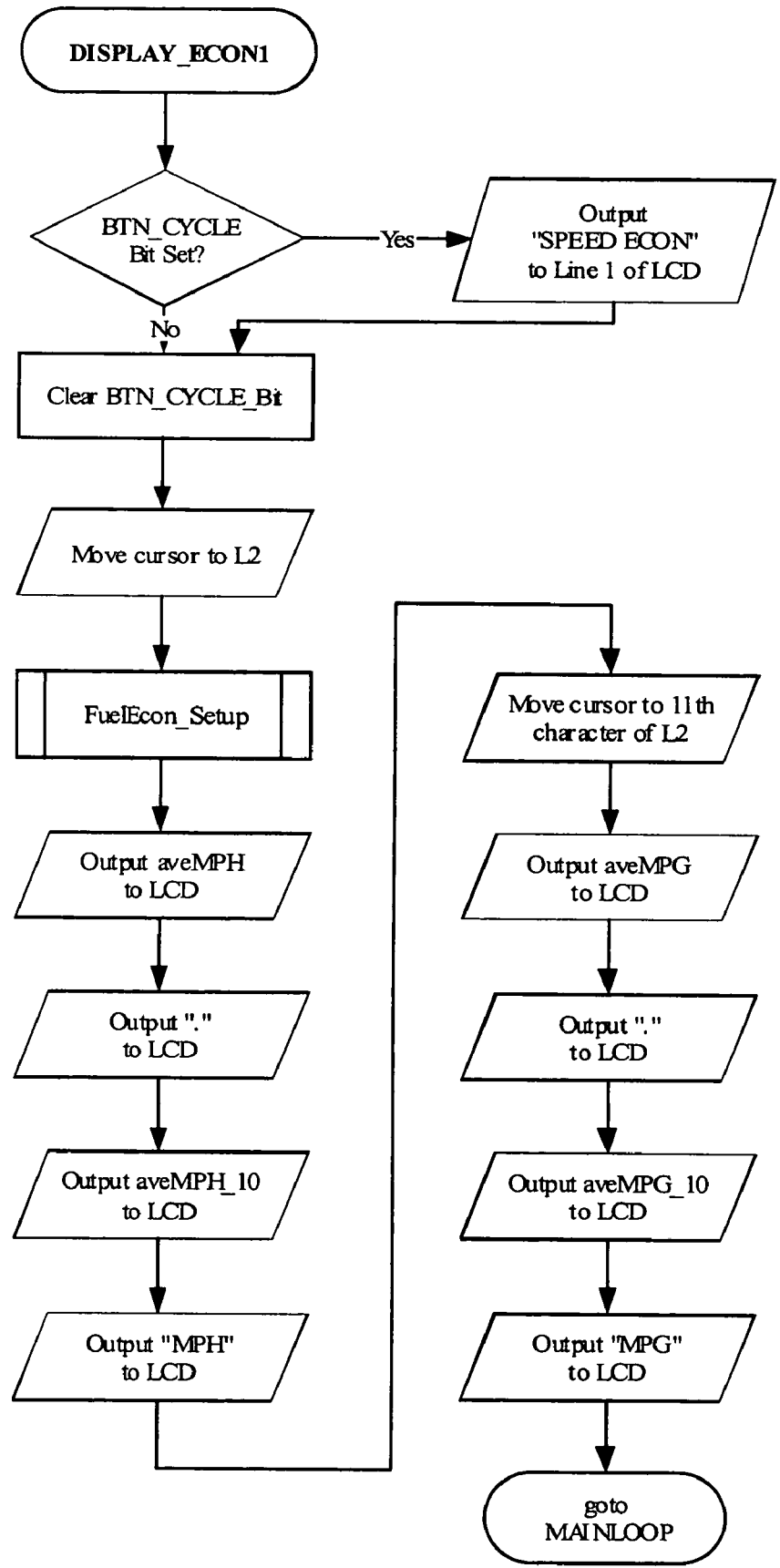

The MD_Trip1Group (FIG. 52a) contains seven screens.

Output "TR1:" to line 1 of the LCD.

Figure 52G:
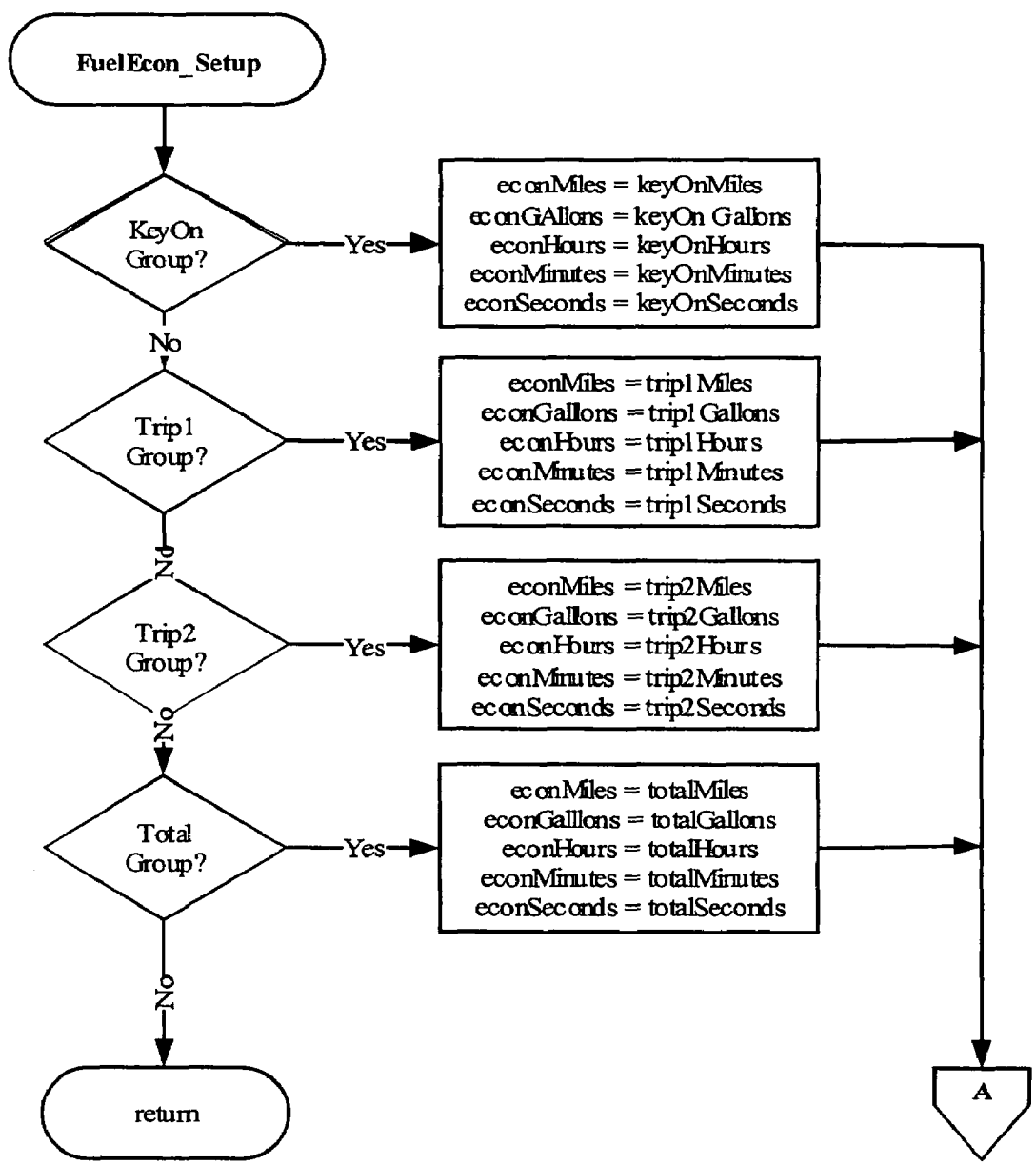
Figure 52H:
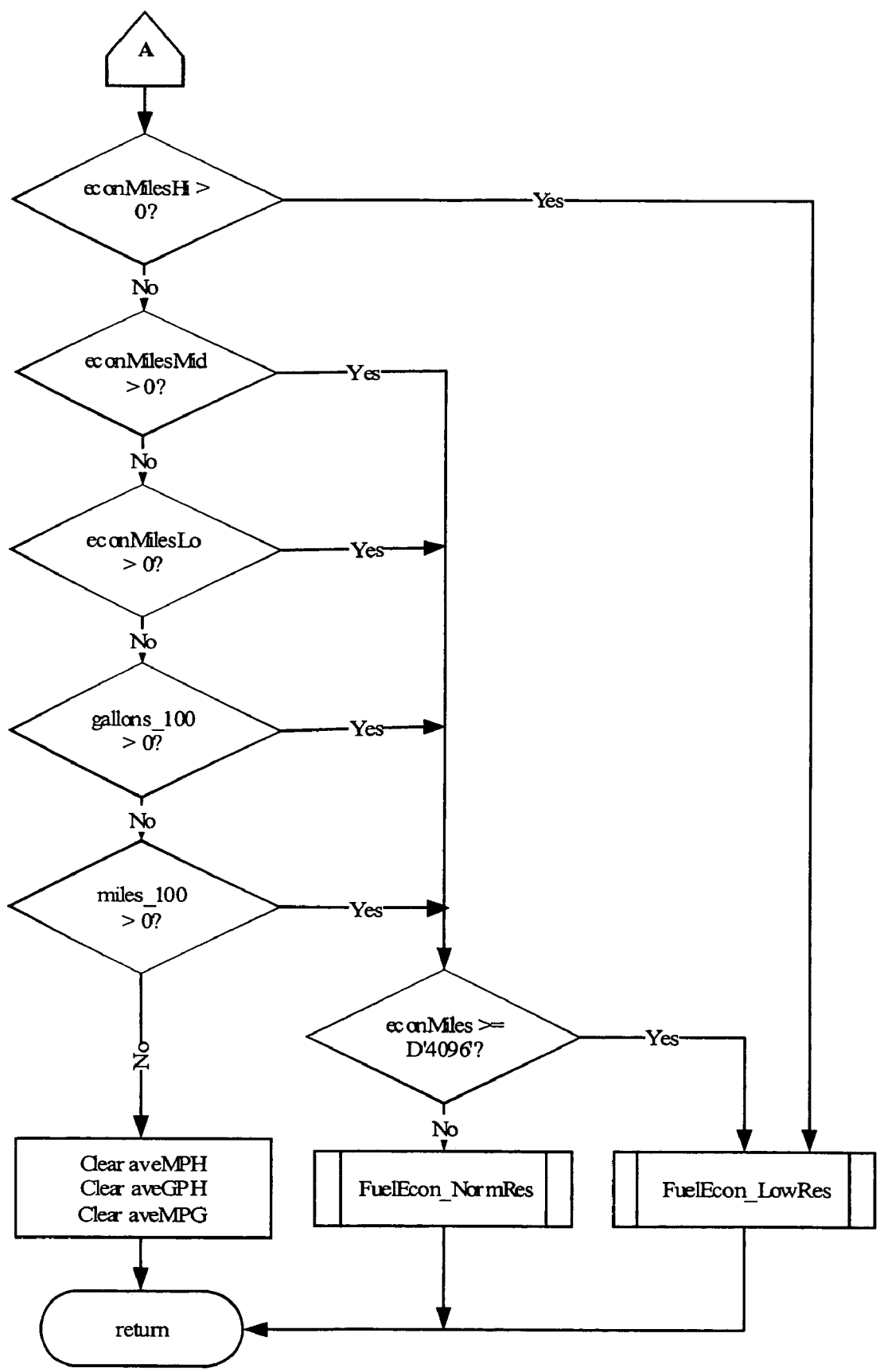
Figure 52I:
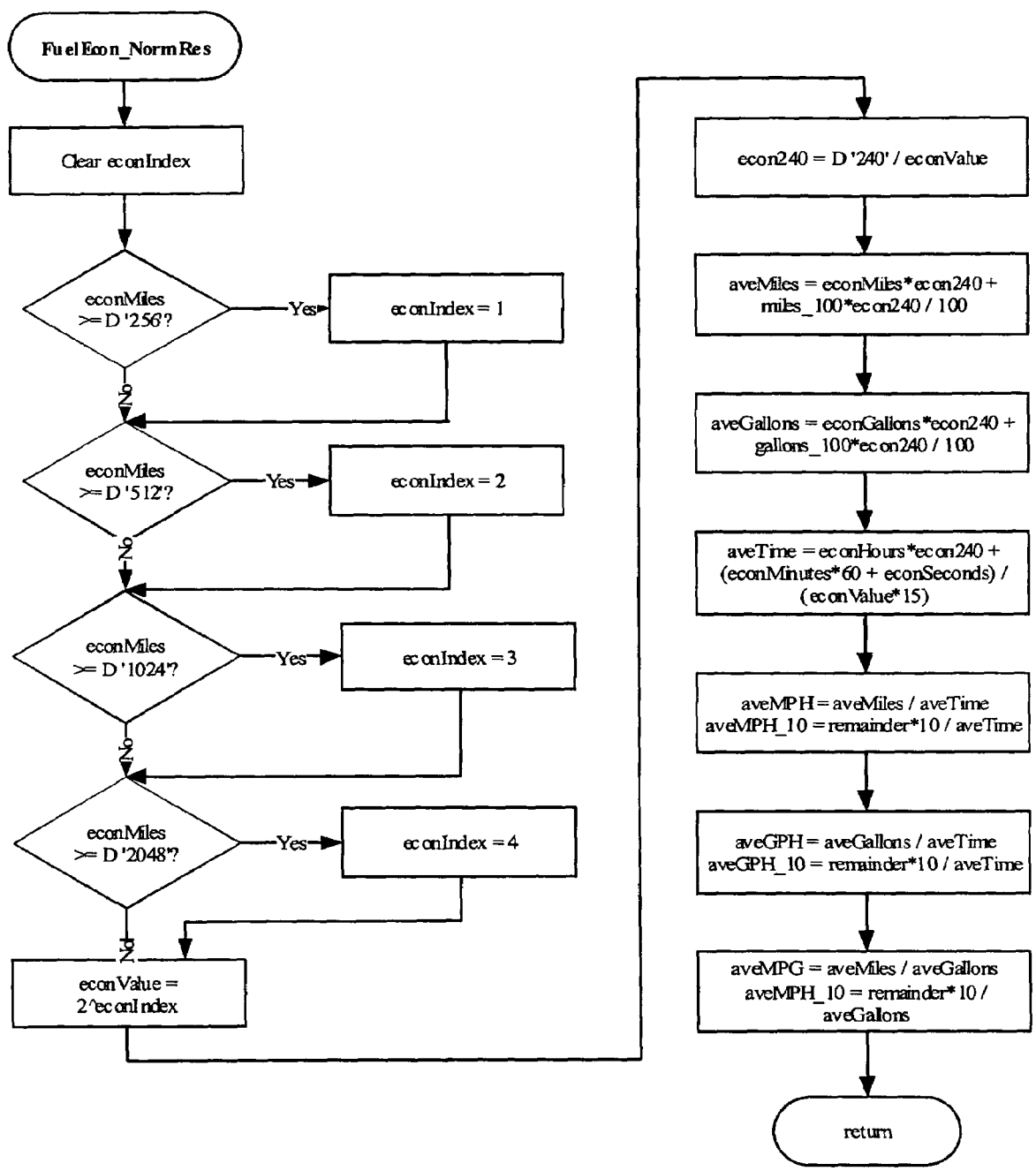
Figure 52J:
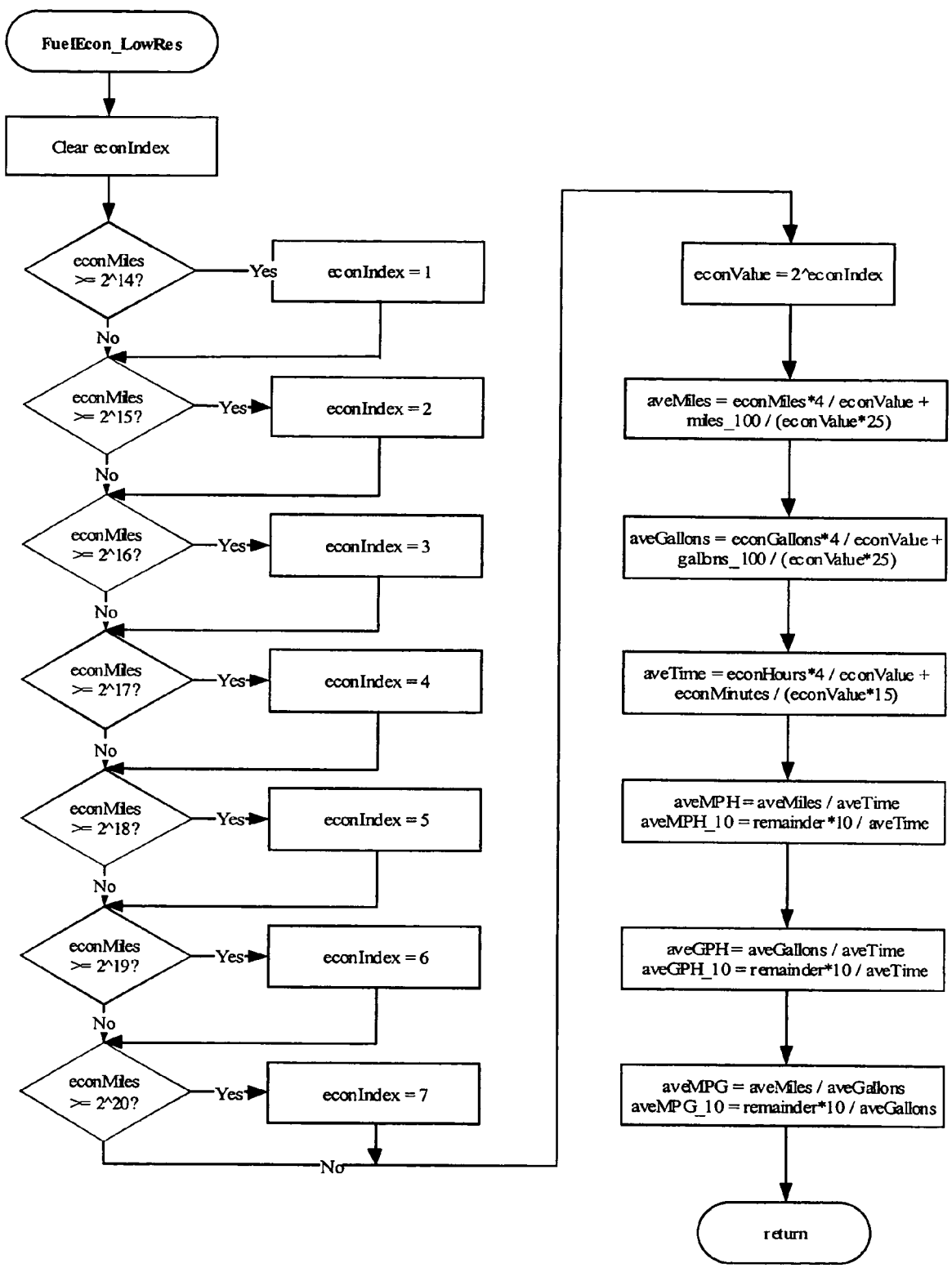
Figure 52K:
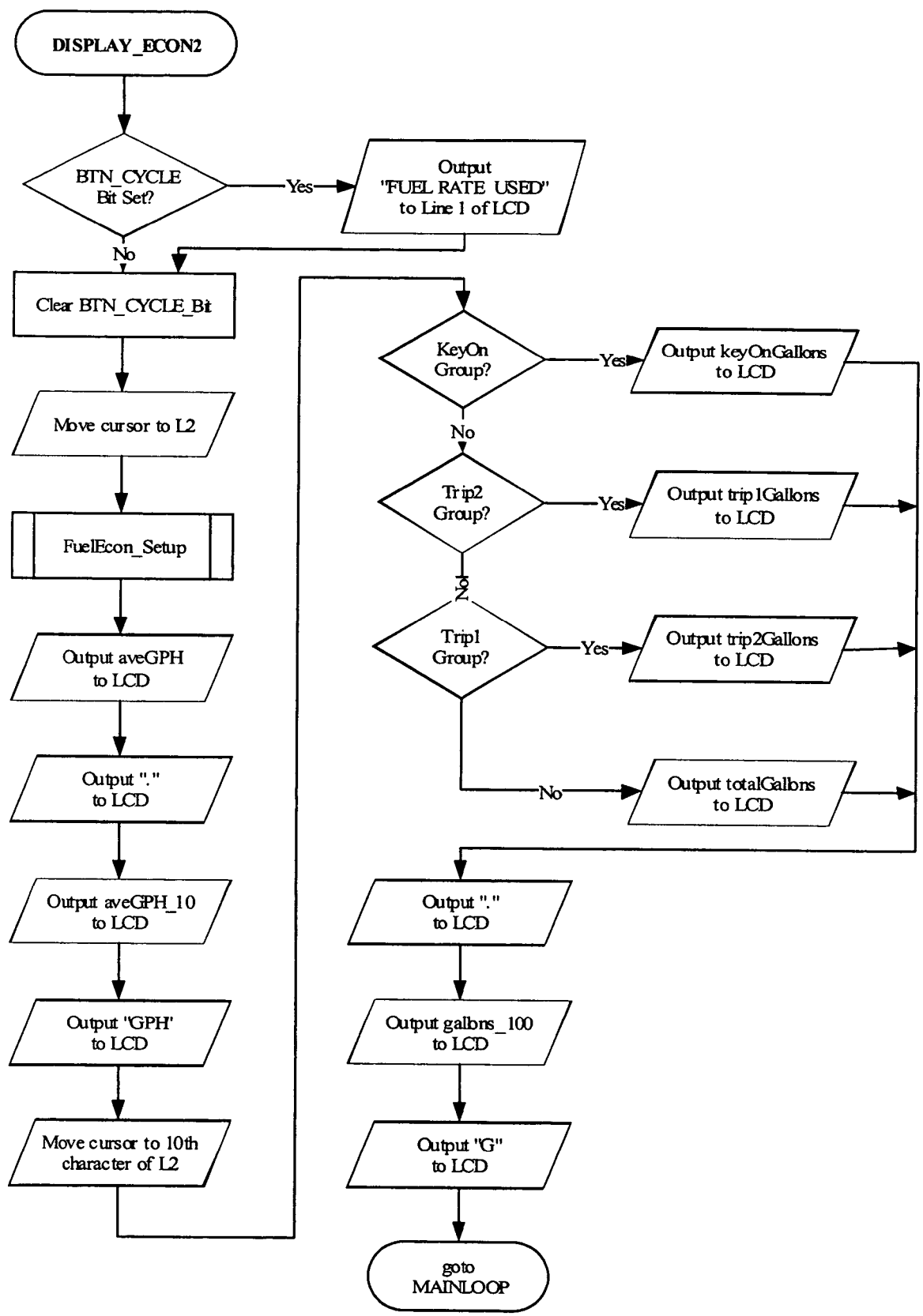
Figure 52I:
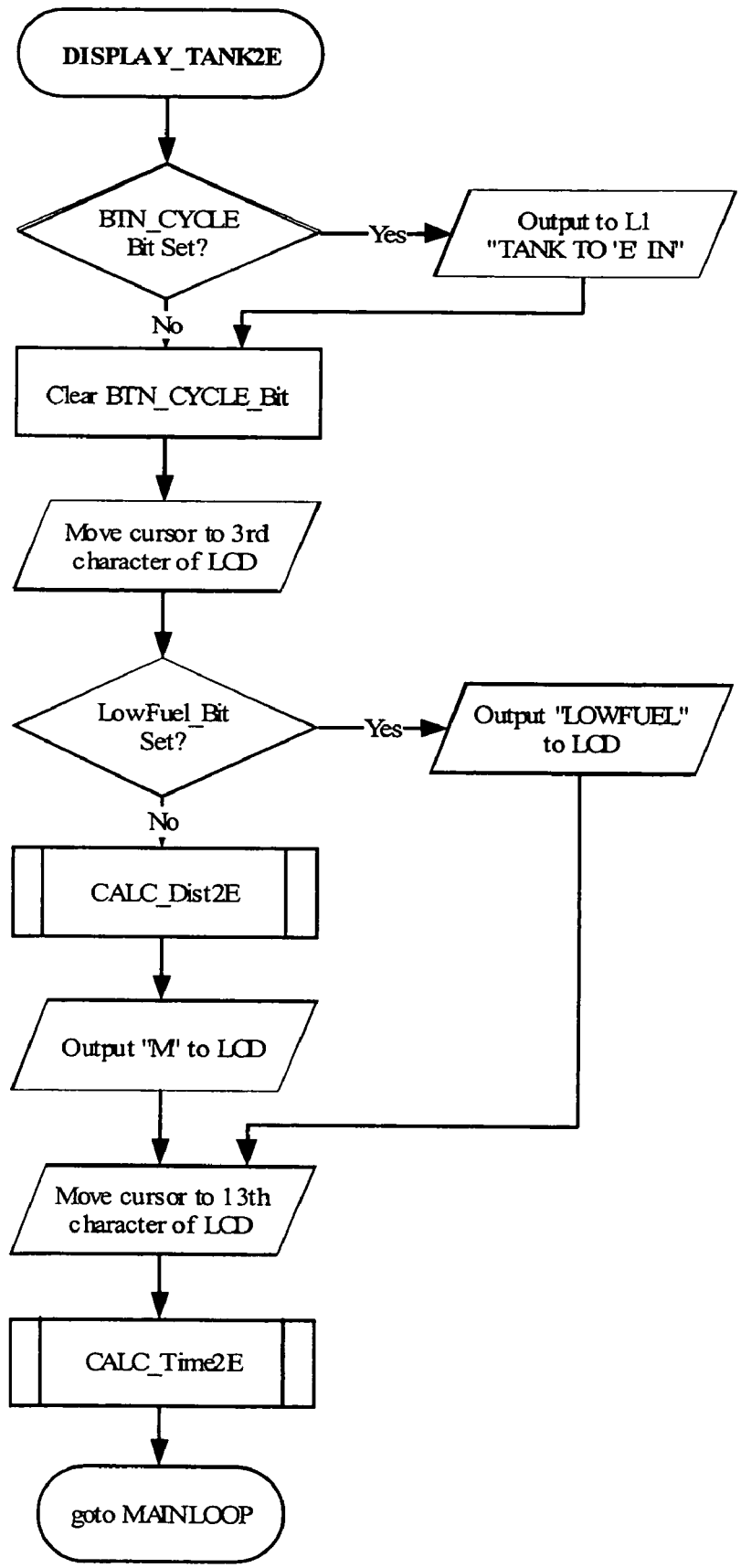
Figure 52M:
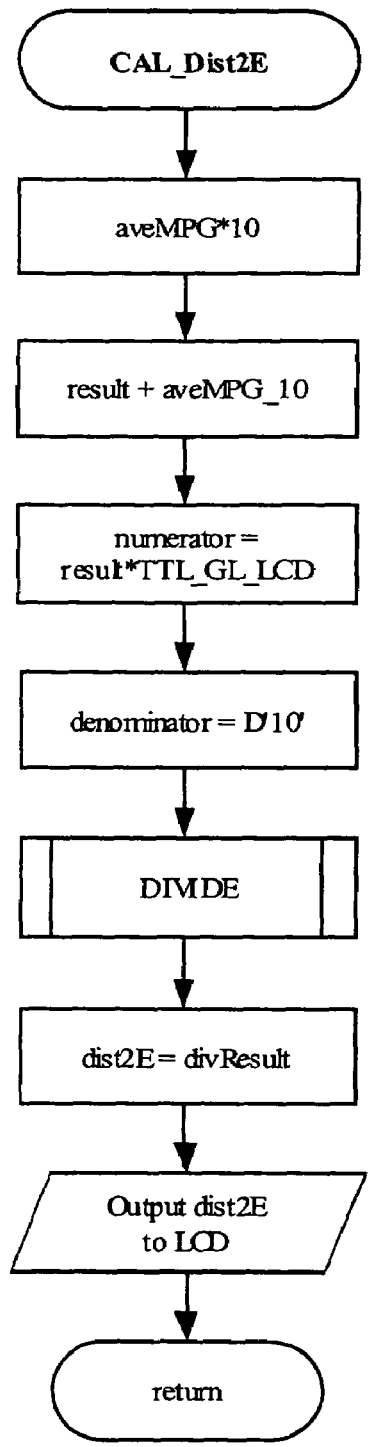
Figure 52N:
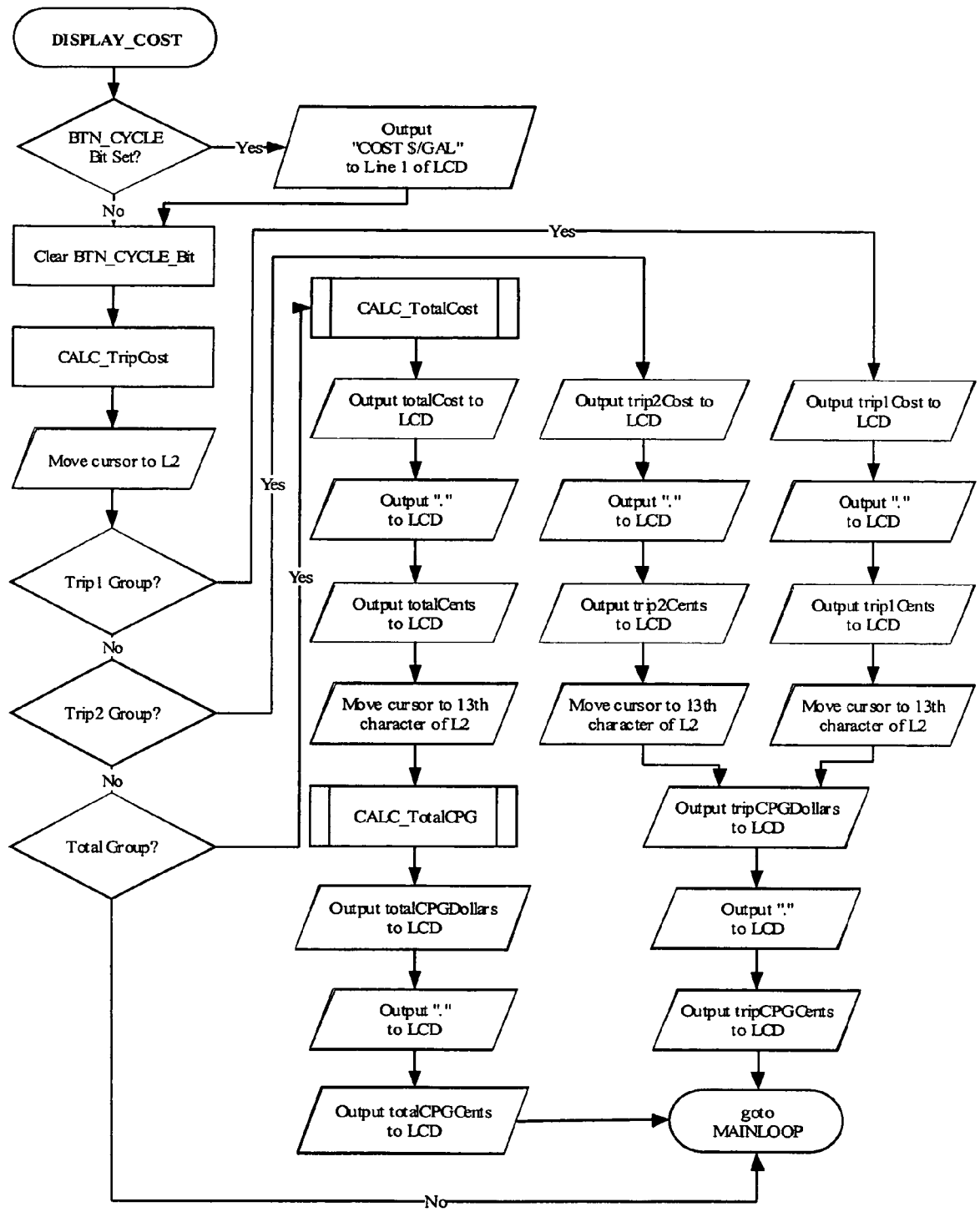
Figure 52O:
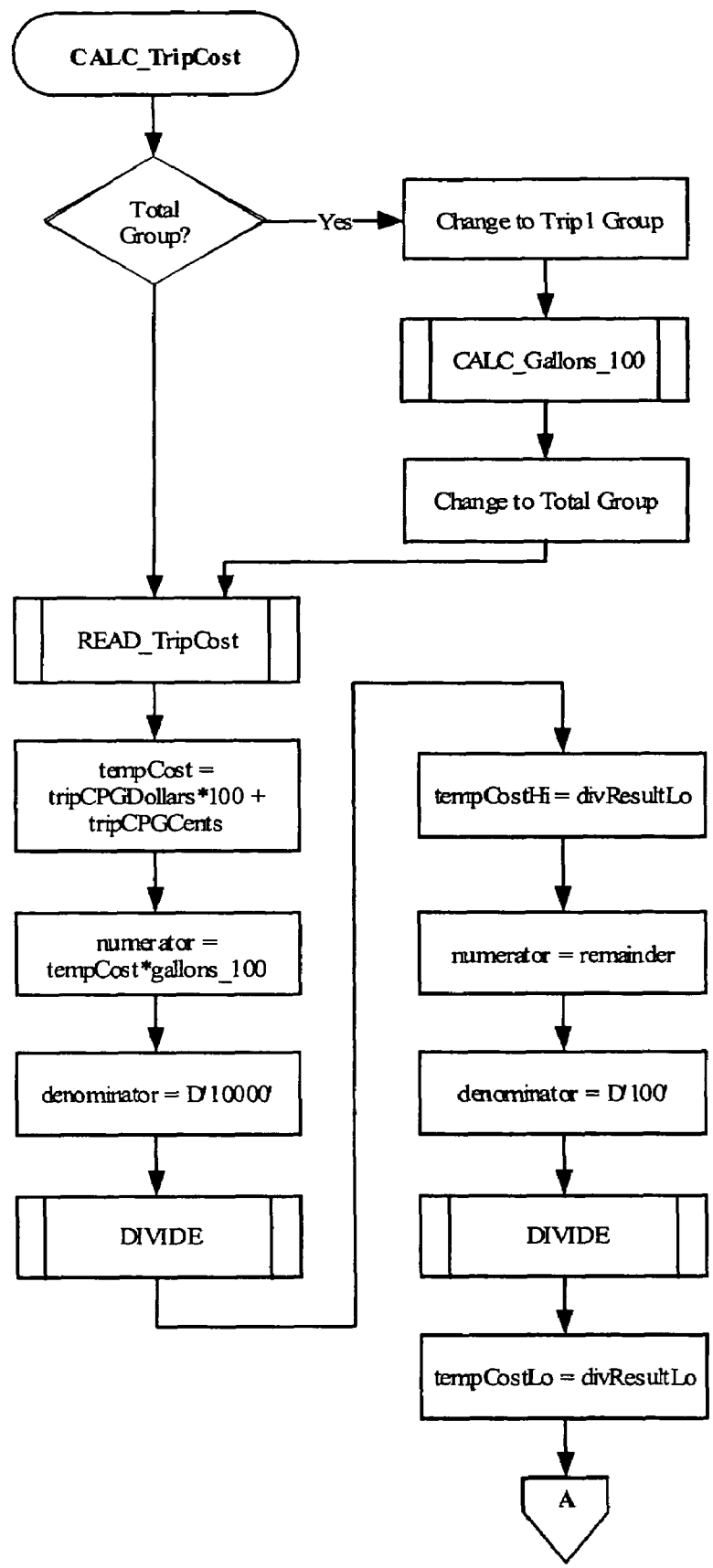
Figure 52P:
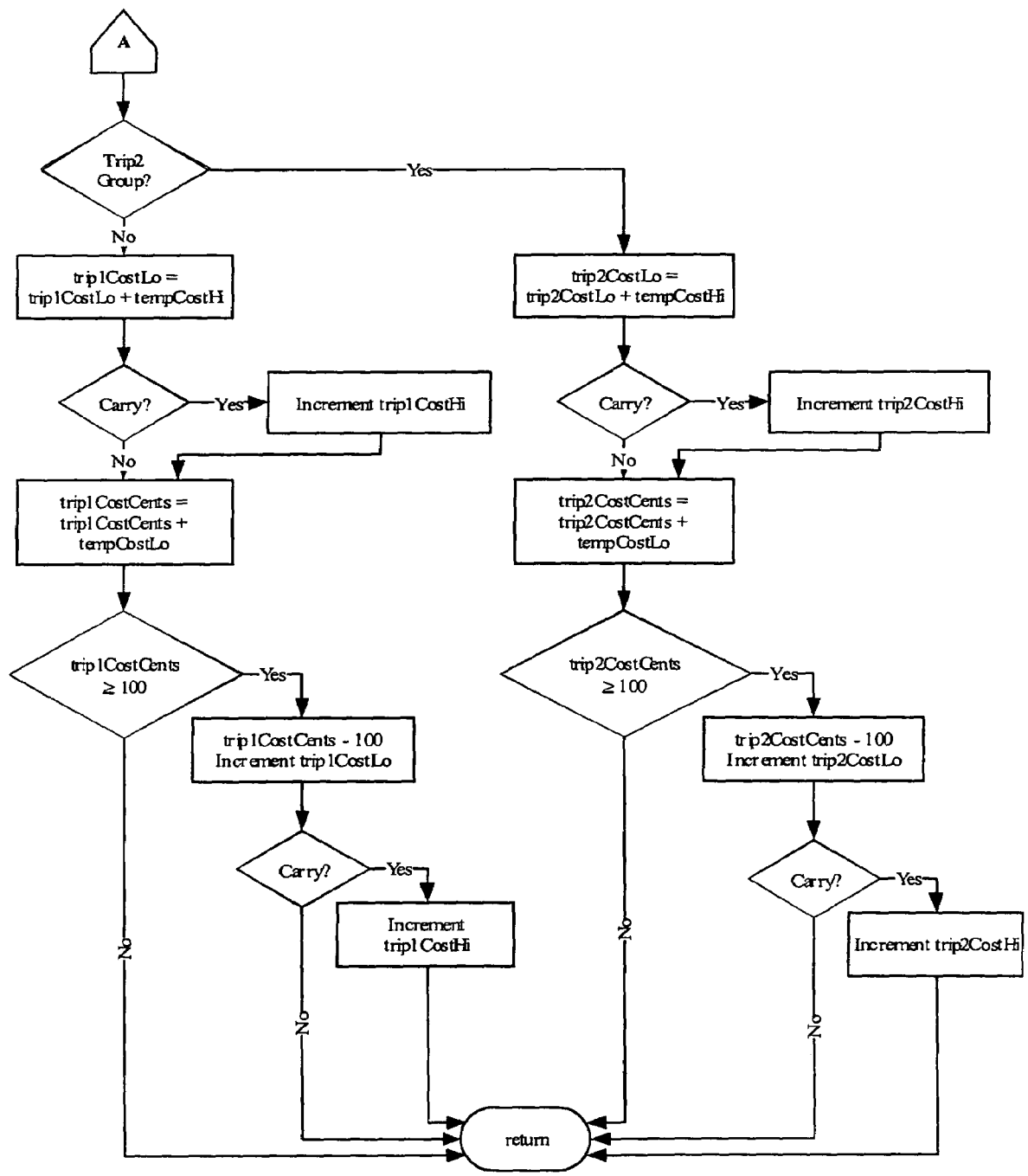
Figure 52Q:
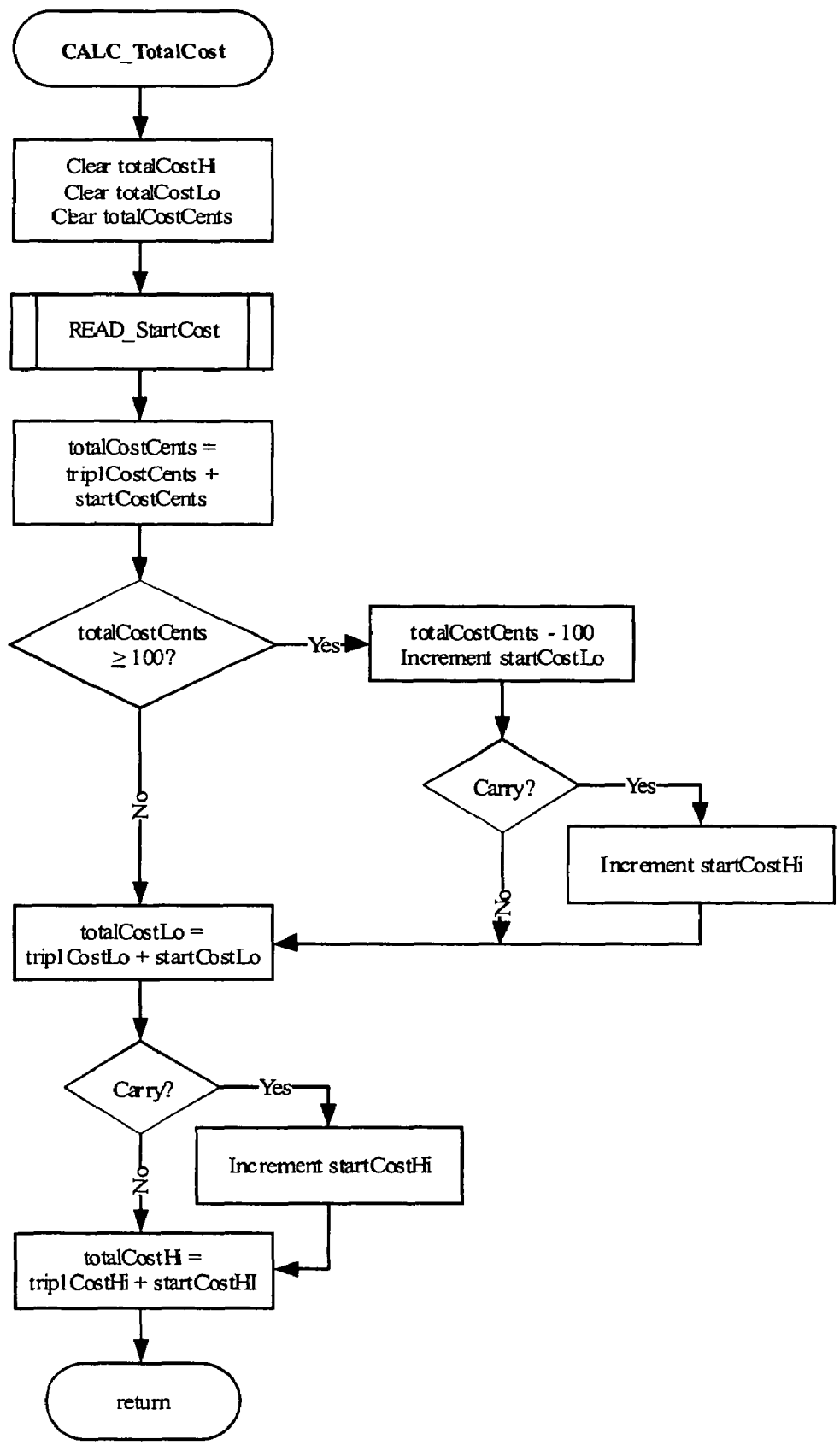
Figure 52R:
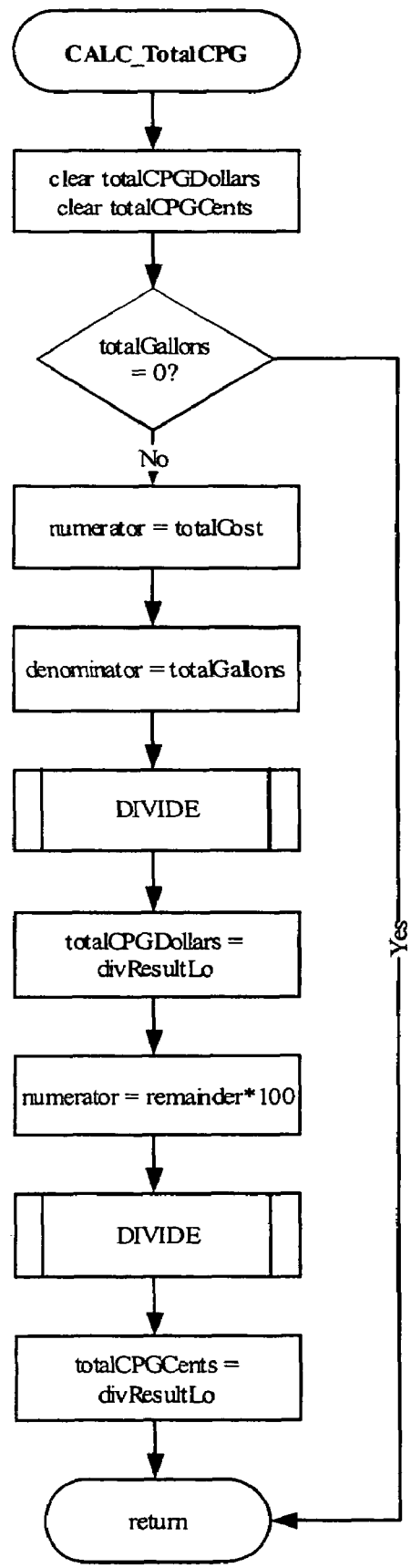

If trip1Item=1, go to DISPLAY_TIMEDISTANCE (FIGS. 52b, 52c, 52d, and 52e) to display the accumulated time and distance since the last reset of Trip1. If trip1Item=2, go to DISPLAY_ECON1 (FIGS. 52f, 52g, 52h, 52i, and 52j) to display the average speed and average miles per gallon since the last reset of Trip1. If trip1Item=3, goto DISPLAY_ECON2 (FIGS. 52k, 52g, 52h) to display the average GPH and total gallons used since the last reset of Trip1. If trip1Item=4, go to DISPLAY_TANK2E (FIGS. 52l and 52m) to display the distance to empty and time to empty based on the Trip1 fuel economy. If trip1Item=5, go to DISPLAY_COST (FIGS. 52n, 52o, 52p, 52q, and 52r) to display the total fuel cost since the last reset of Trip1 and the current fuel price. If trip1Item=6, Output "Adjust $/Gal" to line 1 of the LCD and output "Press Both Buttons" to line 2 of the LCD. If trip1Item=7, Output "TRIP1 RESET" to line 1 of the LCD and output "Press Both Buttons" to line 2 of the LCD. The program then returns to the MAINLOOP.

Figure 53:
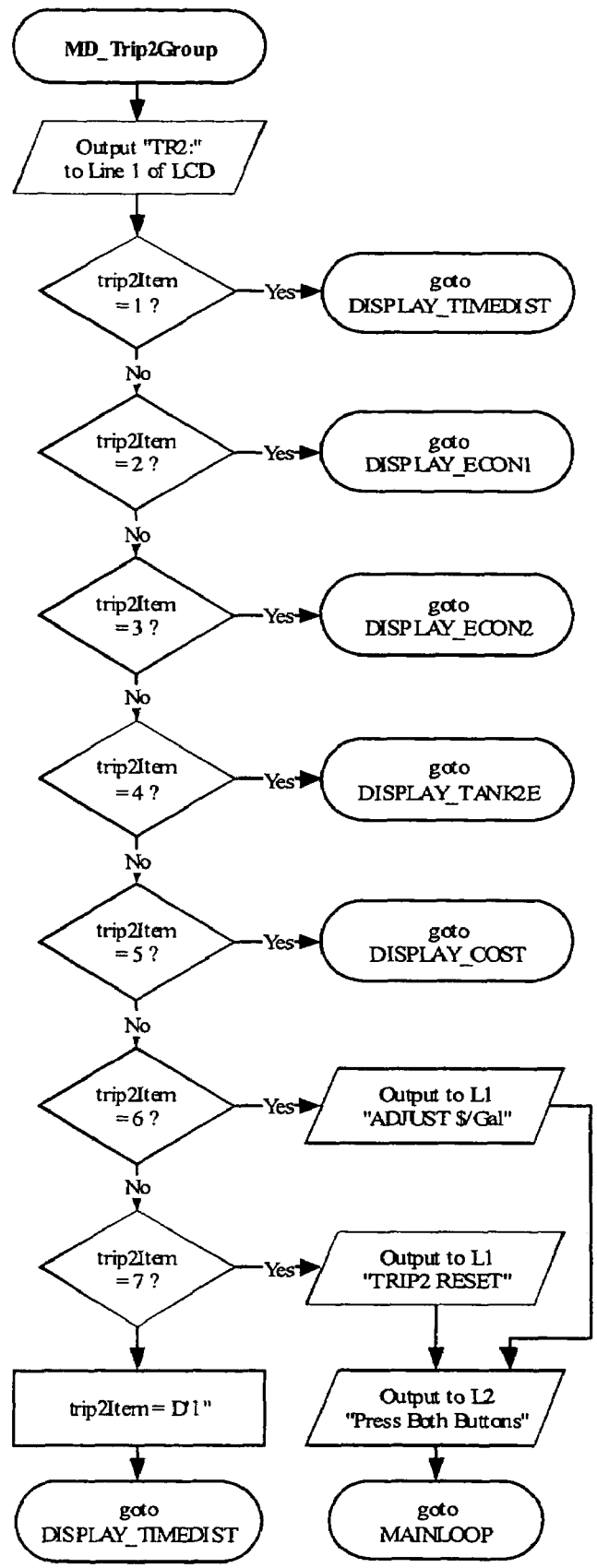
FIG. 53, MD_Trip2Group, contains a number of subroutines illustrating the sequence of actions taken in calculating and displaying data from a second trip.

The MD_Trip2Group (FIG. 53) contains seven screens.

Output "TR2:" to line 1 of the LCD. If trip2Item=1, go to DISPLAY_TIMEDISTANCE (FIG. 51a) to display the accumulated time and distance since the last reset of Trip2. If trip2Item=2, goto DISPLAY_ECON1 (FIG. 51b) to display the average speed and average miles per gallon since the last reset of Trip2. If trip2Item=3, goto DISPLAY_ECON2 (FIG. 51c) to display the average GPH and total gallons used since the last reset of Trip2. If trip2Item=4, go to DISPLAY_TANK2E (FIG. 51l) to display the distance to empty and time to empty based on the Trip2 fuel economy. If trip2Item=5, goto DISPLAY_COST (FIGS. 52n, 52o, 52p, 52q, and 52 display the total fuel cost since the last reset of Trip2 and the current fuel price. If trip2Item=6, Output "Adjust $/Gal" to line 1 of the LCD and output "Press Both Buttons" to line 2 of the LCD. If trip2Item=7, Output "TRIP2 RESET" to line 1 of the LCD and output "Press Both Buttons" to line 2 of the LCD. The program then returns to the MAINLOOP.

Figure 54:
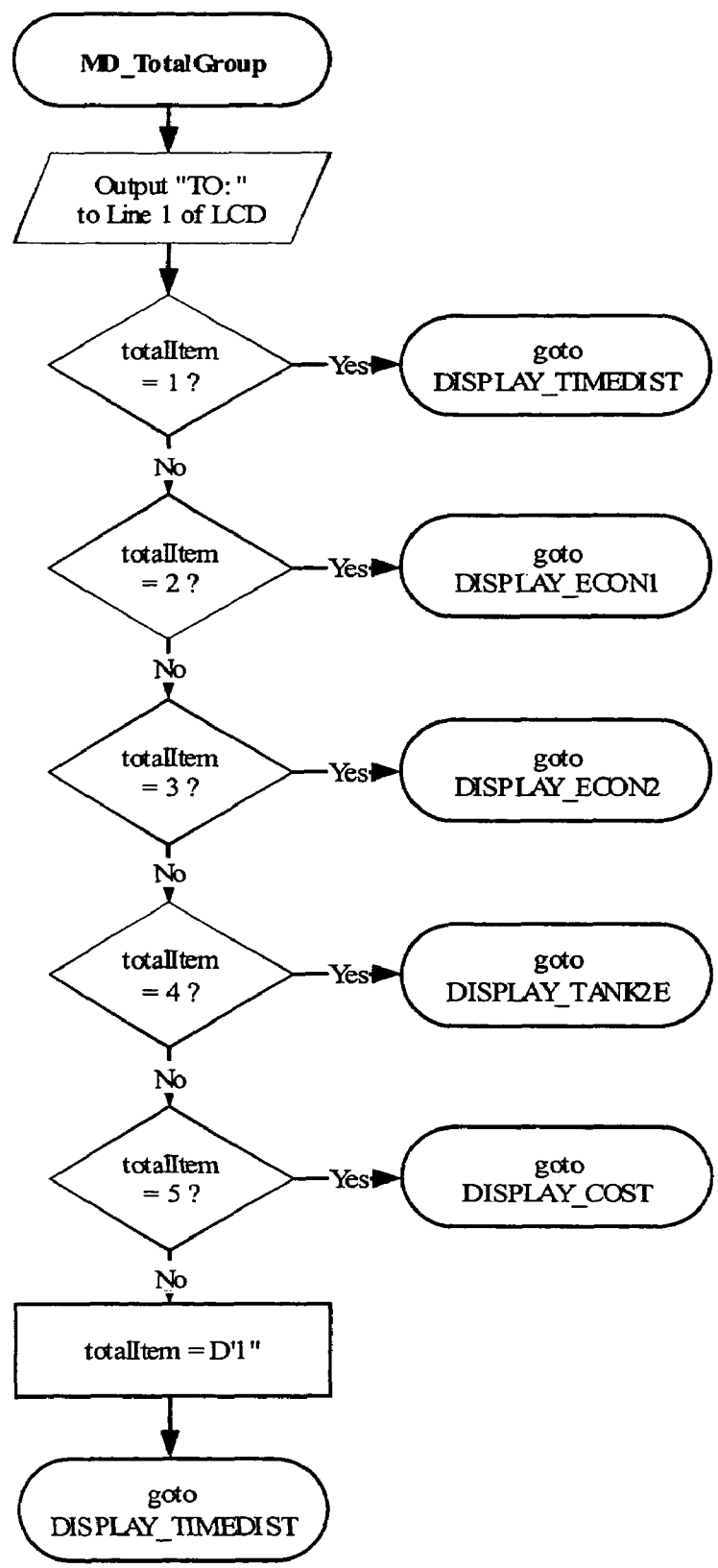
FIG. 54, MD_TotalGroup, is a flow chart illustrating the calculation and display of Items in the Total Menu. Data is accumulated since the last Total Reset of the computer module.

The MD_TotalGroup (FIG. 54) contains four screens.

Output "TO:" to line 1 of the LCD.

If trip2Item=1, goto DISPLAY_TIMEDISTANCE (FIG. 51a) to display the accumulated time and distance since the last reset of Total.

If trip2Item=2, goto DISPLAY_ECON1 (FIG. 51b) to display the average speed and average miles per gallon since the last reset of Total. If trip2Item=3, goto DISPLAY_E-CON2 (FIG. 51c) to display the average GPH and total gallons used since the last reset of Total.

If trip2Item=4, goto DISPLAY_COST (FIGS. 52n, 52o, 52p, 52q, and 52r) to display the cost since and calculate the average price per gallon since the last reset of Total.

Interrupts

The use of interrupts in the invention is crucial to its operation. Hardware interrupts on the Fuel Monitoring System are used to stop the normal execution of the program and process information from one or more of the hardware signals. The FMS uses three hardware interrupts to detect the rising and falling edge of the fuel injector, overflow of the ½ second timer, and overflow of the vehicle speed sensor counter.

At the start of the INTERRUPT subroutine, the context of the microcontroller is saved to RAM. The program polls to see which interrupts have occurred. If the Injector Interrupt is set, the program branches to process the interrupt. The injector interrupt is utilized to measure the amount of time that the injector is in the ON state for fuel consumption calculations. It also measures the period of one engine cycle to calculate the RPM.

First, the Injector Interrupt flag is cleared. If the injector is in the ON state, the injPulseCount is incremented. The start time of the injector is saved in a variable (injStart–CCPR1). If the injPulseCount is equal to the total number of injector pulses in one engine revolution, the cycleTime is calculated (injStart–cycleStart). The current injStart time is copied to the cycleStart for use on the next cycle. Finally, the Interrupt is set to detect the injector's transitions to the OFF state.

If the injector is in the OFF state, the end time of the fuel injector is saved in a variable (injEnd–CCPR1). The amount of time the injector has been on is calculated (pulseTime=injEnd–injStart). The pulseTime is added to the injTotalTime variable. If the injTotalTime overflows, 0.5 seconds of injector on time have occurred. When the variable has overflowed twice, a flag is set to increment the injector on seconds. Finally, the Interrupt is set to detect the injector's transition to the ON state. The program returns to check for additional interrupts.

If the Timer0 Interrupt is set, the program branches to process the interrupt. This interrupt occurs when the vehicle is traveling at high speeds and the speeds sensors counter overflows. First, the Timer0 Interrupt flag is cleared. The high byte of keyOnPulses is incremented. If the module is not in calibration mode, the high byte of trip1Pulses, trip2Pules, and totalPulses are also incremented. The program returns to check for additional interrupts. If the Timer1 Interrupt is set, the program branches to process the interrupt. This interrupt occurs when the timer overflows to indicate that exactly 0.5 seconds of time have elapsed. First, the Timer1 Interrupt flag is cleared. To determine the instantaneous fuel consumption, the change in the injTotalTime over the last 0.5 seconds is calculated (injGph=injTotalTime–injTotalOld). The HALF_SEC_Flag is set to allow the main loop to start the sender or FMS calculations. If the ½ second time is currently clear, then it is set. If the velocity bit is set, the current timer value is copied to ram for use in the instantaneous velocity calculation. Timer1 is complete. Otherwise, the ½ second time is currently set so it is cleared. The keyOnSeconds is incremented. If the engine is running and the program is not in calibration mode, the trip1Seconds, trip2Seconds, and totalSeconds are incremented. Timer1 is complete. The program restores the context of the microcontroller from RAM. The INTERRUPT subroutine returns and the program resumes normal execution.

What I claim is:

1. A device for monitoring the condition of a fuel system of a vehicle, comprising:
   a computer harness by which a computer-based fuel monitoring system (FMS) is attached to a vehicle, and,
   a computer control module which includes a Liquid Crystal or other Display (LCD) upon which can be displayed one or more performance characteristics of a vehicle, and,
   the computer-based fuel monitoring system (FMS) which performs tests of the main OEM fuel system and failures of the original equipment manufacturer (OEM) fuel system in vehicles having only a main OEM fuel system, and which performs tests on both the auxiliary and main OEM fuel supply systems and failures of both auxiliary and main OEM fuel supply systems in vehicles having both main OEM fuel systems and auxiliary fuel systems, in accordance with selected sequencing programs,
   where, the FMS is fully calibratable by the user of the device, and,
   where the FMS is capable of performing one or more calculations based on monitoring the rise and fall of one fuel injector, where, one of the one or more calculations based on monitoring the rise and fall of one fuel injector is that the FMS can calculate the revolutions per minute (RPM) of a vehicle's engine-based on the rise and fall of one fuel injector and,
   where the user can calibrate the FMS to his/her particular vehicle without any additional programming, and,
   where, the FMS can function without depending upon or communicating with any on-board OEM computer, such that it is fully transparent to any on-board system.

2. The device of claim 1, where, the user of the device uses the device on a vehicle with a main fuel tank and at least one auxiliary fuel tank, and, the FMS monitors and measures the levels of fuel in both the OEM main tank and the auxiliary tank, and causes to be transferred fuel from the auxiliary fuel tank to the main fuel tank such that the amounts of fuel in the main and auxiliary fuels tanks are approximately equal.

3. The device of claim 2, where, for vehicles with a main fuel tank and at least one auxiliary fuel tank, the auxiliary fuel pump pumps fuel from the auxiliary fuel tank into the main tank through an port in the main fuel tank.

4. The device of claim 1, where, the user of the device can calibrate the FMS with information supplied with the device.

5. The device of claim 1, where, the user of the device can calibrate the FMS with a Fuel Tank Calibration Table supplied by the manufacturer of the device.

6. The device of claim 1, where, the FMS can be programmed by the user for a specific make, model and year of vehicle.

7. The device of claim 1, where, the FMS system can estimate fuel usage through its monitoring of the rise and fall of one fuel injector, and extrapolate from this information the amount of fuel a vehicle is using on a "snapshot" basis, as well as short-term and long-term time periods.

8. The device of claim 1, where, the FMS can monitor the injector "ON" time, by directly measuring one or more injectors or obtaining the information directly from the OEM system, where the FMS can use this information relating to the injector "ON" time to calculate the volume of fuel used per a specific time interval, and thereby calculate the instant GPH, the average GPH, and the instant and average MPG.

9. The device of claim 1, where, the FMS is able to calculate vehicle speed and distance traveled by counting the pulses from the OEM vehicle speed sensor, and is able to measure the level of fuel in the OEM fuel tank through values received from the OEM fuel sending unit.

10. The device of claim 1, where, the FMS is designed so that a user of the device can create a custom fuel gauge calibration based upon data measured from the OEM fuel tank sending unit to the OEM fuel gauge.

11. The device of claim 1, where, the FMS allows the user of the device to calibrate or adjust each measuring device of the FMS, including but not limited to the odometer, injector calibration, fuel tank table, and fuel gauge table.

12. The device of claim 1, where, the FMS can work with both gas and diesel engines.

13. The device of claim 1, where, the FMS works with fuel-injected vehicles with digital speed sensors.

14. The device of claim 1, where, the FMS can function without reliance upon any type of a flow meter in any fuel line.

15. The device of claim 1, where, the FMS can work on diesel engines by measuring the fuel rail pressure, thereby compensating for fuel used due to pressure variations in the fuel.

16. The device of claim 1, where, the FMS can be calibrated to be more accurate than OEM built-in trip computer.

17. The device of claim 1, where, the user has the ability to enter in a price per gallon paid for fuel, and the FMS can calculate the cost under a variety of parameters, including price per mile, price per trip, and price per unit time the vehicle is driven.

18. The device of claim 1, where, the FMS can display for the user a number of features, including at least one of the following: Fuel System (gallons, fuel, fuel %, status), Current (speed, RPM, GPH, MPH), Key On (time, distance, MPG, GPH, MPH, time to empty, distance to empty), Trip (time, distance, MPG, GPH, MPH, time to empty, distance to empty, fuel cost), Total (time, distance, MPG, GPH, MPH, time to empty, distance to empty, fuel cost, average $/gal).

19. The device of claim 1, where, the FMS can also interface with a duel tank system to monitor fuel levels in each tank.

20. The device of claim 1, where the user of the device can program the FMS such that the FMS will notify the user when it determines that one or more parts of a vehicle need to be replaced based on the number of gallons used or the distance traveled, where the one or more parts may include oil filters, air filters, and fuel filters.

21. A device for monitoring the condition of a fuel system of a vehicle, comprising:
a main fuel tank with a neck of other means of filling said main fuel tank, an auxiliary fuel tank with a neck of other means of filling said auxiliary fuel tank, an auxiliary fuel tank pump which pumps fuel from the auxiliary fuel tank into the main fuel tank of a vehicle,
a sending unit,
one or more check valves, and,
one or more fuel lines to connect the auxiliary fuel tank and auxiliary fuel pump to a main fuel tank,
a computer harness by which a computer-based fuel monitoring system (FMS) is attached to a vehicle, and,
a computer control module which includes a Liquid Crystal Display (LCD) upon which can be displayed one or more characteristics of a fuel supply of a vehicle, and,
the computer-based fuel monitoring system (FMS) which performs tests of both auxiliary and main OEM fuel supply systems and failures of both auxiliary and main OEM fuel supply systems in accordance with selected sequencing programs,
where, the FMS is fully calibratable by the user, and,
where the FMS is capable of performing one or more calculations based on monitoring the rise and fall of one fuel injector, where, one of the one or more calculations based on monitoring the rise and fall of one fuel injector is that the FMS can calculate the revolutions per minute (RPM) of a vehicle's engine based on the rise and fall of one fuel injector, and,
where the user can calibrate the FMS to his/her particular vehicle without any additional programming, and,
where, the FMS can function without depending upon or communicating with any on-board OEM computer, such that it is fully transparent to any on-board system, and
where, for vehicles with a main fuel tank and at least one auxiliary fuel tank, the FMS monitors and measures the levels of fuel in both the OEM main tank and the auxiliary tank, causes to be transferred fuel from the auxiliary fuel tank to the main fuel tank such that the amounts of fuel in the main and auxiliary fuels tanks are approximately equal.

22. A method of monitoring a fuel system for a vehicle, comprising the steps of:
a first step of obtaining and installing in a vehicle a monitoring device, which comprises a computer harness by which a computer-based fuel monitoring system (FMS) is attached to a vehicle, and,
a computer control module which includes a Liquid Crystal Display (LCD) upon which can be displayed one or more performance characteristics of a vehicle, and,
the computer-based fuel monitoring system (FMS) which performs tests of the main OEM fuel system and failures of the OEM fuel system in vehicles having only a main OEM fuel system, and both auxiliary and main OEM fuel supply systems and failures of both auxiliary and main OEM fuel supply systems in vehicles having both main OEM fuel systems and auxiliary fuel systems, in accordance with selected sequencing programs,
where, the FMS is fully calibratable by the user of the, and,
where the FMS is capable of performing one or more calculations based on monitoring the rise and fall of one fuel injector, where, one of the one or more calculations based on monitoring the rise and fall of one fuel injector is that the FMS can calculate the revolutions per minute (RPM) of a vehicle's engine based on the rise and fall of one fuel injector, and,
where the user can calibrate the FMS to his/her particular vehicle without any additional programming, and,
where, the FMS can function without depending upon or communicating with any on-board OEM computer, such that it is fully transparent to any on-board system,
a second step of using the device.

23. The method of claim 22, where the monitoring device additionally comprises use of the following components to monitor the fuel system of a vehicle:

a main fuel tank with a neck of other means of filling said main fuel tank,
an auxiliary fuel tank with a neck of other means of filling said auxiliary fuel tank,
an auxiliary fuel tank pump which pumps fuel from the auxiliary fuel tank into the main fuel tank of a vehicle.

* * * * *